US012452503B2

(12) United States Patent
Ogawa et al.

(10) Patent No.: US 12,452,503 B2
(45) Date of Patent: Oct. 21, 2025

(54) IMAGING DEVICE

(71) Applicant: SONY GROUP CORPORATION, Tokyo (JP)

(72) Inventors: Tetsu Ogawa, Tokyo (JP); Hiroshi Mori, Tokyo (JP); Atsushi Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 230 days.

(21) Appl. No.: 18/251,527

(22) PCT Filed: Oct. 7, 2021

(86) PCT No.: PCT/JP2021/037145
§ 371 (c)(1),
(2) Date: May 2, 2023

(87) PCT Pub. No.: WO2022/102295
PCT Pub. Date: May 19, 2022

(65) Prior Publication Data
US 2024/0015375 A1    Jan. 11, 2024

(30) Foreign Application Priority Data
Nov. 10, 2020  (JP) ................................. 2020-187386

(51) Int. Cl.
*H04N 23/12* (2023.01)
*G01N 21/25* (2006.01)
(Continued)

(52) U.S. Cl.
CPC ............ *H04N 23/12* (2023.01); *G01N 21/25* (2013.01); *G01N 21/84* (2013.01); *G06T 7/0012* (2013.01);
(Continued)

(58) Field of Classification Search
CPC ............ B64U 2101/30; B64U 2101/40; G01N 21/25; G01N 21/84; G01N 2021/1797;
(Continued)

(56) References Cited

U.S. PATENT DOCUMENTS

| 5,717,605 | A  | * | 2/1998 | Komiya | ................. | G01J 3/0218 |
| | | | | | | 356/402 |
| 9,544,575 | B2 | * | 1/2017 | Ohtomo | ................. | H04N 13/25 |

(Continued)

FOREIGN PATENT DOCUMENTS

| JP | 2005-341175 A | 12/2005 |
| JP | 2011-029858 A | 2/2011 |

(Continued)

OTHER PUBLICATIONS

International Search Report and Written Opinion of PCT Application No. PCT/JP2021/037145, issued on Dec. 21, 2021, 13 pages of ISRWO.

(Continued)

Primary Examiner — Tri T Ton
(74) Attorney, Agent, or Firm — CHIP LAW GROUP

(57) ABSTRACT

An imaging device according to the present technology includes a light source spectral sensor that obtains a wavelength spectrum for light coming from a light source illuminating a measurement target, to detect light for each wavelength, and a multispectral camera that performs wavelength spectral imaging of the measurement target. The light source spectral sensor is capable of obtaining a spectrum of more wavelengths than those of the multispectral camera.

10 Claims, 36 Drawing Sheets

(51) Int. Cl.
| | |
|---|---|
| *G01N 21/84* | (2006.01) |
| *G06T 7/00* | (2017.01) |
| *G06T 7/80* | (2017.01) |
| *H04N 23/11* | (2023.01) |
| *H04N 23/71* | (2023.01) |
| *B64U 101/30* | (2023.01) |
| *B64U 101/40* | (2023.01) |

(52) U.S. Cl.
CPC ............... *G06T 7/80* (2017.01); *H04N 23/11* (2023.01); *H04N 23/71* (2023.01); *B64U 2101/30* (2023.01); *B64U 2101/40* (2023.01); *G01N 2021/258* (2013.01); *G01N 2021/8466* (2013.01); *G06T 2207/10036* (2013.01); *G06T 2207/30004* (2013.01); *G06T 2207/30188* (2013.01)

(58) Field of Classification Search
CPC ..... G01N 2021/258; G01N 2021/8466; G01N 21/251; G01N 21/31; G01N 2201/0214; G01N 2201/1211; G01N 33/0098; G06T 2207/10036; G06T 2207/30004; G06T 2207/30188; G06T 7/0012; G06T 7/80; H04N 23/12; H04N 23/71; H04N 23/11; H04N 23/56; H04N 23/74; A01G 7/045; B61D 19/02; G01J 3/02; G01J 3/36; G01J 3/51; G06V 10/60; G06V 20/188; G06V 20/194
See application file for complete search history.

(56) References Cited

U.S. PATENT DOCUMENTS

2019/0370586 A1* 12/2019 Otsuki ................. G06F 18/214
2021/0280617 A1* 9/2021 Sugizaki .............. H10F 39/805

FOREIGN PATENT DOCUMENTS

| JP | 2018-151832 A | 9/2018 |
|---|---|---|
| JP | 2020-197483 A | 12/2020 |
| WO | 2007/139070 A1 | 12/2007 |
| WO | 2018/150691 A1 | 8/2018 |
| WO | 2018/186016 A1 | 10/2018 |
| WO | 2019/017095 A1 | 1/2019 |
| WO | 2019/026619 A1 | 2/2019 |
| WO | 2019/181154 A1 | 9/2019 |

OTHER PUBLICATIONS

Honda, et al., "What is the "vegetation indices" obtained from satellite observation data? / what kind of influences of the directional reflection could be considered in the vegetation observation from satellite?", Journal of The Remote Sensing Society of Japan, vol. 32, No. 2, Jan. 1, 2012, pp. 101-104.

* cited by examiner

FIG. 28

| INCIDENCE ANGLE | REFLECTION ANGLE | RELATIVE AZIMUTH | SPECTRAL REFLECTANCE | | | |
|---|---|---|---|---|---|---|
| | | | 400nm | 410nm | ... | 800nm |
| 0 | 0 | | 0.2 | 0.21 | | 0.61 |
| 0 | 15 | | 0.15 | 0.16 | | 0.56 |
| 0 | 30 | | 0.1 | 0.11 | | 0.51 |
| ... | ... | | | | | |
| 15 | 0 | | 0.14 | 0.16 | | 0.55 |
| 15 | 15 | | 0.25 | 0.27 | | 0.62 |
| ... | ... | | | | | |

BRF TABLE

FIG. 29

BRF TABLE

| INCIDENCE ANGLE | REFLECTION ANGLE | RELATIVE AZIMUTH | SPECTRAL REFLECTANCE | | | |
|---|---|---|---|---|---|---|
| | | | 400nm | 410nm | ... | 800nm |
| 0 | 0 | 0 | 0.2 | 0.21 | | 0.61 |
| 0 | 15 | 0 | 0.15 | 0.16 | | 0.56 |
| 0 | 30 | 0 | 0.1 | 0.11 | | 0.51 |
| ... | ... | ... | c | | | |
| 15 | 0 | 15 | 0.14 | 0.16 | | 0.55 |
| 15 | 15 | 15 | 0.25 | 0.27 | | 0.62 |
| ... | ... | ... | b | | | |

CORRECTION
a'=a*(c/b)

CALCULATED VALUE

| INCIDENCE ANGLE | REFLECTION ANGLE | RELATIVE AZIMUTH | 400nm | 410nm | ... | 800nm |
|---|---|---|---|---|---|---|
| 15 | 15 | 15 | 0.19 | 0.22 | | 0.59 |
| | | | a | | | |

IMAGING DEVICE

CROSS REFERENCE TO RELATED APPLICATIONS

This application is a U.S. National Phase of International Patent Application No. PCT/JP2021/037145 filed on Oct. 7, 2021, which claims priority benefit of Japanese Patent Application No. JP 2020-187386 filed in the Japan Patent Office on Nov. 10, 2020. Each of the above-referenced applications is hereby incorporated herein by reference in its entirety.

TECHNICAL FIELD

The present technology relates to an imaging device and, particularly, to a technical field associated with a multispectral camera which obtains a spectral image for each wavelength.

BACKGROUND ART

Sensing with use of a flying object such as a drone has widely spread in recent years. This type of sensing can measure not only shapes on the basis of visible light (RGB) images, but also physical properties, physical states, and the like of a sensing target by using various optical wavelengths and methods.

For achieving this type of sensing, a multispectral camera has been developed as a camera capable of simultaneously measuring multiple wavelengths, and adopted to perform such sensing as remote sensing with use of a drone for observation of plant states in a large-scale farm field. For example, there is an attempt of capturing images of vegetation states of plants while moving in the sky above a farm field with use of a small-sized flying object carrying a multispectral camera, to achieve remote sensing of the vegetation states.

Note that PTL 1 cited below is one of relevant conventional technologies. PTL 1 discloses a technology of a multispectral camera which extracts wavelengths in a tunable manner during postprocessing for captured image signals.

CITATION LIST

Patent Literature

[PTL 1]
PCT Patent Publication No. WO2019/181154

SUMMARY

Technical Problems

Here, spectral reflectance of a measurement target, such as a plant, is measured in some cases as an index value for evaluating a state of the measurement target. Spectral reflectance is reflectance of a measurement target for incident light coming from a light source such as the sun for a target wavelength. In a case where spectral reflectance is measured, not only reflection light coming from the measurement target is detected with use of a multispectral camera, but also a wavelength spectrum of light coming from the light source is detected with use of a light source spectral sensor. In this case, it is preferable that spectral characteristics of the multispectral camera side and spectral characteristics of the light source spectral sensor side be equalized with each other to obtain spectral reflectance for each wavelength.

However, it is considered difficult to equalize the spectral characteristics of the multispectral camera with the spectral characteristics of the light source spectral sensor, due to a difference in physical structure between these, individual variations, and for other reasons. For example, from a viewpoint of the structure, the multispectral camera has such optical characteristics as a superposition of a characteristic of an on-chip color filter of each camera, a semiconductor characteristic of an image sensor itself, a spectral characteristic of a lens, and a characteristic of a band-pass filter for transmitting a specific wavelength, while the light source spectral sensor often has a structure which includes a single photodiode and a band-pass filter stacked on the photodiode. Accordingly, it is difficult to equalize the optical characteristics of the multispectral camera and the light source spectral sensor, due to a difference in structure between these. Moreover, equalization of the optical characteristics between the multispectral camera and the light source spectral sensor is difficult in some cases due to individual variations produced at the time of mass production. These problems become more remarkable as the number of wavelengths to be measured increases.

The present technology has been developed in consideration of the above-mentioned circumstances. It is an object of the present technology to improve accuracy of measurement which requires wavelength agreement between the multispectral camera side and the light source spectral sensor side.

Solution to Problems

An imaging device according to the present technology includes a light source spectral sensor that obtains a wavelength spectrum for light coming from a light source illuminating a measurement target, to detect light for each wavelength, and a multispectral camera that performs wavelength spectral imaging of the measurement target. The light source spectral sensor is configured to be capable of obtaining a spectrum of more wavelengths than those of the multispectral camera.

The wavelength spectral imaging refers to imaging in multiple wavelength bands. By the configuration of the light source spectral sensor capable of obtaining a spectrum of more wavelengths than those of the multispectral camera as described above, a spectrum result can be obtained for each of wavelengths agreeing with respective spectral wavelengths of the multispectral camera side as a spectrum result of the light source side.

Note that the multispectral camera in the present description is a general term of a camera capable of imaging in multiple wavelength bands, and includes a camera generally called a multispectral camera and a camera called a hyper spectrum camera, for example.

According to the imaging device of the present technology described above, it is considered that the light source spectral sensor is a spectral wavelength variable type spectral sensor.

With use of the light source spectral sensor of the spectral wavelength variable type, the respective spectral wavelengths of the light source spectral sensor side can be equalized with the respective spectral wavelengths of the multispectral camera side.

According to the imaging device of the present technology described above, it is considered that the light source spectral sensor is a spectral sensor that obtains the wavelength spectrum by using a principle of surface plasmon resonance.

In this case, the spectral sensor as the spectral wavelength variable type light source spectral sensor can acquire light source spectral images of multiple wavelengths by one imaging while achieving imaging using a pixel array structure similar to that of an image sensor.

According to the imaging device of the present technology described above, it is considered to include an arithmetic section that calculates spectral reflectance of the measurement target on the basis of a spectrum detection result associated with the light source and obtained by the light source spectral sensor and a wavelength spectral image captured by the multispectral camera.

The spectral reflectance is reflectance of the measurement target obtained for irradiation light coming from the light source for a target wavelength. By calculating the spectral reflectance, an evaluation index appropriate for evaluating physical characteristics of the measurement target, such as an evaluation index of vegetation conditions in a case of plants, for example, can be obtained.

According to the imaging device of the present technology described above, it is considered that the light source spectral sensor detects the light coming from the light source for each direction.

The "direction" herein refers to any direction in a three-dimensional space, and is defined by an azimuth and an angle to a horizontal plane. By detecting light coming from the light source for each direction, a light detection value for each direction is available as a light detection value of the light source to be used for measurement of a corresponding portion of the measurement target for a corresponding direction according to a coming direction of light applied to the corresponding portion of the measurement target.

According to the imaging device of the present technology described above, it is considered that the light source spectral sensor receives the light coming from the light source, by using a light reception section where multiple light reception elements are two-dimensionally arranged.

In this case, a correlation between a position in a light reception surface and a direction of incident light received at this position can be established. For example, a central portion of the light reception surface receives incident light coming from directly above, while a portion away from the center in a predetermined azimuth by a predetermined distance receives light obliquely entering from the predetermined azimuth.

According to the imaging device of the present technology described above, it is considered to include an arithmetic section that calculates an evaluation index value of the measurement target on the basis of a spectrum detection result associated with the light source and obtained by the light source spectral sensor and a wavelength spectral image captured by the multispectral camera. The arithmetic section identifies, on the basis of the wavelength spectral image, a direct light surface that is included in the measurement target and that corresponds to a surface to which light containing a direct light component from the light source is applied and a scattered light surface that is included in the measurement target and that corresponds to a surface to which scattered light not containing the direct light component is applied. The arithmetic section obtains, on the basis of the spectrum detection result obtained by the light source spectral sensor, a direct light detection value that is a light detection value associated with direct light coming from the light source and a scattered light detection value that is a light detection value associated with the scattered light. The arithmetic section uses the direct light detection value for calculation of the evaluation index value of the direct light surface, and uses the scattered light detection value for calculation of the evaluation index value of the scattered light surface.

Even in a case where surfaces of the measurement target have different angles, a difference between light detection values of these surfaces is considered to be small if both of the surfaces belong to a surface to which direct light is applied as the direct light surfaces. Similarly, even in a case where surfaces of the measurement target have different angles, a difference between light detection values of these surfaces is considered to be small if both of the surfaces belong to a surface to which scattered light is applied as the scattered light surfaces.

According to the imaging device of the present technology described above, it is considered to include an arithmetic section that calculates an evaluation index value of the measurement target on the basis of a spectrum detection result associated with the light source and obtained by the light source spectral sensor and a wavelength spectral image captured by the multispectral camera. The arithmetic section obtains a light detection value for each of multiple directions that are three or more directions as a light detection value of incident light coming from the light source, on the basis of the spectrum detection result obtained by the light source spectral sensor. The arithmetic section performs structure recognition of the measurement target on the basis of a measurement result obtained by a three-dimensional measurement sensor that three-dimensionally measures the measurement target, to identify a normal direction of the measurement target for each of portions of the wavelength spectral image. The arithmetic section calculates the evaluation index value of each of the portions of the wavelength spectral image by using, from among the light detection values obtained for the multiple directions, a light detection value in a direction corresponding to the normal direction identified for a corresponding one of the portions.

In this case, the evaluation index value considering more directions than those of a case which considers only the two directions, i.e., the direct light direction and the scattered light direction, is calculated.

According to the imaging device of the present technology described above, it is considered to include an arithmetic section that calculates spectral reflectance of the measurement target on the basis of a spectrum detection result associated with the light source and obtained by the light source spectral sensor and a wavelength spectral image captured by the multispectral camera. The arithmetic section identifies an incidence angle of the light coming from the light source for each of portions of the wavelength spectral image, on the basis of information indicating a direction where the light source is located. The arithmetic section identifies a reflection angle of each of the portions of the wavelength spectral image on the basis of the wavelength spectral image. The arithmetic section corrects the spectral reflectance calculated for each of the portions of the wavelength spectral image, by using direction dependence reflection mode information associated with the measurement target, on the basis of the incidence angle and the reflection angle identified for each of the portions.

In this case, the spectral reflectance can be appropriately corrected in correspondence with direction dependence of the reflection light from the measurement target.

According to the imaging device of the present technology described above, it is considered that the arithmetic section determines a type of the measurement target on the basis of a captured image of the measurement target. The arithmetic section corrects the spectral reflectance calculated for each of the portions of the wavelength spectral image, by using direction dependence reflection mode information corresponding to the determined type included in the direction dependence reflection mode information prepared for each of the types.

The type of the measurement target is a division of characteristics of the measurement target from a predetermined viewpoint, such as a division of a variety and a division according to a growth condition in a case where the measurement target is a plant. For example, concerning plants, the direction dependence reflection mode information may vary according to the type of the measurement target, in such a case where the direction dependence reflection mode information varies depending on varieties and growth conditions.

According to the imaging device of the present technology described above, it is considered that the arithmetic section acquires spectral reflectance for each of combinations of the incidence angle and the reflection angle by identifying the incidence angle and the reflection angle for each of the portions of the wavelength spectral image and calculating the spectral reflectance for each of the portions, and generates the direction dependence reflection mode information on the basis of the spectral reflectance acquired for each of the combinations.

In this case, the spectral reflectance can be corrected on the basis of the appropriate direction dependence reflection mode information corresponding to an actual measurement environment.

According to the imaging device of the present technology described above, it is considered that the arithmetic section determines a type of the measurement target on the basis of a captured image of the measurement target, and generates the direction dependence reflection mode information for each of the types.

In this case, the spectral reflectance can be corrected on the basis of the appropriate direction dependence reflection mode information corresponding to an actual measurement environment and the type of the measurement target.

According to the imaging device of the present technology described above, it is considered that the light source spectral sensor is configured to obtain a spectrum of more wavelengths than those of the multispectral camera.

By increasing the number of the spectral wavelengths of the light source spectral sensor side, wavelengths agreeing with the respective spectral wavelengths of the multispectral camera side can be selected and used.

BRIEF DESCRIPTION OF DRAWINGS

FIG. 28 is a diagram illustrating an example of a BRF table.

FIG. 29 is an explanatory diagram depicting correction of spectral reflectance on the basis of the BRF table.

DESCRIPTION OF EMBODIMENTS

Embodiments will hereinafter be described in the following order.
<1. First embodiment>
(1-1. System configuration of embodiment)
(1-2. Imaging device as first embodiment)
<2. Second embodiment>
<3. Third embodiment>
<4. Fourth embodiment>
<5. Modifications>
<6. Summary of embodiments>
<7. Present technology>

1. First Embodiment 1-1. System Configuration of Embodiment

Described in an embodiment by way of example will be a case of sensing of a vegetation state in a farm field.

Figure 1:
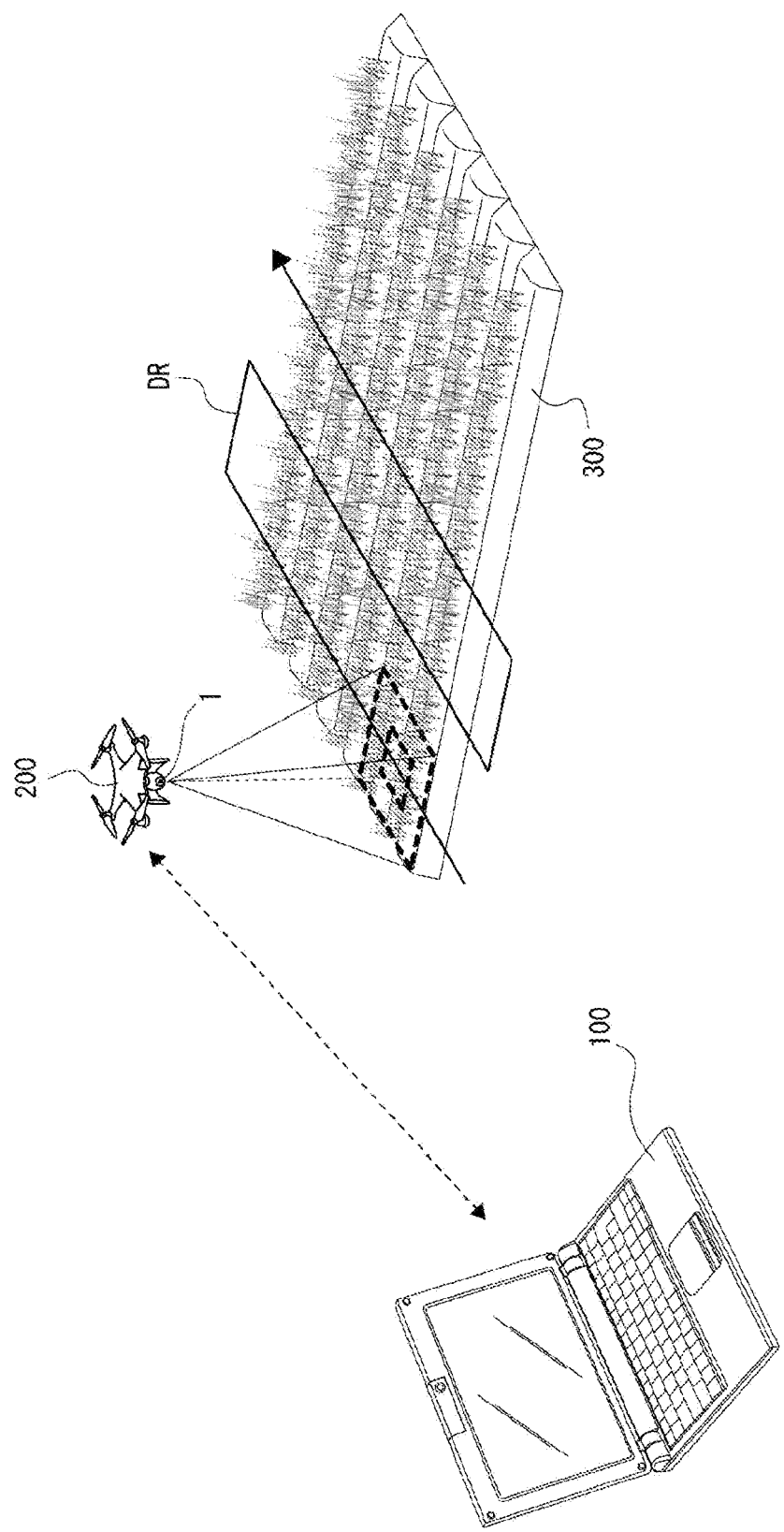
FIG. 1 is an explanatory diagram of remote sensing performed in an embodiment of the present technology.

For example, assumed is a case where remote sensing of vegetation is achieved in a farm field 300 designated as a measurement target, with use of an imaging device 1 mounted on a flying object 200 as depicted in FIG. 1. Note that the farm field 300 will also be referred to as a "measurement target 300" in the following description.

The flying object 200 as a small-sized object is capable of moving in the sky above the farm field 300 by wireless control performed by an operator, automatic control, or the like, for example.

The imaging device 1 as a first embodiment of the present technology is attached to the flying object 200. As will be described below, the imaging device 1 includes a multispectral camera (multispectral camera 3 described below) which performs wavelength spectral imaging for multiple wavelengths, such as three or more wavelengths. The imaging device 1 is installed on the flying object 200 such that this multispectral camera captures images in a downward direction, for example.

The wavelength spectral imaging herein refers to imaging in multiple wavelength bands.

When the flying object 200 moves in the sky above the farm field 300 along a route DR set as indicated by an arrow, for example, the imaging device 1 captures still images regularly, for example, by the multispectral camera.

In the present example, various types of data obtained by the imaging device 1 mounted on the flying object 200 is transmitted to an information processing device 100. The information processing device 100 is configured as a PC (personal computer), an FPGA (field-programmable gate array), or the like, for example, and performs a process for presenting, to a user, information indicating an evaluation result of the measurement target 300 in a form of an image, on the basis of the data acquired from the imaging device 1.

Here, the imaging device 1 according to the present embodiment has not only a function of obtaining images for each of wavelengths by performing wavelength spectral imaging with use of the multispectral camera, but also a function of calculating an evaluation index value for the measurement target 300 on the basis of these images obtained for each of the wavelengths. Specifically, the imaging device 1 has a function of calculating spectral reflectance as this evaluation index value. The spectral reflectance is reflectance obtained for the measurement target 300 for irradiation light coming from a light source for a target wavelength.

Figure 2:
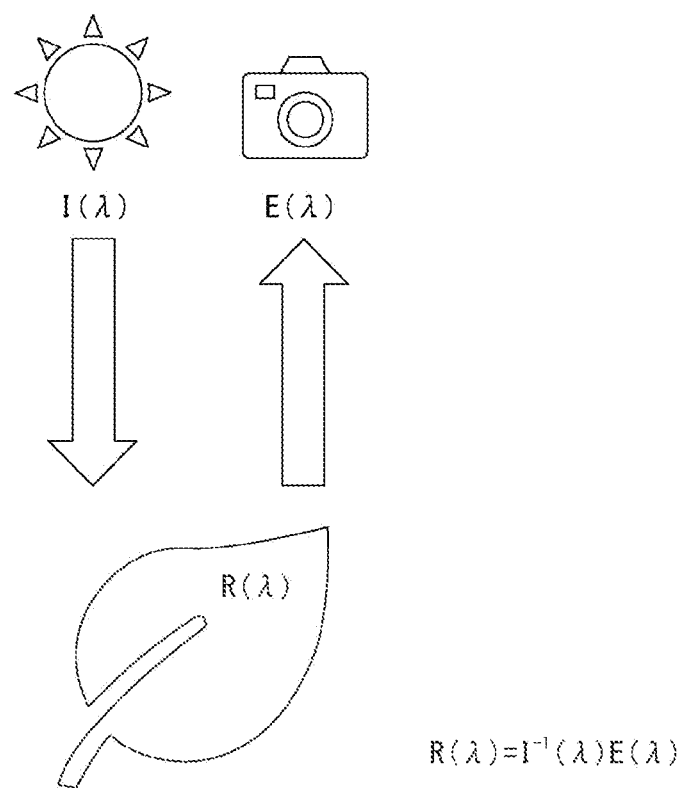
FIG. 2 is an explanatory diagram depicting spectral reflectance.

FIG. 2 is an explanatory diagram depicting spectral reflectance.

Spectral reflectance $R(\lambda)$ for a target wavelength ($\lambda$) is obtained by detecting irradiation light $I(\lambda)$ coming from a light source (the sun in this example) and reflection light $E(\lambda)$ coming from a measurement target (leaf in this example), and dividing the reflection light $E(\lambda)$ by the irradiation light $I(\lambda)$. Specifically, "$R(\lambda)=I^{-1}(\lambda)E(\lambda)$" is used.

1-2. Imaging Device as First Embodiment

Figure 3:
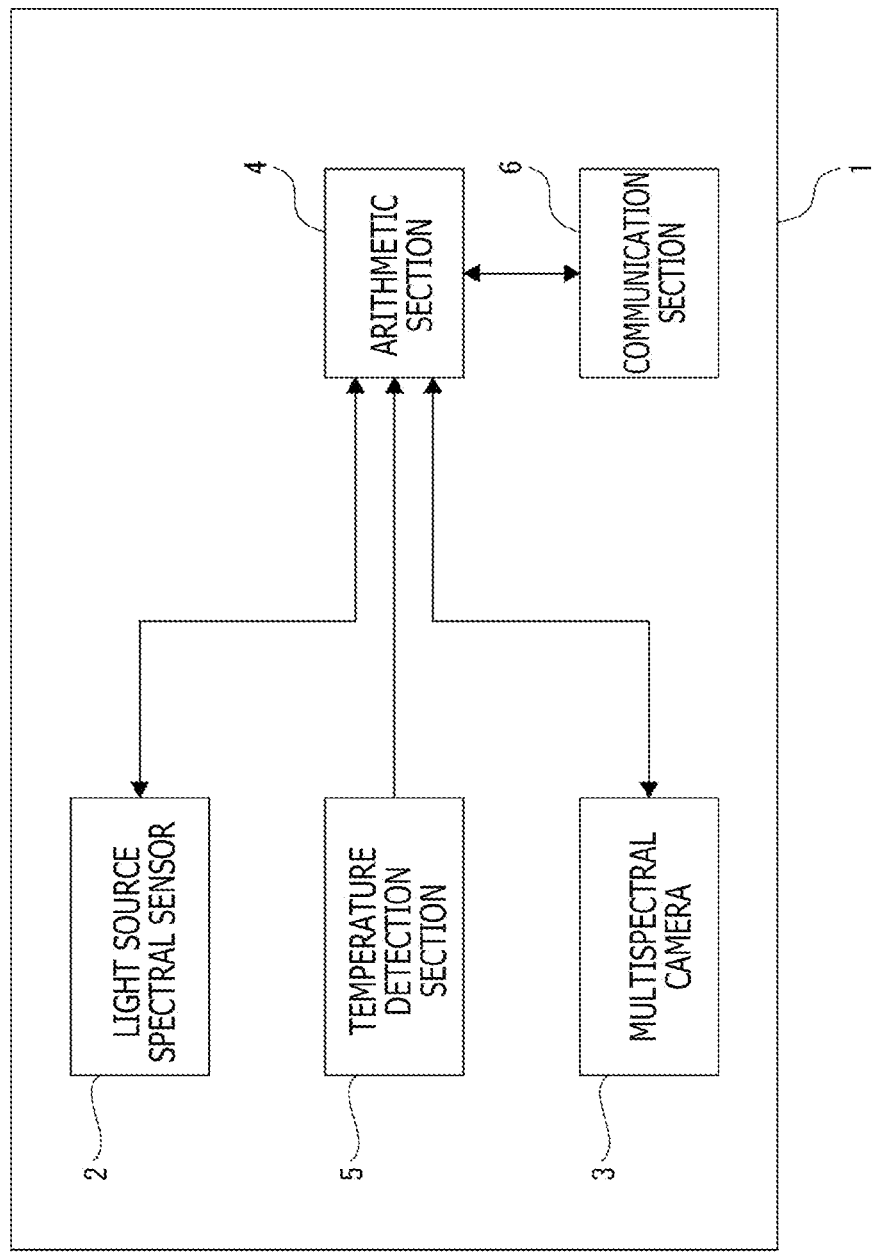
FIG. 3 is a block diagram depicting an internal configuration example of an imaging device as a first embodiment.

For achieving calculation of the spectral reflectance in the manner described above, a light source spectral sensor 2 is provided on the imaging device 1 as depicted in FIG. 3.

FIG. 3 is a block diagram depicting an internal configuration example of the imaging device 1.

As depicted in the figure, the imaging device 1 includes the light source spectral sensor 2, the multispectral camera 3, an arithmetic section 4, a temperature detection section 5, and a communication section 6.

The light source spectral sensor 2 is a sensor which obtains a wavelength spectrum of light coming from the sun as the light source of the measurement target 300, to detect light for each wavelength.

While not depicted in the figure, the light source spectral sensor 2 of the present example is provided in such a manner as to face a side that is directly above the imaging device 1 to detect irradiation light from the sun. In other words, the light source spectral sensor 2 is provided in a direction opposite to the multispectral camera 3 which captures images of the measurement target 300.

Note that a specific configuration example of the light source spectral sensor 2 of the present embodiment will be described below.

The multispectral camera 3 includes an image sensor such as an image sensor of a CMOS (Complementary Metal Oxide Semiconductor) type and an image sensor of a CCD (Charge Coupled Device) type and a wavelength filter which selectively transmits light in a predetermined wavelength band of incident light entering the image sensor, and performs wavelength spectral imaging.

The multispectral camera 3 may be configured to capture images of multiple wavelengths by one imaging by using a pair of the single image sensor and an imaging optical system, or configured to capture images by using multiple pairs of the image sensor and the imaging optical system, each pair of which capture images of a predetermined number of wavelengths. Moreover, the multispectral camera can be configured to capture a spectral image for each of a larger number of wavelengths than the number of types of the wavelength filters. For example, similarly to the multispectral camera described in PTL 1 presented above, the multispectral camera may be configured to capture a spectral image for each of a larger number of wavelengths than the number of types of the wavelength filters by performing postprocessing for captured image signals.

For example, the arithmetic section 4 includes a microcomputer which has a CPU (Central Processing Unit), a ROM (Read Only Memory), a RAM (Random Access Memory), and the like, and performs various types of arithmetic processing and overall control of the imaging device 1 by causing the CPU to execute processes according to a program stored in a predetermined storage device such as the ROM.

For example, the arithmetic section 4 issues an instruction for executing an imaging operation by using the multispectral camera 3, an instruction for executing a light detection operation by using the light source spectral sensor 2, and other instructions. Moreover, the arithmetic section 4 calculates an evaluation index value for the measurement target 300 on the basis of a light source spectrum detection result obtained by the light source spectral sensor 2 and a wavelength spectral image obtained by the multispectral camera. Specifically, the arithmetic section 4 calculates spectral reflectance in the present example.

Further, the arithmetic section 4 performs data communications with the information processing device 100 depicted in FIG. 1, via the communication section 6. For example, the communication section 6 performs a process for communication via a network including the Internet, and communicates with peripheral devices by near field communication. Note that the communication section 6 can also be configured to communicate with external devices by wired communication.

In addition, the arithmetic section 4 also performs processing based on detection information obtained by the temperature detection section 5.

Here, the temperature detection section 5 detects a temperature of the light source spectral sensor 2 and a temperature of the multispectral camera 3. For example, the light source spectral sensor 2 has a temperature sensor provided near the light source spectral sensor 2 and a temperature sensor provided near the multispectral camera 3, to detect temperatures of the light source spectral sensor 2 and the multispectral camera 3.

Note that the processing performed by the arithmetic section 4 on the basis of the detection information obtained by the temperature detection section 5 will be described below.

Here, in a case where spectral reflectance is calculated, it is preferable that spectral characteristics of the multispectral camera side and spectral characteristics of the light source spectral sensor side be equalized with each other to obtain an accurate numerical value for each wavelength. Note that the spectral characteristics referred to herein are determined by at least two factors of a CWL (Central Wavelength) and an FWHM (Full Width at Half Maximum) for each transmitted wavelength band.

However, it is considered difficult to equalize the spectral characteristics of the multispectral camera with the spectral characteristics of the light source spectral sensor, due to a difference in physical structure between these, individual variations, and for other reasons. This difficulty is caused by the structure of a typical light source spectral sensor currently available. This structure is produced by stacking a band-pass filter FL on a single photodiode PD as depicted in FIG. 4 by way of example.

Figure 4:
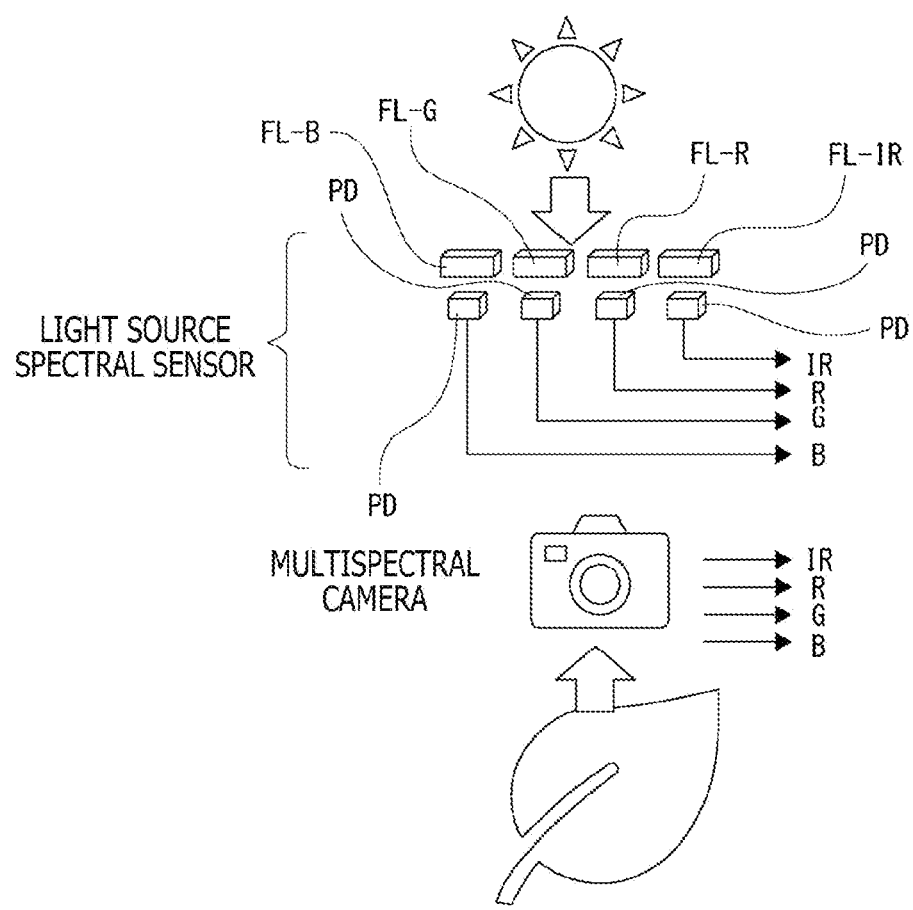
FIG. 4 is an explanatory diagram of an example of a typical light source spectral sensor.

According to a system depicted in FIG. 4 by way of example, the light source spectral sensor includes, as band-pass filters FL, band-pass filters FL-R, FL-G, and FL-B for transmitting R (red), G (green), and B (blue) rays of light, respectively, and a band-pass filter FL-IR for transmitting an IF (Infra Red: infrared region) light in correspondence with a case where the multispectral camera side obtains a spectral image for each of wavelengths of R, G, and B, and also IR.

As described above, the conventional typical light source spectral sensor has a structure considerably different from the structure of the multispectral camera 3 which includes the image sensor and performs wavelength spectral imaging. Specifically, the multispectral camera has such optical characteristics as a superposition of a characteristic of an on-chip color filter on an image sensor, a semiconductor characteristic of the image sensor itself, a spectral characteristic of a lens, and a characteristic of a band-pass filter for transmitting a specific wavelength. On the other hand, the light source spectral sensor depicted in FIG. 4 by way of example has a considerably different element for determining the optical characteristics. Accordingly, equalization of the optical characteristics between the light source spectral sensor and the multispectral camera is difficult. Moreover, equalization of the optical characteristics between them is difficult in some cases due to individual variations produced at the time of mass production. These problems become more remarkable as the number of wavelengths to be measured increases.

According to the present embodiment, therefore, the light source spectral sensor 2 includes a spectral sensor configured to obtain a spectrum of more wavelengths than those of the multispectral camera 3.

The spectral sensor configured to obtain a spectrum of more wavelengths than those of the multispectral camera 3 herein refers to either a spectral sensor configured to obtain a spectrum of more wavelengths than those of the multispectral camera 3, or a spectral wavelength variable type spectral sensor.

With use of the spectral sensor that obtains a spectrum of more wavelengths than those of the multispectral camera 3, wavelengths agreeing with respective spectral wavelengths of the multispectral camera 3 side can be selected from many wavelengths and used. Specifically, for calculation of an evaluation index value of the measurement target 300, light detection values of wavelengths agreeing with the respective spectral wavelengths of the multispectral camera 3 side are available as light detection values of the light source.

In addition, with use of the spectral wavelength variable type spectral sensor, the spectral wavelengths of the light source spectral sensor 2 side can be equalized with the spectral wavelengths of the multispectral camera 3 side.

Presented herein will be an example which adopts the spectral wavelength variable type spectral sensor as the light source spectral sensor 2.

Note that the example of the spectral sensor which obtains a spectrum of more wavelengths than those of the multispectral camera 3 will be described below.

Examples of the spectral wavelength variable type spectral sensor include a spectral sensor which obtains a wavelength spectrum by using a principle of surface plasmon resonance.

Figure 5:
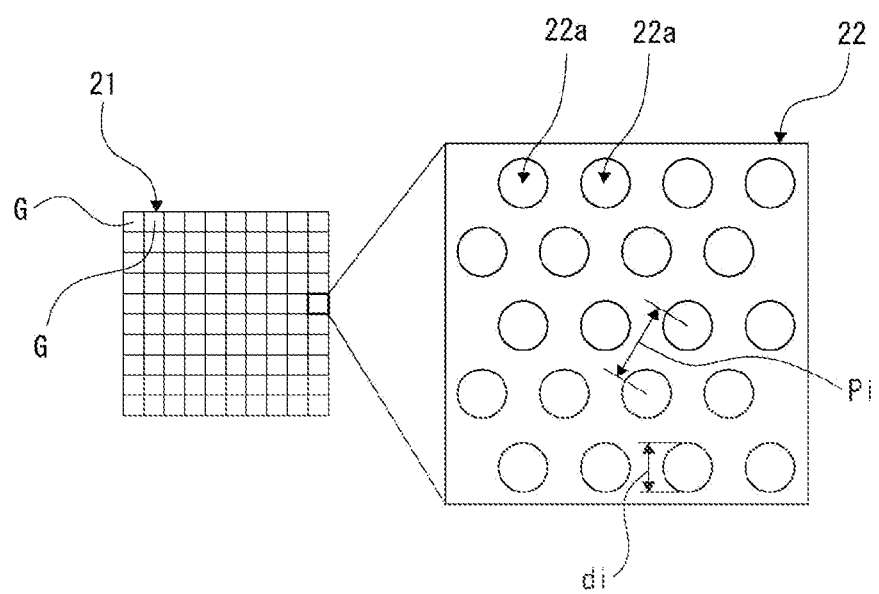
FIG. 5 is an explanatory diagram depicting a general configuration of a light source spectral sensor which obtains a wavelength spectrum by using a principle of surface plasmon resonance.

FIG. 5 is an explanatory diagram depicting a general configuration of the light source spectral sensor 2 which obtains a wavelength spectrum by using the principle of surface plasmon resonance.

As depicted in the figure, the light source spectral sensor 2 includes an image sensor 21. The image sensor 21 is an image sensor of a CMOS type, a CCD type, or the like, for example, and includes multiple pixels G which are two-dimensionally arranged and have a light reception element (photoelectric conversion element) such as a photodiode.

In this case, a plasmon resonance filter 22 depicted in an enlarged manner in the figure is provided as an on-chip color filter formed on each of the pixels G. The plasmon resonance filter 22 has several tens to several hundreds of holes 22a which each have a hole diameter di of approximately several nanometers and are formed in one metal plate, and is capable of setting a wavelength band of light transmittable at each of the pixels G, by controlling the hole diameter di of the holes 22a and a pitch pi which is a formation pitch of the holes 22a.

According to the present example, n (n: 2 or larger natural number) different types of combinations of the hole diameter di and the pitch pi are prepared for the plasmon resonance filter 22 formed for each of the pixels G. The plasmon resonance filters 22 of these n types are two-dimensionally arranged in accordance with a predetermined rule.

With use of the image sensor 21 where the plasmon resonance filters 22 described above are provided, spectral images of more types of wavelengths than n types can be generated by postprocessing for captured image signals. Specific procedures are as follows. First, demosaic processing is performed for a captured image signal indicating a Row image read from the image sensor 21, to synthesize respective images of n types of wavelengths. Thereafter, inverse matrix arithmetic processing is performed for a synthetic image thus obtained, to generate a spectral image for each of more types (assumed as m types) of wavelengths than n types.

As an example, m=48 can be set when n=8, for example.

According to the present example, it is assumed that the postprocessing described above (at least the inverse matrix arithmetic processing) is performed by the arithmetic section 4 (see a light source spectrum acquisition section 10 described below).

Here, the inverse matrix arithmetic processing described above can change a wavelength of a spectral image to be generated, by changing a parameter used for processing. Accordingly, by setting a parameter corresponding to wavelength spectral characteristics of the multispectral camera 3 side for this parameter, wavelength spectral characteristics of the light source spectral sensor 2 side can be equalized with the wavelength spectral characteristics of the multispectral camera 3 side.

According to the present example, such adjustment of the spectral characteristics of the light source spectral sensor 2 on the basis of parameter setting of the inverse matrix arithmetic processing is performed not during actual use of the device, but as pre-adjustment before plant shipment, for example. Specific procedures are as follows, for example. First, spectral characteristics of the light source spectral sensor 2 are designed according to spectral characteristics of the multispectral camera 3 determined in a design phase. Specifically, the hole diameter di, the pitch pi, and the like of the plasmon resonance filter 22 are designed. When the multispectral camera 3 is actually produced by mass production in a subsequent step, spectral characteristics vary for each product. At this time, the spectral characteristics of the multispectral camera 3 to be used are examined for each product of the imaging device 1, and a parameter of inverse matrix arithmetic processing for obtaining spectral characteristics agreeing with the examined spectral characteristics is obtained by calculation or other methods. Thereafter, this parameter is stored in the imaging device 1.

At the time of actual use of the imaging device 1, inverse matrix arithmetic operation is performed by using the parameter thus stored. In this manner, the spectral characteristics of the light source spectral sensor 2 side are equalized with the spectral characteristics of the multispectral camera 3 side.

Here, a difference between the spectral characteristics of the light source spectral sensor 2 side and the spectral characteristics of the multispectral camera 3 side can be produced by an effect of temperature during actual use even if these spectral characteristics are equalized by the pre-adjustment described above. Particularly in the present example, the light source spectral sensor 2 provided in such a manner as to face the direction that is directly thereabove is likely to be exposed to light from the sun as the light source, while the multispectral camera 3 is provided in the direction opposite to the light source spectral sensor 2. Accordingly, a temperature difference is likely to be produced between the light source spectral sensor 2 and the multispectral camera 3, and therefore, a difference in spectral characteristics tends to be easily produced between these according to this temperature difference.

According to the present example, therefore, the temperature detection section 5 described above is provided to perform a process for correcting the spectral characteristics of the light source spectral sensor 2 side (temperature compensation processing) on the basis of a temperature of the multispectral camera 3 and a temperature of the light source spectral sensor 2.

This temperature compensation processing is performed by adjusting the parameter of the inverse matrix arithmetic processing. Specifically, the arithmetic section 4 adjusts the parameter of the inverse matrix arithmetic processing on the basis of each detected temperature information associated with the multispectral camera 3 and the light source spectral sensor 2 and obtained from the temperature detection section 5, in such a manner as to correct the difference in spectral characteristics produced by these temperatures of the multispectral camera 3 and the light source spectral sensor 2.

Figure 6:
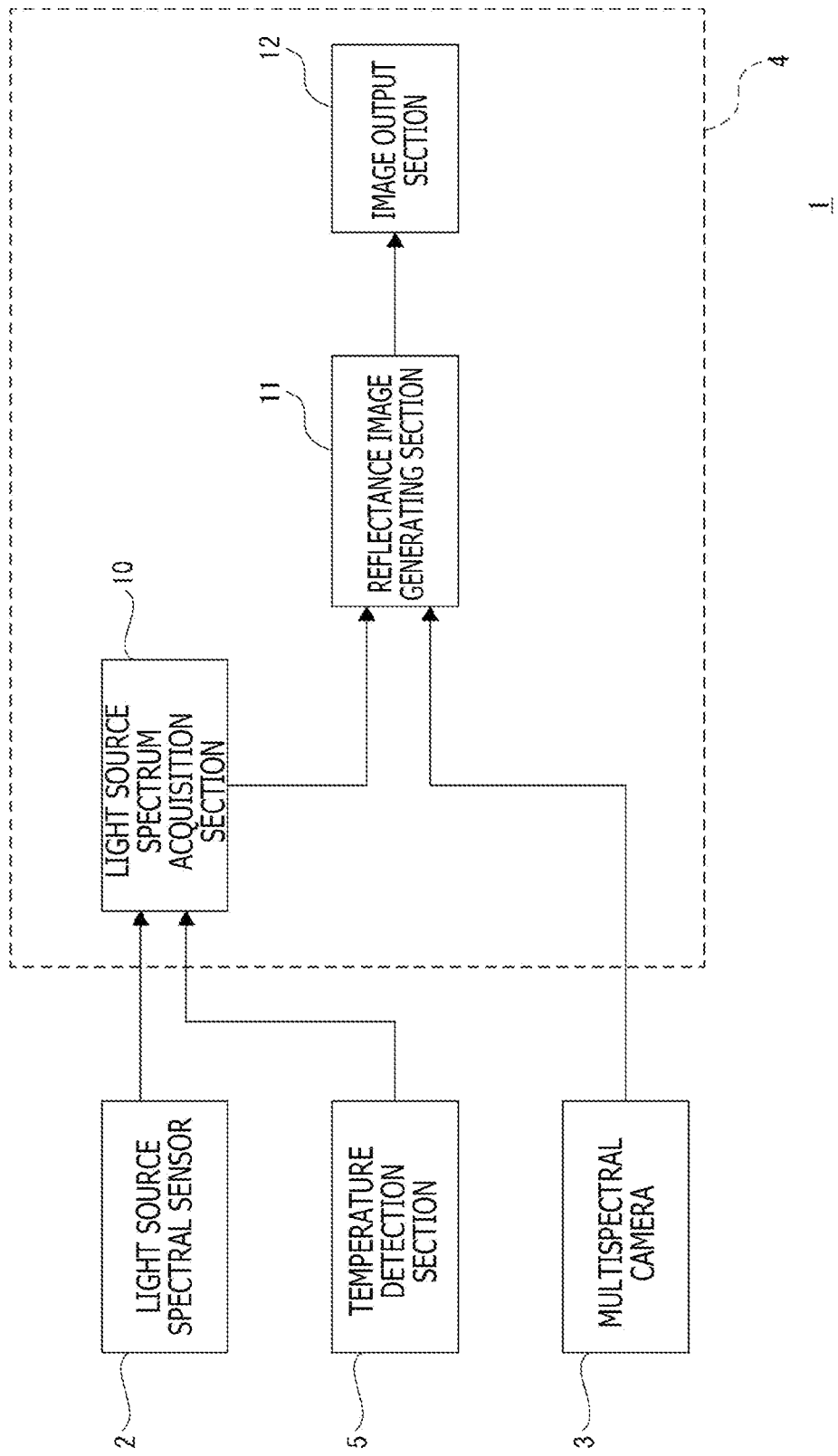
FIG. 6 is a diagram for explaining functions of the imaging device as the first embodiment.

FIG. 6 is a diagram for explaining functions of the arithmetic section 4 as the first embodiment.

As depicted in the figure, the arithmetic section 4 has functions of the light source spectrum acquisition section 10, a reflectance image generating section 11, and an image output section 12.

Note that presented by way of example herein will be a case where processes performed by the light source spectrum acquisition section 10, the reflectance image generating section 11, and the image output section 12 described above are implemented by software processing with use of a computer constituting the arithmetic section 4. However, also adoptable is such a configuration where at least some of the processes of these sections are implemented by hardware processing.

The light source spectrum acquisition section 10 acquires a spectrum of the light source on the basis of a captured image signal input from the light source spectral sensor 2. Specifically, the light source spectrum acquisition section 10 acquires a spectral image of the light source.

The light source spectrum acquisition section 10 according to the present example performs the demosaic processing and the inverse matrix arithmetic processing described above for a captured image signal (Raw data) received from the light source spectral sensor 2, to obtain a spectral image of the light source. At this time, the light source spectrum acquisition section 10 performs the inverse matrix arithmetic processing by using the parameter calculated beforehand according to the spectral characteristics of the multispectral camera 3 as described above. This processing corresponds to a process for equalizing the spectral characteristics of the light source spectral sensor 2 side with the spectral characteristics of the multispectral camera 3 side.

Moreover, the light source spectrum acquisition section 10 adjusts the parameter of the inverse matrix arithmetic processing on the basis of each detected temperature information associated with the multispectral camera 3 and the light source spectral sensor 2 and obtained from the temperature detection section 5, in such a manner as to correct a difference in spectral characteristics produced by the temperatures of the multispectral camera 3 and the light source spectral sensor 2.

In this manner, the spectral characteristics difference produced between the multispectral camera 3 and the light source spectral sensor 2 by the temperature difference between these can be corrected.

The reflectance image generating section 11 generates a reflectance image for each wavelength on the basis of spectral images obtained by the multispectral camera 3 and spectral images associated with the light source and obtained by the light source spectrum acquisition section 10. The reflectance image herein refers to an image obtained by calculating the spectral reflectance $R(\lambda)$, which is explained with reference to FIG. 2, for each predetermined unit part in a spectral image (a spectral image captured by the multispectral camera 3), such as a pixel unit.

The reflectance image generating section 11 according to the present example acquires a light detection value (luminance value) for each wavelength on the basis of respective spectral images associated with the light source and obtained by the light source spectrum acquisition section 10. Thereafter, the reflectance image generating section 11 performs arithmetic operation for light detection values (luminance values) of respective pixels according to the calculation formula in FIG. 2 for wavelengths for the respective spectral images captured by the multispectral camera 3, by using the light detection values acquired for the light source for each wavelength as described above, to obtain the spectral reflectance $R(\lambda)$ for each pixel. In this manner, a reflectance image can be obtained for each wavelength.

The image output section 12 outputs the reflectance image for each wavelength generated by the reflectance image generating section 11 to an external device of the imaging device 1. Specifically, the image output section 12 according to the present example outputs the reflectance image for each wavelength to the information processing device 100 via the communication section 6.

Note that described above is the example where the light source spectrum acquisition section 10 performs both the demosaic processing and the inverse matrix arithmetic processing. However, there can be adopted a configuration in which only processes up to the demosaic processing are performed by the light source spectral sensor 2 side and the inverse matrix arithmetic processing for the images obtained after the demosaic processing is performed by the light source spectrum acquisition section 10.

2. Second Embodiment

A second embodiment will next be described.

The second embodiment is an example of measures taken against angle dependence of a spectrum of the irradiation light $I(\lambda)$ coming from the light source.

Figure 7:
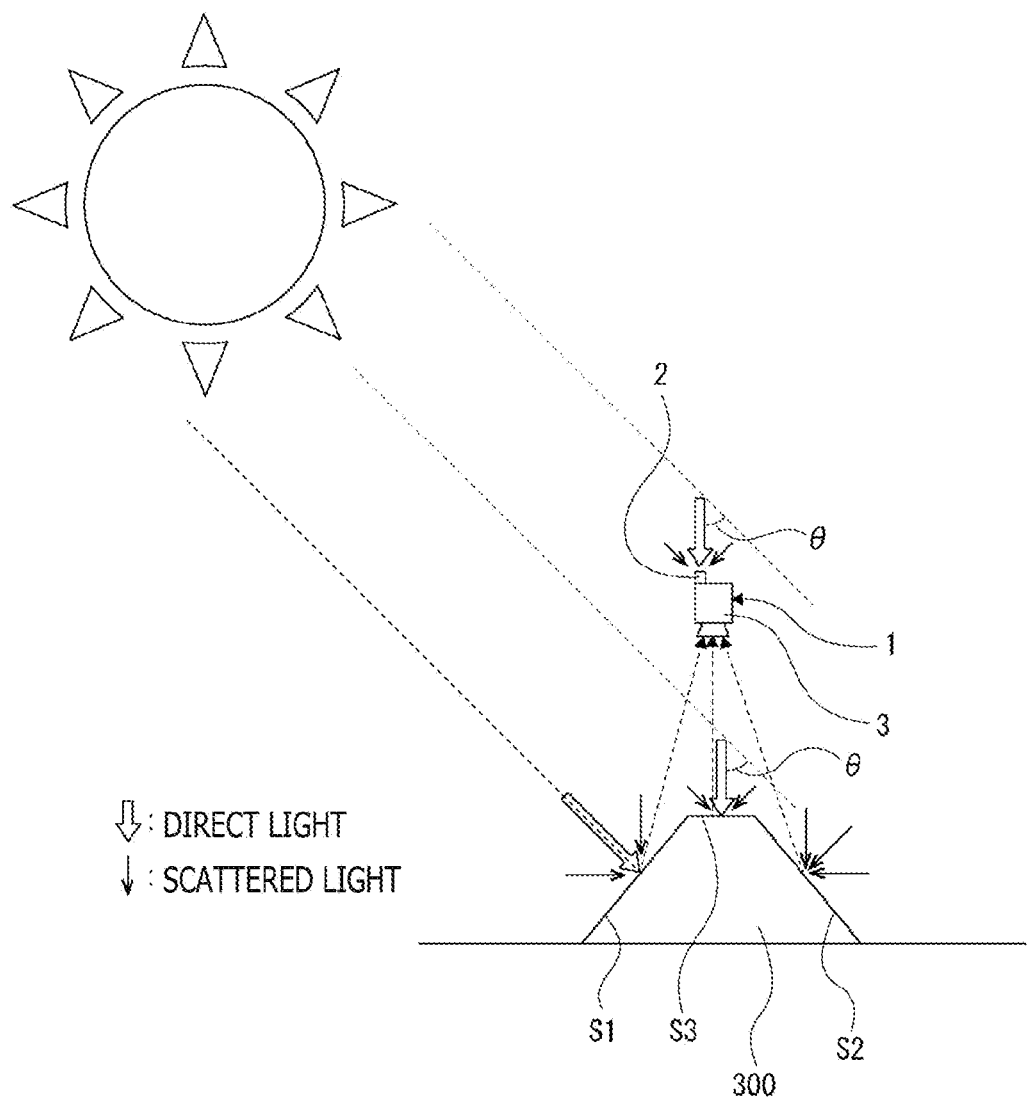
FIG. 7 is an explanatory diagram depicting a problem caused by angle dependence of a spectrum of irradiation light coming from a light source.

FIG. 7 is an explanatory diagram illustrating a problem caused by angle dependence of the spectrum of the irradiation light $I(\lambda)$.

For example, concerning sunlight, a light source spectrum varies according to a light coming direction. This means that a light detection value of the irradiation light $I(\lambda)$ of a certain wavelength can vary according to a light coming direction.

Specifically, concerning the measurement target 300, irradiation light coming from the light source to a surface facing the sun corresponding to the light source (e.g., a surface facing to the south) is mainly direct light, while irradiation light reaching a surface not facing the sun (e.g., a surface facing to the north) is mainly scattered light.

Figure 8A:
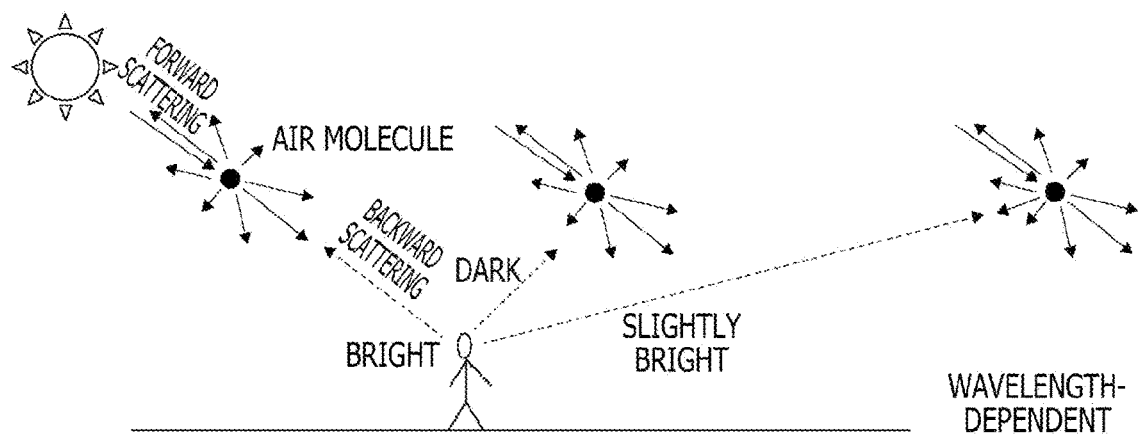
FIGS. 8A and 8B are explanatory diagrams depicting scattered light.
Figure 8B:
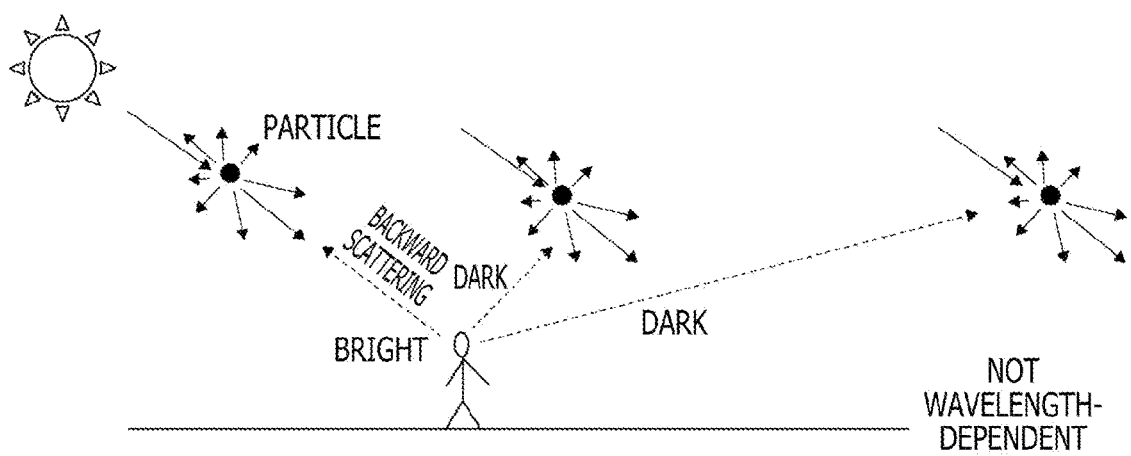

Scattered light will be touched upon herein for confirmation with reference to FIGS. 8A and 8B.

Scattered light includes light scattered by Rayleigh scattering as depicted in FIG. 8A and light scattered by Mie scattering as depicted in FIG. 8B. Rayleigh scattering depicted in FIG. 8A is produced by air molecules, and causes intensive forward scattering and intensive backward scattering. For example, when the sky is viewed in a direction at 90 degrees to sunlight (direct light) in an environment where the air is clear, the sky looks dark. However, when the viewing direction is shifted from this direction to a direction closer to the sun (e.g., a direction at 20 degrees to sunlight) and to a direction away from the sun (e.g., a direction at 120 degrees to sunlight), the sky looks bright. This is a phenomenon caused by Rayleigh scattering.

Mie scattering depicted in FIG. 8B is produced by microparticles floating in the atmosphere. Observation of Mie scattering becomes easier as the number of microparticles increases. Mie scattering causes intensive forward scattering, and does not exhibit wavelength dependence. Accordingly, when observation is made with the sun shielded by a shielding member such as a sunlight shield board as depicted in the figure, a relatively wide range around a portion where the sun is located looks glaring and white.

For example, for the measurement target 300 having such a shape as depicted in FIG. 7 by way of example, light reaching a surface S1 which is a surface facing the sun is mainly direct light, while light reaching a surface S2 which is a surface not facing the sun is mainly scattered light.

Suppose herein that the measurement target 300 has a surface S3 facing the side that is directly thereabove as depicted in the example in the figure. In this case, irradiation light applied to the surface S3 has the same spectrum as that of irradiation light applied to the light source spectral sensor 2 similarly facing the side that is directly thereabove (i.e., the same light detection value for each wavelength). In this case, the light detection value of irradiation light applied to each of the light source spectral sensor 2 and the surface S3 can be represented by a value calculated by adding a value of scattered light to a value of a direct light component remaining after attenuation by an amount corresponding to an angle $\theta$ (an angle formed by sunlight and a horizontal plane) from direct light reaching the surface S1.

In the case depicted in FIG. 7, the light source spectral sensor 2 is allowed to acquire the light detection value of the irradiation light applied to the surface S3. Accordingly, with use of the calculation of the spectral reflectance $R(\lambda)$, a correct value can be calculated for the surface S3, but not for each of the surfaces S1 and S2.

According to the present embodiment, therefore, an evaluation index value is calculated in consideration of the direction of the irradiation light $I(\lambda)$. Specifically, a method adopted in the second embodiment roughly divides the direction of the irradiation light $I(\lambda)$ into a direction of the irradiation light $I(\lambda)$ containing a direct light component and a direction of the irradiation light $I(\lambda)$ containing not the direct light component but a scattered light component. This method roughly divides the measurement target 300 into a direct light surface corresponding to a surface to which light containing the direct light component is applied (the surfaces S1 and S3 in FIG. 7) and a scattered light surface corresponding to a surface to which scattered light not containing the direct light component is applied (the surface S2 in FIG. 7), and separately calculates an evaluation index value for each of these two types of surfaces which are the direct light surface and the scattered light surface.

Note that, in the following description, it is assumed that the light source is the sun. In addition, the direct light surface described above will be referred to as a "sunny surface," while the scattered light surface will be referred to as a "shade surface."

Moreover, a term "direction" will be used concerning irradiation light coming from the light source in the present description. This term "direction" refers to any direction in a three-dimensional space, and is defined by an azimuth and an angle to a horizontal plane.

Figure 9:
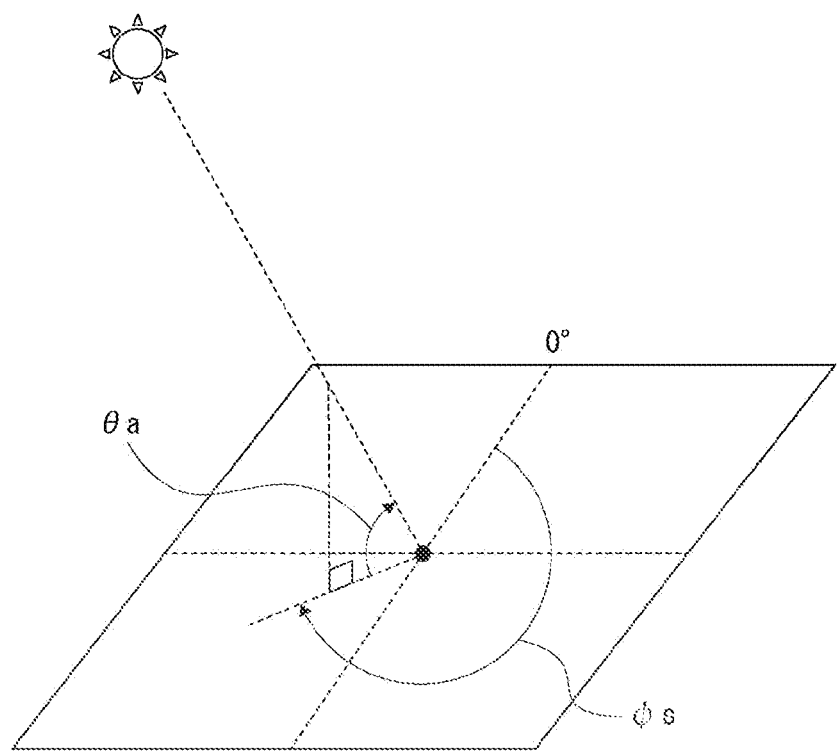
FIG. 9 is an explanatory diagram depicting a solar altitude and a solar azimuth.

Further, terms "solar altitude θa" and "solar azimuth φs" will be used concerning the sun as the light source in the following description. As depicted in FIG. 9, the solar altitude θa refers to an angle formed by the horizontal plane and a straight line connecting a certain observation point (indicated by a black circle in the figure) in the horizontal plane and the sun. The solar azimuth φs refers to an azimuth where the sun is positioned as viewed from the observation point, and is represented by an angle within the horizontal plane from a reference azimuth ("0 degrees" in the figure) defined in the horizontal plane.

Here, the sunny surface and the shade surface of the measurement target 300 can be identified on the basis of an image captured by the multispectral camera 3.

Figure 10A:
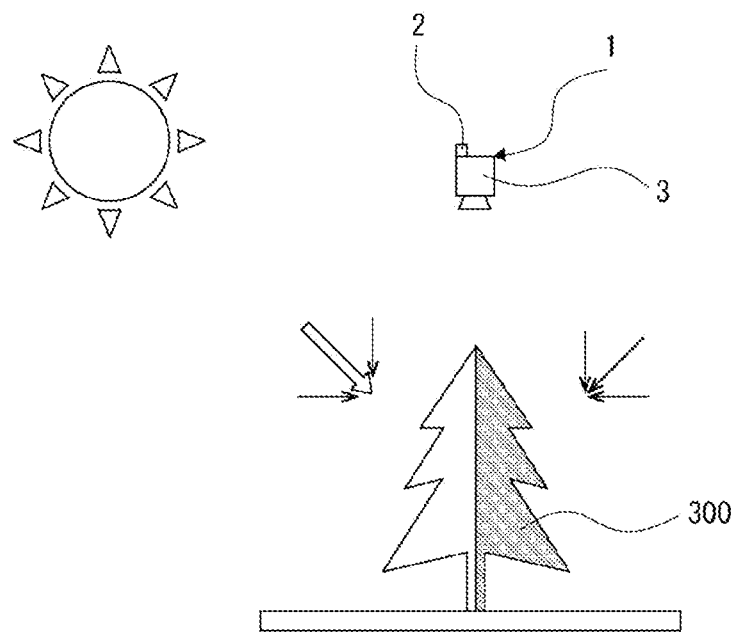
FIGS. 10A and 10B are explanatory diagrams depicting an example of an identification method between a sunny surface and a shade surface.
Figure 10B:
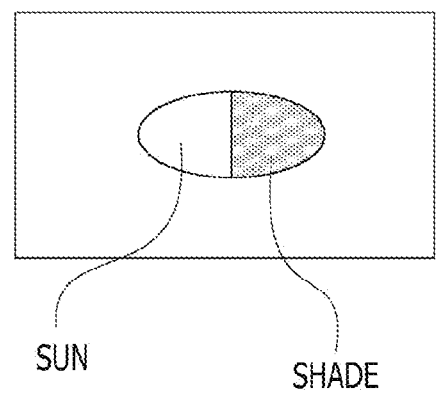

FIGS. 10A and 10B are explanatory diagrams depicting this identification. FIG. 10A depicts a state where an image of the measurement target 300 illuminated by the sun is captured by the multispectral camera 3, while FIG. 10B is a schematic diagram of a spectral image obtained by this imaging.

A sunny part has a higher light detection value (assumed as a luminance value herein) than a light detection value of a shade part. Accordingly, a pixel having a fixed luminance value or higher can be identified as a pixel of a sunny part, while a pixel not having the fixed luminance value or higher can be identified as a pixel of a shade part, on the basis of the image captured by the multispectral camera 3.

Moreover, in a case where the method for rough division into the sunny surface and the shade surface is adopted, the light source spectral sensor 2 requires at least such a configuration capable of separately detecting the irradiation light I(λ) on the sunny side containing a direct light component and the irradiation light I(λ) on the shade side containing not a direct light component but scattered light.

Figure 11:
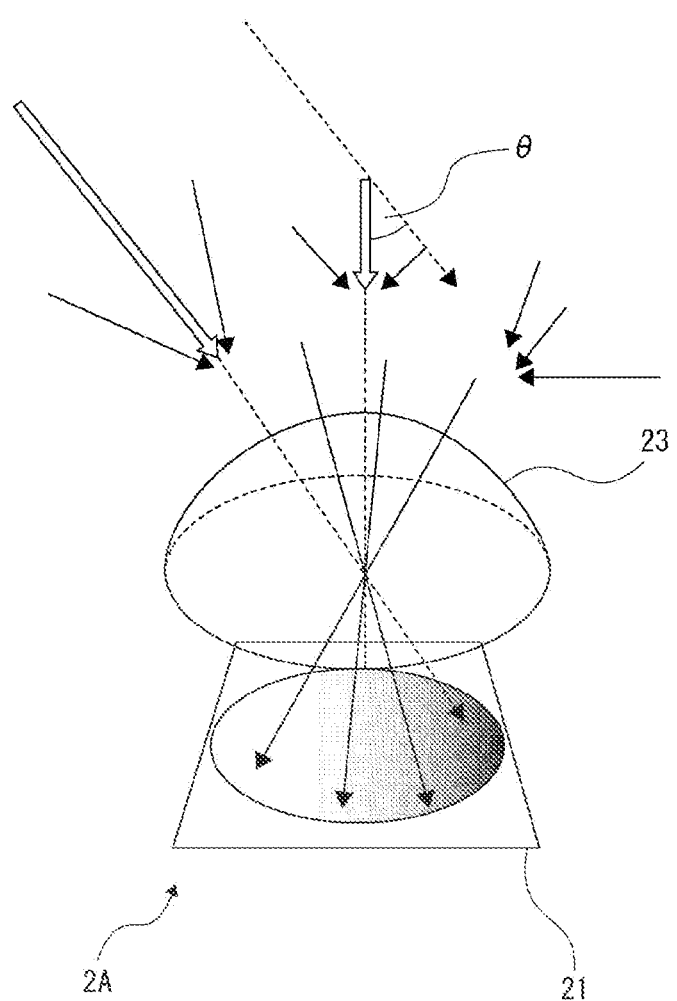
FIG. 11 is a perspective diagram schematically depicting a structure example of a light source spectral sensor according to a second embodiment.

Accordingly, a light source spectral sensor 2A schematically depicted in a perspective diagram of FIG. 11 is adopted in the second embodiment.

The light source spectral sensor 2A also includes a two-dimensional image sensor as the image sensor 21 similarly to the light source spectral sensor 2. The two-dimensional image sensor herein refers to an image sensor including a light reception section where multiple light reception elements (light source conversion elements) are two-dimensionally arranged.

The light source spectral sensor 2A is different from the light source spectral sensor 2 in that the imaging optical system includes a fish-eye lens 23. In this case, rays of irradiation light I(λ) coming in from respective directions enter the image sensor 21 via the fish-eye lens 23.

Note that the light source spectral sensor 2A is similar to the light source spectral sensor 2 in that the plasmon resonance filter 22 described above is provided.

With use of the image sensor 21 as a two-dimensional image sensor, rays of light coming in from respective directions in a three-dimensional space can be projected to different positions in a two-dimensional plane corresponding to a light reception surface of the image sensor 21.

Figure 12:
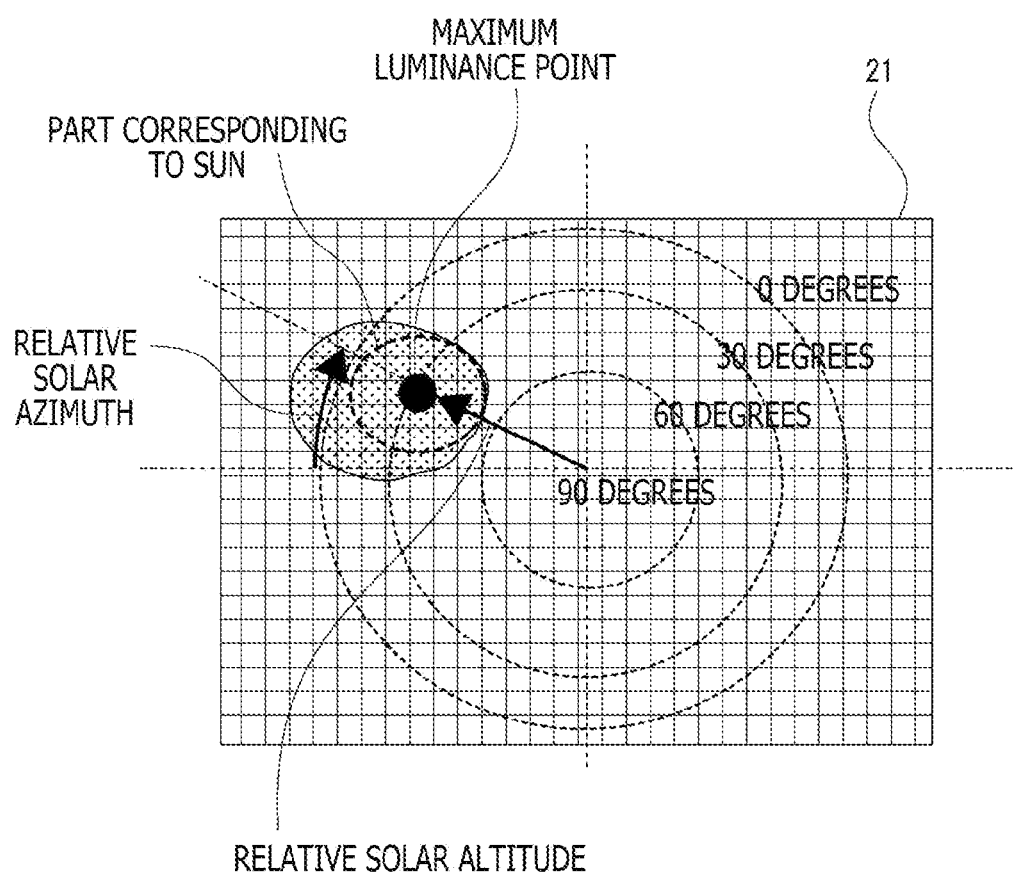
FIG. 12 is a diagram depicting an example of a projection image on an image sensor included in the light source spectral sensor according to the second embodiment.

FIG. 12 depicts an example of an image projected on the image sensor 21.

A difference in angle to the horizontal plane is represented in an image height direction of the image sensor 21. Specifically, the irradiation light I(λ) coming from directly above (90 degrees) is received at a center of the image sensor 21. The irradiation light I(λ) having a smaller angle is received as a distance from this center becomes longer.

Moreover, an azimuth difference is represented in a circumferential direction around a center located at an optical axis (a center of the light reception surface) of the image sensor 21.

At this time, an angle of view is enlarged by use of the fish-eye lens 23. Accordingly, an identifiable range of the direction of the irradiation light I(λ) can be widened. For example, if the angle of view of the fish-eye lens 23 is 180 degrees, directions of rays of irradiation light coming in from any directions in the horizontal plane can be identified.

Further, the present example which uses the fish-eye lens 23 adopts equidistance projection where a distance from the center in the reception surface is proportional to an angle.

In a case of imaging by the light source spectral sensor 2A, a maximum luminance point indicated by a black circle in the figure can be estimated as a position where the irradiation light I(λ) coming in from a direction including the position of the sun is received. At this time, a distance from the center of the light reception surface of the image sensor 21 to this maximum luminance point represents a relative solar altitude, while the position of this maximum luminance point in the circumferential direction around the center located at the optical axis of the image sensor 21 represents a relative solar direction.

The term "relative" is used herein in consideration that the direction of the imaging device 1 is variable. These relative solar altitude and solar direction are distinguished from absolute solar altitude θa and solar azimuth φs.

Moreover, a high luminance area in a fixed range from the maximum luminance point can be considered as an area corresponding to a sunny part. Accordingly, for calculation of the spectral reflectance R(λ) of a part identified as the sunny part of the measurement target 300, it is sufficient if a luminance value of this area corresponding to the sunny part is applied.

Figure 13:
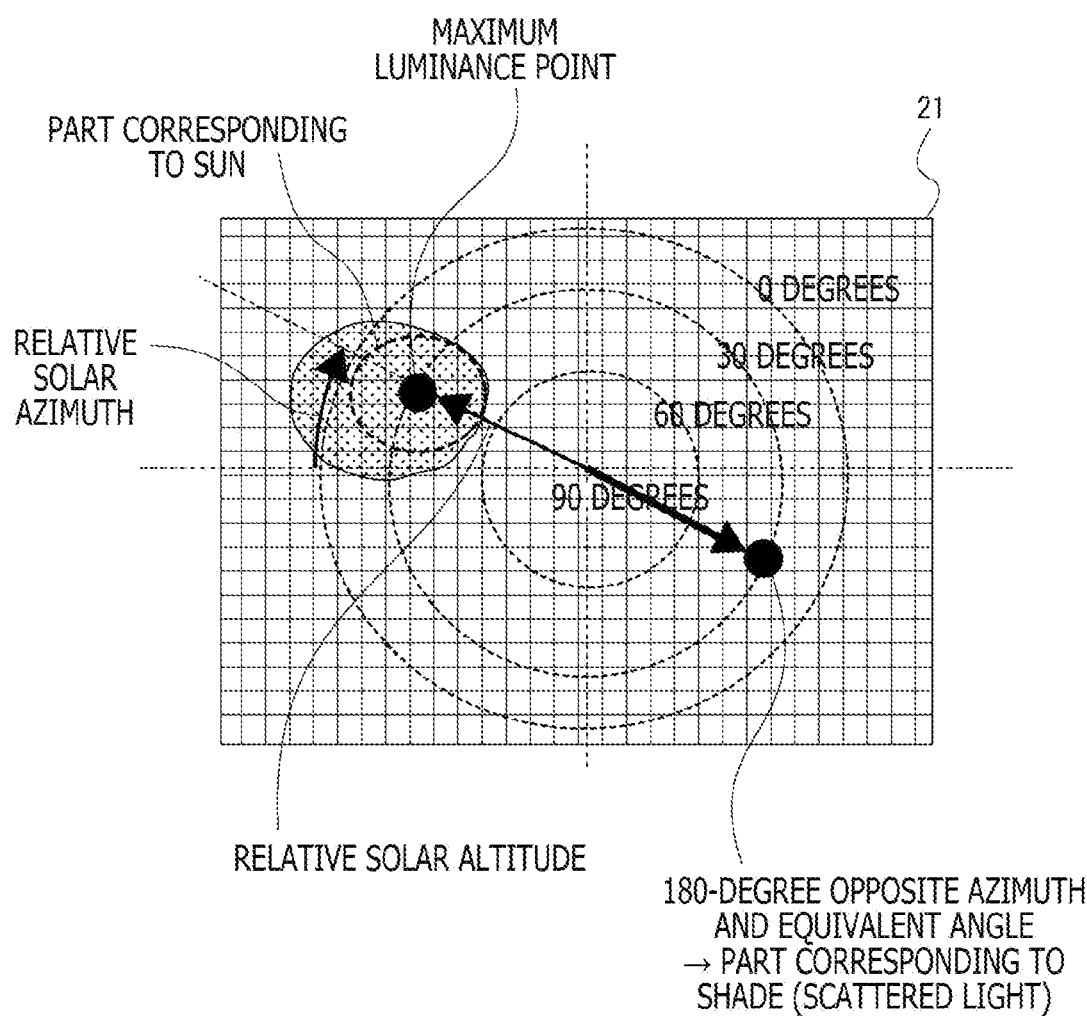
FIG. 13 is an explanatory diagram depicting an example of acquisition of a luminance value of a shade part.

Meanwhile, a luminance value of the shade part can be obtained on the basis of a luminance value of a position which has an azimuth different from that of the maximum luminance point by 180 degrees (i.e., on the opposite side) and has an equivalent angle, as depicted in FIG. 13, for example.

It can be considered herein to adopt a method which designates the luminance value of the shade part as an average luminance value in a region within a fixed range around a center located at a position which has an azimuth different from that of the maximum luminance point by 180 degrees (i.e., on the opposite side) and has the same angle, as described above.

Alternatively, the luminance value of the shade part can be varied according to a relative solar altitude. According to the present example, for example, the luminance value of the shade part is switched according to whether or not the relative solar altitude has a fixed value or higher. Specifically, division is made according to whether or not the relative solar altitude is 70 degrees or larger, for example. In a case where the relative solar altitude is not 70 degrees or larger, a luminance value of a position which has an azimuth different from that of the maximum luminance point by 180 degrees and has the same angle is used. In a case where the relative solar altitude is 70 degrees or larger, a luminance value of a position which has an azimuth different from that of the maximum luminance point by 180 degrees and has an angle smaller than that of the maximum luminance point by a predetermined value is used. For example, the predetermined value herein can be set to 30 degrees.

As can be understood from the above description, the sunny part and the shade part of the measurement target 300 can be identified on the basis of an image captured by the multispectral camera 3. In addition, a light detection value of the irradiation light $I(\lambda)$ of each of the sunny part and the shade part can be obtained on the basis of a spectral image acquired by imaging with use of the light source spectral sensor 2A.

In this case, for calculating the spectral reflectance $R(\lambda)$ concerning a spectral image captured by the multispectral camera 3, the spectral reflectance $R(\lambda)$ of a pixel corresponding to the sunny part is calculated with use of a light detection value of the irradiation light $I(\lambda)$ of the sunny part, while the spectral reflectance $R(\lambda)$ of a pixel corresponding to the shade part is calculated with use of a light detection value of the irradiation light $I(\lambda)$ of the shade part.

Described next will be a configuration of an imaging device 1A for implementing an evaluation index value calculation method as the second embodiment described above and an example of specific processing procedures.

Figure 14:
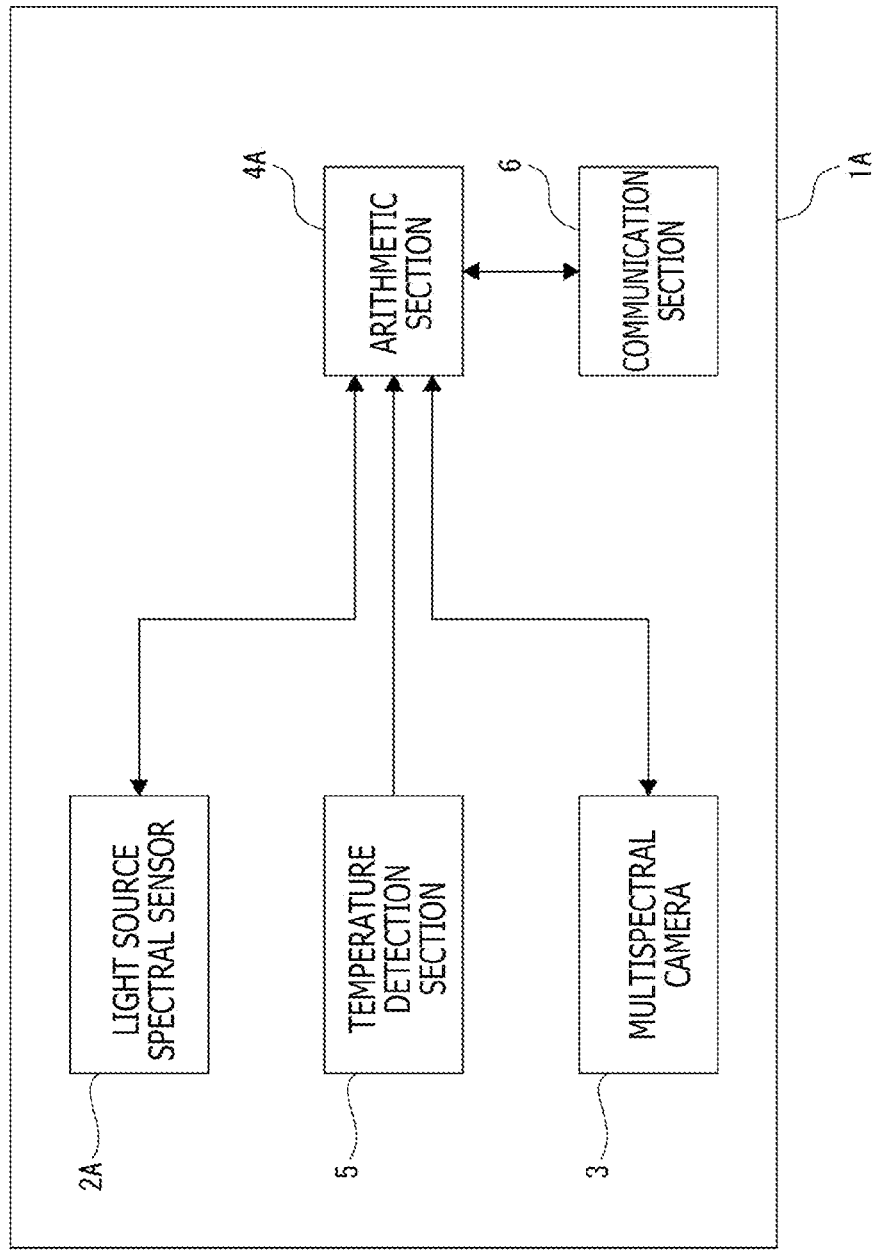
FIG. 14 is a block diagram depicting an internal configuration example of an imaging device as the second embodiment.

FIG. 14 is a block diagram depicting an internal configuration example of the imaging device 1A as the second embodiment.

Note that, in the following description, parts similar to parts already described will be given identical reference numbers and not repeatedly described.

The imaging device 1A is different from the imaging device 1 depicted in FIG. 3 in that the light source spectral sensor 2A is provided instead of the light source spectral sensor 2 and that an arithmetic section 4A is provided instead of the arithmetic section 4.

The light source spectral sensor 2A has already been touched upon, and therefore will not be repeatedly described.

The arithmetic section 4A includes a microcomputer similarly to the arithmetic section 4, and performs processes for generating a spectral reflection image on the basis of a spectrum detection result of the light source obtained by the light source spectral sensor 2A and a wavelength spectral image obtained by the multispectral camera 3 and for controlling the overall imaging device 1A.

Figure 15:
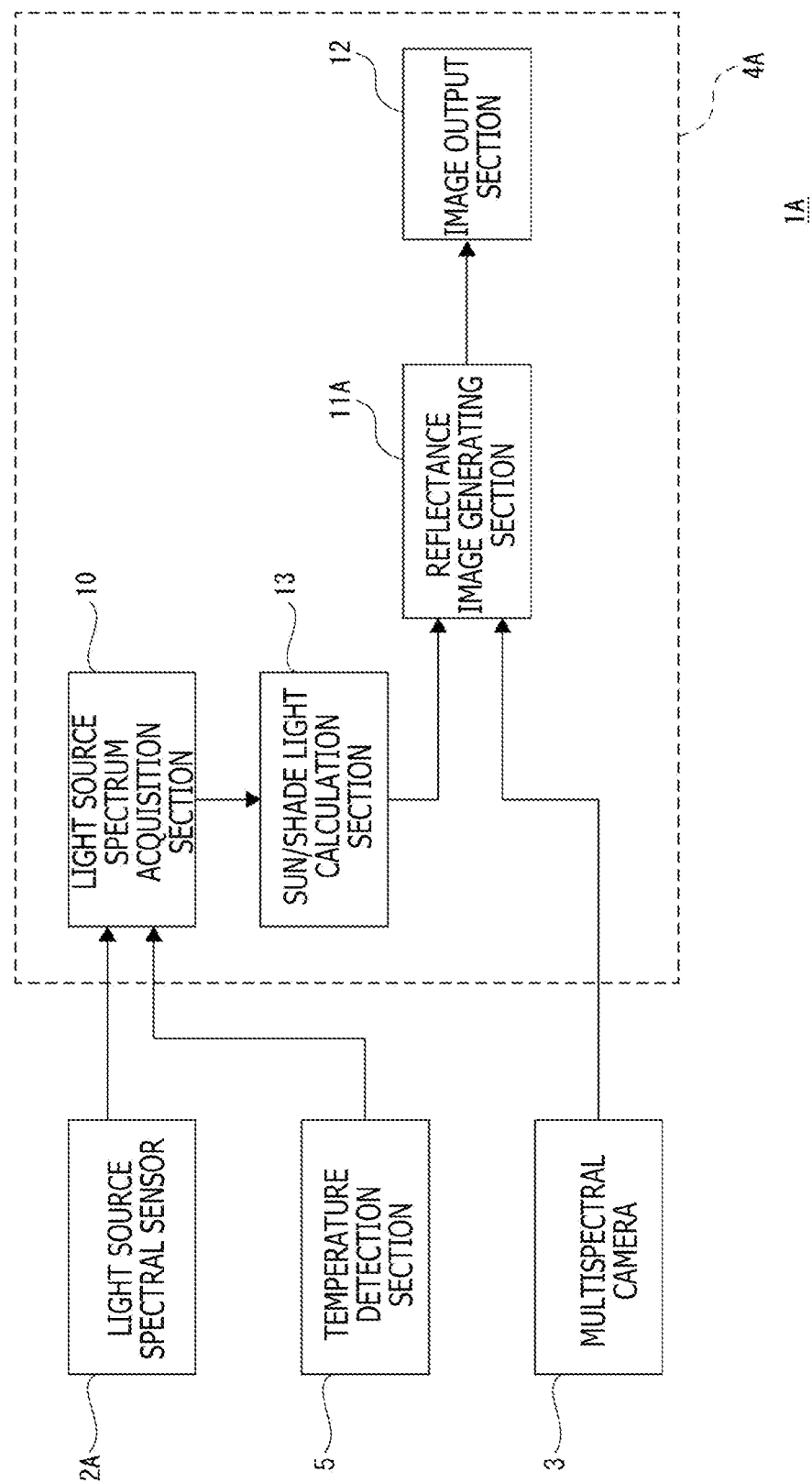
FIG. 15 is a diagram for explaining functions of the imaging device as the second embodiment.

FIG. 15 is a diagram for explaining functions of the arithmetic section 4A as the second embodiment.

The arithmetic section 4A is different from the arithmetic section 4 depicted in FIG. 6 in that a sun/shade light calculation section 13 is provided and that a reflectance image generating section 11A is provided instead of the reflectance image generating section 11.

The sun/shade light calculation section 13 calculates a light detection value (luminance value in the present example) of the irradiation light $I(\lambda)$ of the sunny part and a light detection value (luminance value similarly to the above) of the irradiation light $I(\lambda)$ of the shade part, by using the above method, on the basis of a spectral image of the light source obtained by the light source spectrum acquisition section 10. The light detection value of the irradiation light $I(\lambda)$ of each of the sunny part and the shade part herein is calculated for each spectral wavelength.

The reflectance image generating section 11A generates a reflectance image for each wavelength on the basis of a spectral image captured by the multispectral camera 3 and the light detection value of the irradiation light $I(\lambda)$ of each of the sunny part and the shade part for each wavelength obtained by the sun/shade light calculation section 13. Specifically, the reflectance image generating section 11A performs, for each spectral image (each wavelength), processing for identifying pixels of the sunny part and the shade part by using the above method, on the basis of the spectral image captured by the multispectral camera 3, calculating the spectral reflectance $R(\lambda)$ of each pixel corresponding to the sunny part by using the light detection value of the irradiation light $I(\lambda)$ of the sunny part, and calculating the spectral reflectance $R(\lambda)$ of each pixel corresponding to the shade part by using the light detection value of the irradiation light $I(\lambda)$ of the shade part.

Figure 16:
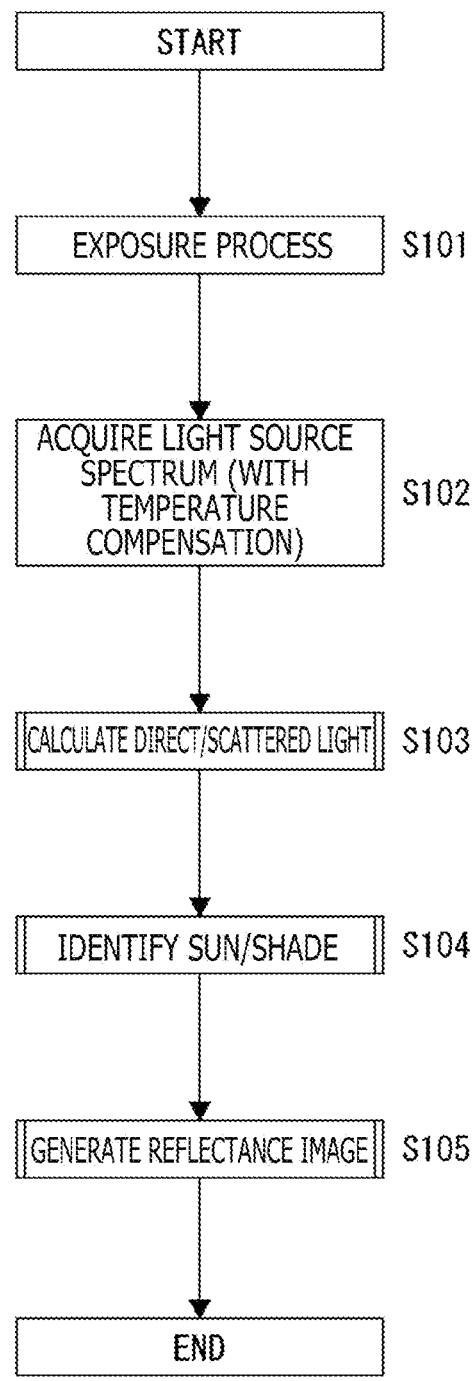
FIG. 16 is a flowchart illustrating an example of processing procedures for achieving an evaluation index value calculation method as the second embodiment.

FIG. 16 is a flowchart illustrating an example of specific processing procedures to be executed by the arithmetic section 4A for achieving the evaluation index value calculation method as the second embodiment.

First, the arithmetic section 4A executes an exposure process in step S101. This exposure process is a process for causing both the multispectral camera 3 and the light source spectral sensor 2A to execute an exposure operation.

In step S102 subsequent to step S101, the arithmetic section 4A performs a light source spectrum acquisition process. This is a process that is performed by the light source spectrum acquisition section 10 and that includes inverse matrix arithmetic processing for obtaining spectral characteristics agreeing with spectral characteristics of the multispectral camera 3 side as described in the first embodiment. Moreover, this process is a process also including a temperature compensation processing described in the first embodiment.

In step S103 subsequent to step S102, the arithmetic section 4A performs a direct/scattered light calculation process. This is a process performed by the sun/shade light calculation section 13 described above.

Figure 17:
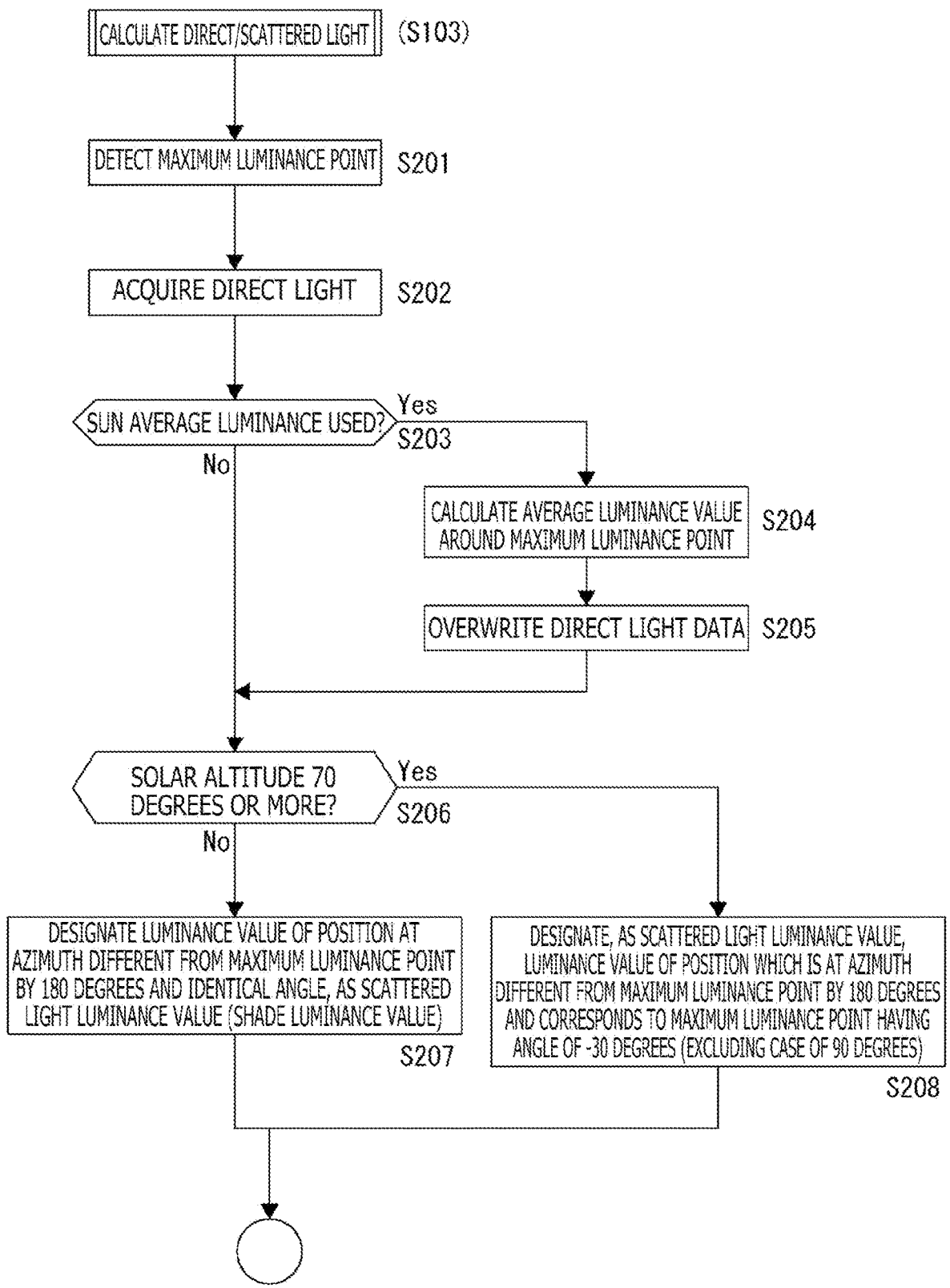
FIG. 17 is a flowchart illustrating a direct/scattered light calculation process illustrated in FIG. 16.

FIG. 17 is a flowchart illustrating the direct/scattered light calculation process in step S103.

First, the arithmetic section 4A in step S201 performs, as a maximum luminance point detection process, a process for detecting a maximum luminance point on the basis of a light source spectral image obtained in the light source spectrum acquisition process in step S102.

Thereafter, the arithmetic section 4A performs a direct light acquisition process in subsequent step S202. This is a process for acquiring a luminance value at the maximum luminance point. In step S202, the luminance value at the maximum luminance point is acquired for each wavelength.

In step S203 subsequent to step S202, the arithmetic section 4A determines whether or not to use a sun average luminance.

In a case where the sun average luminance is determined to be used, the arithmetic section 4A advances the process to step S204 to calculate an average luminance value around the maximum luminance point, and overwrites direct light data in subsequent step S205. Specifically, the arithmetic section 4A overwrites data that is acquired in step S202 and that indicates the luminance value at the maximum luminance point with data of the average luminance value. The average luminance value calculated herein is a luminance average value of pixels in an image region within a fixed range from the maximum luminance point (e.g., a range of ±15 degrees for both the azimuth and the angle).

In response to completion of execution of the overwriting process in step S205, the arithmetic section 4A advances the process to step S206.

Note that the processing in each of steps S204 and S205 is also performed for each wavelength.

Moreover, in a case where the sun average luminance is determined, in step S203, not to be used, the arithmetic section 4A skips the processing in steps S204 and S205 and advances the process to step S206.

In step S206, the arithmetic section 4A determines whether or not a solar altitude (relative solar altitude) is 70 degrees or larger. If the solar altitude is not 70 degrees or larger, the arithmetic section 4A advances the process to step S207 to perform a process for designating a luminance value at a position which has an azimuth different from that of the maximum luminance point by 180 degrees and has an identical angle, as a scattered light luminance value, i.e., a luminance value of the irradiation light $I(\lambda)$ of the shade part, and ends the direct/scattered light calculation process performed in step S103.

On the other hand, if it is determined that the solar altitude is 70 degrees or larger in step S206, the arithmetic section 4A advances the process to step S208 to perform a process for designating, as a scattered light luminance value (luminance value of the irradiation light $I(\lambda)$ of the shade part), a luminance value at a position which is at an azimuth different from that of the maximum luminance point by 180 degrees and corresponds to a maximum luminance point having an angle of −30 degrees, and ends the direct/scattered light calculation process performed in step S103. Here, in a case where the solar altitude is 90 degrees in step S208, the arithmetic section 4A designates, as a scattered light luminance value, a luminance value at a position corresponding to a maximum luminance point having an angle of −30 degrees. In a case where the solar altitude is 70 degrees or larger, the position having an azimuth different from that of the maximum luminance point by 180 degrees is not located in the shade. Accordingly, even in a case where the solar altitude is other than 90 degrees in step S208, the luminance value at the position corresponding to a maximum luminance point having an angle of −30 degrees can be designated as the scattered light luminance value without setting a limit to the azimuth.

Note that the processing in each of steps S207 and S208 is also performed for each wavelength.

In FIG. 16, the arithmetic section 4A executes a sun/shade identification process in step S104 in response to completion of execution of the direct/scattered light calculation process in step S103.

Figure 18:
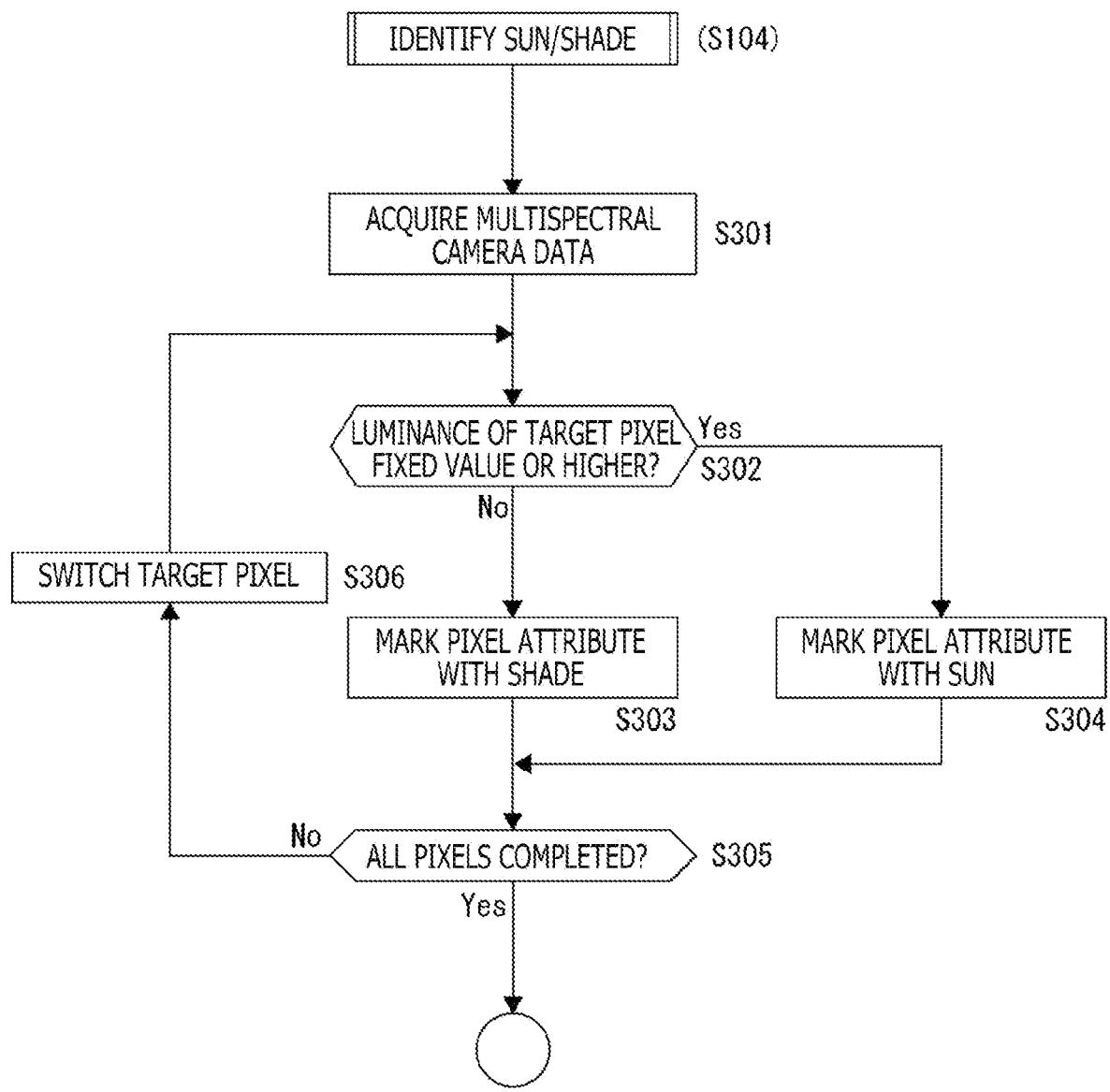
FIG. 18 is a flowchart illustrating a sun/shade identification process illustrated in FIG. 16.

FIG. 18 is a flowchart illustrating the sun/shad identification process in step S104.

In the sun/shade identification process, the arithmetic section 4A performs a process for acquiring multispectral camera data in step S301. Specifically, the arithmetic section 4A acquires a spectral image captured by the multispectral camera 3 in response to the exposure process executed in previous step S101. Here, at least the one spectral image is sufficient for execution of sun/shade identification. In this case, the sun/shade identification process is performed for at least the one spectral image while each of pixels are sequentially selected as a processing target.

In step S302 subsequent to step S301, the arithmetic section 4A determines whether or not a luminance value of the target pixel in the spectral image is a fixed value or higher. If the luminance value is not the fixed value or higher, the arithmetic section 4A marks an attribute of the pixel with "shade" in step S303, and advances the process to step S305. On the other hand, if the luminance value is the fixed value or higher, the arithmetic section 4A marks an attribute of the pixel with "sun" in step S304, and advances the process to step S305.

In step S305, the arithmetic section 4A determines whether or not all pixels are completed. If all pixels are not completed, the arithmetic section 4A switches the target pixel to a next pixel in step S306, and returns the process to step S302. In this manner, identification between the sunny part and the shade part is achieved for each pixel.

In a case of determining in step S305 that all pixels are completed, the arithmetic section 4A ends the sun/shade identification process executed in step S104.

In FIG. 16, the arithmetic section 4A executes a reflectance image generating process in step S105 in response to completion of execution of the sun/shade identification process in step S104. This is a process performed by the reflectance image generating section 11A described above.

Figure 19:
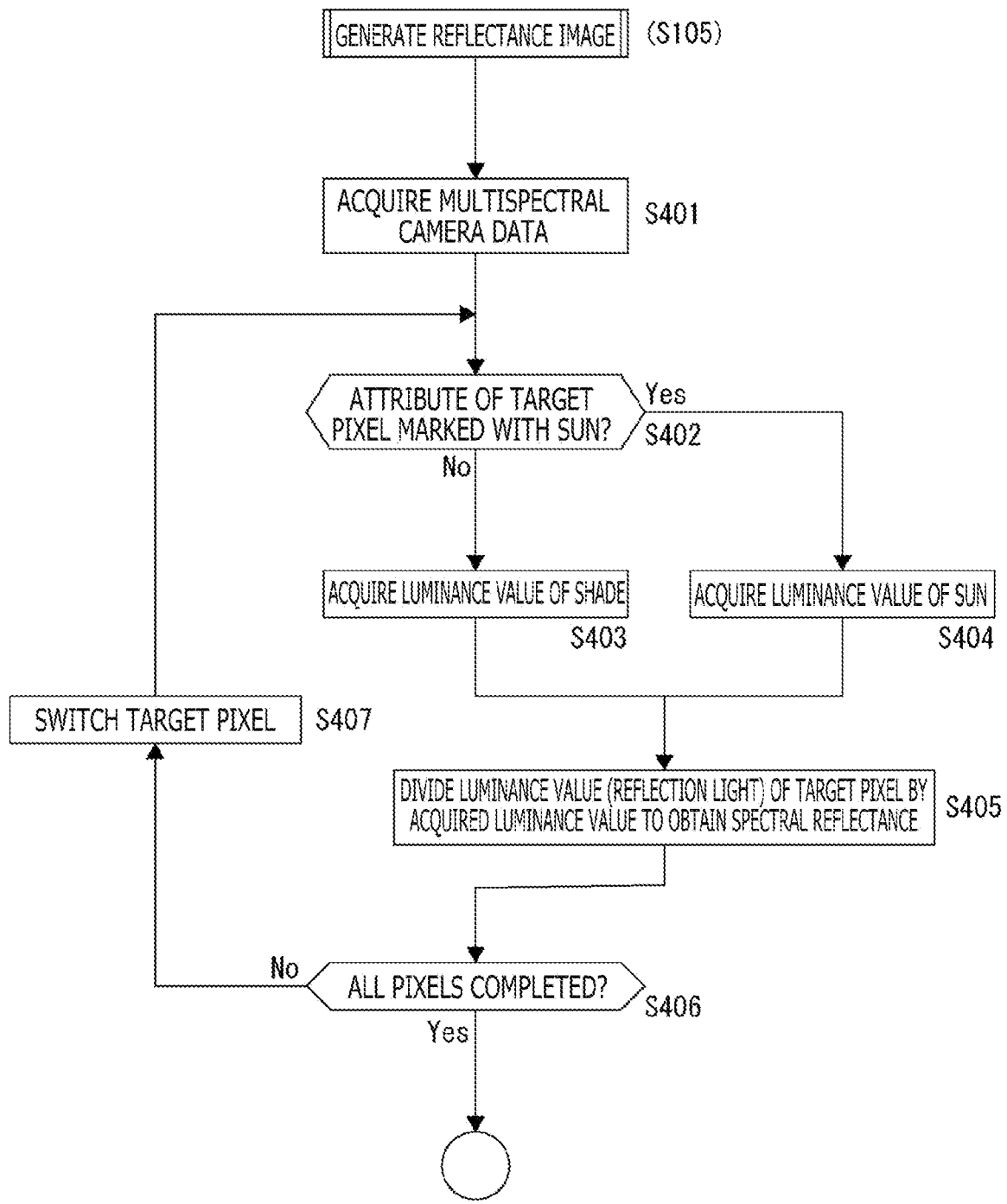
FIG. 19 is a flowchart illustrating a reflectance image generating process illustrated in FIG. 16.

FIG. 19 is a flowchart illustrating the reflectance image generating process in step S105.

First, as a multispectral camera data acquisition process, the arithmetic section 4A in step S401 performs a process for acquiring a spectral image captured by the multispectral camera 3 in response to the exposure process executed in step S101. Here, the reflectance image is generated for each wavelength. The arithmetic section 4A performs processing in step S402 and following steps described below, for each spectral image.

In addition, it is assumed that the processing in this case is performed while each of pixels in acquired spectral images are sequentially selected.

In step S402 subsequent to step S401, the arithmetic section 4A determines whether or not an attribute of the target pixel has the sun mark. In a case where the target pixel does not have the sun mark, the arithmetic section 4A in step S403 acquires a luminance value of the shade part, i.e., a luminance value of the irradiation light $I(\lambda)$ of the shade part obtained in previous step S207 or S208, and advances the process to step S405. On the other hand, in a case where the target pixel has the sun mark, the arithmetic section 4A in step S404 acquires a luminance value of the sunny part, i.e., a luminance value of the irradiation light $I(\lambda)$ of the sunny part acquired in previous step S202 or overwritten in step S205, and advances the process to step S405.

In step S405, the arithmetic section 4A divides a luminance value of the target pixel (i.e., a luminance value of reflection light coming from the measurement target 300) by the acquired luminance value, to obtain the spectral reflectance $R(\lambda)$. In this manner, the spectral reflectance $R(\lambda)$ is determined for one target pixel in a spectral image of a certain wavelength.

In step S406 subsequent to step S405, the arithmetic section 4A determines whether or not all pixels are completed. If all pixels are not completed, the arithmetic section 4A switches the target pixel to a next pixel in step S407, and returns the process to step S402. In this manner, the spectral reflectance $R(\lambda)$ is determined for each pixel in a spectral image of a certain wavelength. In other words, a reflectance image can be obtained for a certain wavelength.

In a case of determining in step S406 that all pixels are completed, the arithmetic section 4A ends the reflectance image generating process executed in step S105.

The arithmetic section 4A ends a series of processes illustrated in FIG. 16 in response to completion of execution of the reflectance image generating process in step S105.

Note that, while presented above is the example which equalizes resolution of the reflectance image with resolution of the spectral image captured by the multispectral camera 3, the resolution of the reflectance image can be made lower than that of the spectral image. In this case, it is sufficient if the spectral reflectance R(λ) is obtained not for each pixel unit in the spectral image, but for each unit part including a predetermined multiple number of pixels, such as 2 pixels×2 pixels=4 pixels.

Moreover, while presented above is the example which identifies the sunny part and the shade part by threshold-based determination of the luminance value, identification of the sunny part and the shade part can be achieved by using various image recognition technologies, such as clustering of the sunny part and the shade part on the basis of a result of histogram analysis of the entire image.

Further, while presented above is the example which uses the fish-eye lens 23 included in the light source spectral sensor 2A, use of the fish-eye lens 23 is not necessarily required. A lens having a narrower angle can be adopted.

In addition, the light source spectral sensor 2A can be configured as what is generally called a pinhole camera which forms an image by using a hole constituting a pinhole, instead of a lens.

3. Third Embodiment

A third embodiment is an example of measures taken against angle dependence of a spectrum of the irradiation light I(λ) coming from the light source, similarly to the second embodiment. However, the third embodiment separately calculates an evaluation index value for each of three or more directions of the irradiation light I(λ) without a limitation to two directions, unlike in the second embodiment. Specifically, presented below will be an example which separately calculates the spectral reflectance R(λ) for each of any directions identifiable on the basis of the principle described above with reference to FIG. 12 and other figures.

Figure 20:
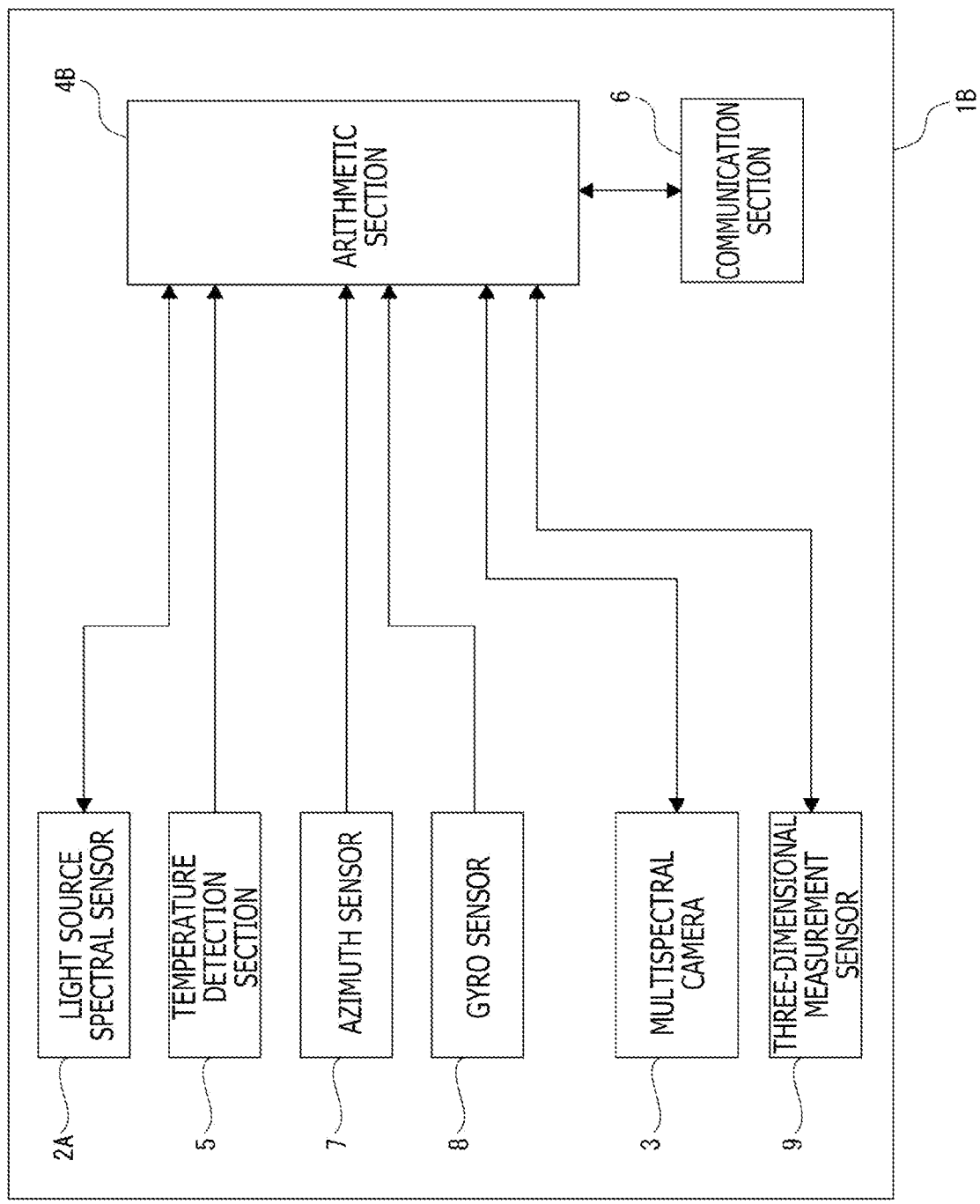
FIG. 20 is a block diagram depicting an internal configuration example of an imaging device as a third embodiment.

FIG. 20 is a block diagram depicting an internal configuration example of an imaging device 1B as the third embodiment.

The imaging device 1B is different from the imaging device 1A of the second embodiment in that an azimuth sensor 7, a gyro sensor 8, and a three-dimensional measurement sensor 9 are added and that an arithmetic section 4B is provided instead of the arithmetic section 4A.

The azimuth sensor 7 detects an azimuth at which the imaging device 1B faces, on the basis of a detection result of geomagnetism, for example.

In addition, the gyro sensor 8 is provided to obtain an inclination angle of the imaging device 1B with respect to a horizontal plane. This inclination angle is acquirable as an integrated value calculated by integrating angular velocities from reset of the gyro sensor 8 reset when the imaging device 1B is in a state parallel to the horizontal plane. For convenience of explanation, it is assumed that the gyro sensor 8 outputs an inclination angle of the imaging device 1B with respect to the horizontal plane.

As can be understood from the previous explanation with reference to FIG. 12 and other figures, a relative azimuth and a relative angle herein are identifiable by the image sensor 21. For separately calculating the spectral reflectance R(λ) for each of any directions as in the present embodiment, it is preferable that a relative azimuth and a relative angle be convertible (correctable) to an absolute azimuth and an absolute angle. Note that the absolute angle herein refers to an angle to the horizontal plane where the measurement target 300 is present.

Accordingly, it is assumed that the imaging device 1B is equipped with the azimuth sensor 7 for correcting a relative azimuth and the gyro sensor 8 for correcting a relative angle.

Note that an accelerometer, an altitude sensor, and the like can be used in conjunction with the gyro sensor 8 for correcting a relative angle to an absolute angle.

The three-dimensional measurement sensor 9 is a sensor which three-dimensionally measures the measurement target 300. Examples adoptable as the three-dimensional measurement sensor 9 include a depth sensor of a stereo imaging type, such as a ToF (Time of Flight) type and a structured light system, a LiDAR (Light Detection And Ranging), a polarization camera, and the like.

Measurement result information obtained by the three-dimensional measurement sensor 9 is information indicating a distance for each part of the measurement target 300, and can be called a depth image. This depth image can be considered as a type of captured image in consideration that this image is an image presenting a shape of the measurement target 300.

Here, the spectral reflectance R(λ) is separately calculated for any direction according to the third embodiment. In this case, in which direction each portion of the measurement target 300 faces also needs to be recognizable. In other words, the structure of the measurement target 300 needs to be recognizable. For meeting this requirement, the imaging device 1B is provided with the three-dimensional measurement sensor 9.

The arithmetic section 4B is different from the arithmetic section 4A in that a process for separately calculating the spectral reflectance R(λ) for each of any directions is carried out for generation of a reflectance image, and performs processes similar to the corresponding processes of the arithmetic section 4A in other points.

Figure 21:
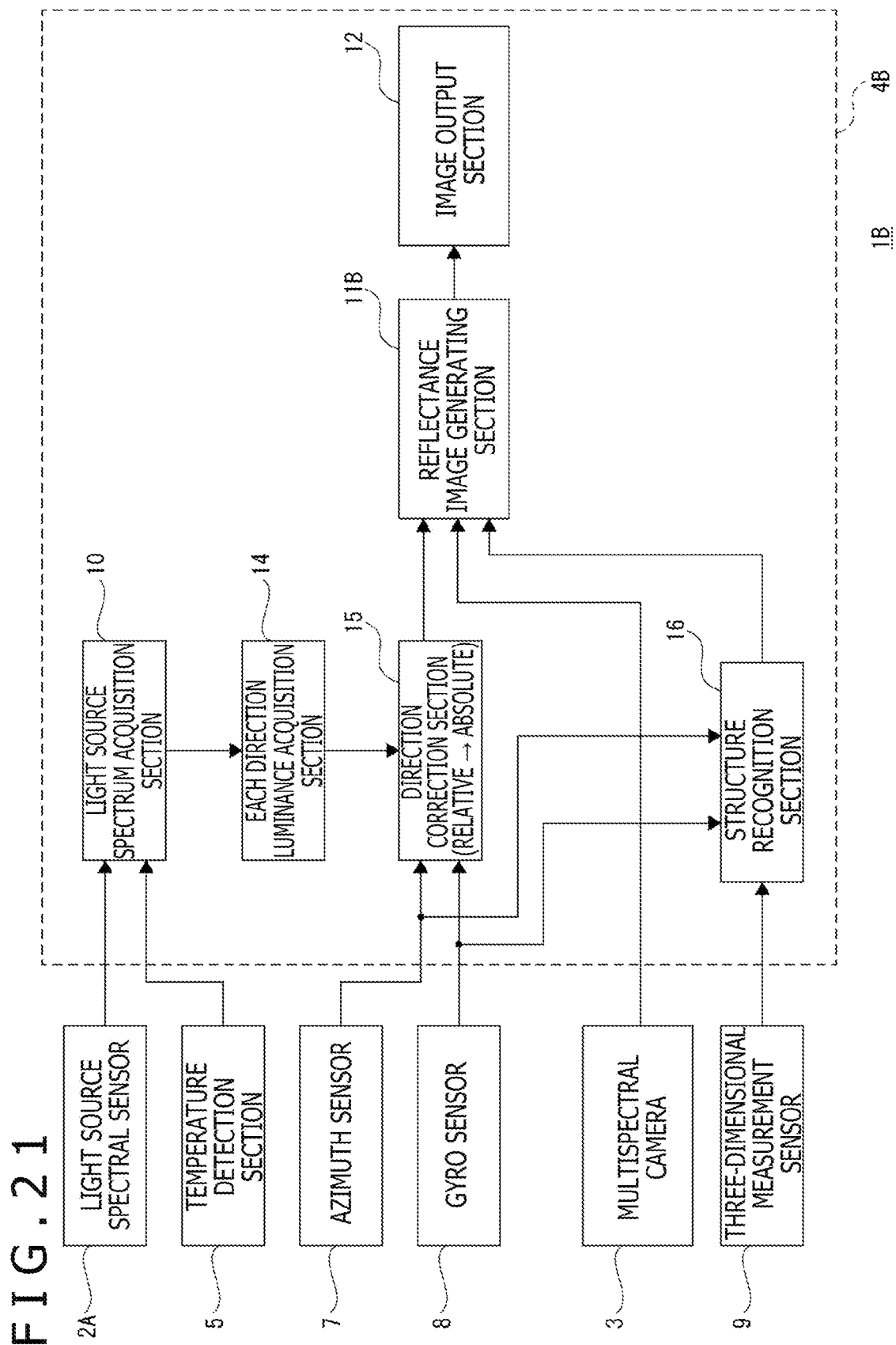
FIG. 21 is a diagram for explaining functions of the imaging device as the third embodiment.

FIG. 21 is a diagram for explaining functions of the arithmetic section 4B as the third embodiment.

The arithmetic section 4B is different from the arithmetic section 4A (FIG. 15) in the following points. An each direction luminance acquisition section 14 is provided instead of the sun/shade light calculation section 13. A direction correction section 15 is added. A structure recognition section 16 is provided. A reflectance image generating section 11B is provided instead of the reflectance image generating section 11A.

The each direction luminance acquisition section 14 acquires a luminance value of the irradiation light I(λ) for each direction on the basis of a spectral image of the light source obtained by the light source spectrum acquisition section 10. This luminance value for each direction is acquired for each spectral wavelength.

Note that the direction herein refers to a relative direction, i.e., a direction defined by a relative azimuth and a relative angle (angle to the light reception surface).

The each direction luminance acquisition section 14 outputs, to the direction correction section 15, information that is associated with the acquired luminance and that indicates a direction of the luminance value.

The direction correction section 15 corrects information indicating a direction, the information being input from the each direction luminance acquisition section 14 and associated with a luminance value, i.e., information indicating a relative direction, to information indicating an absolute direction, on the basis of an azimuth of the imaging device 1B detected by the azimuth sensor 7 and an inclination angle (an inclination angle to the horizontal plane) of the imaging device 1B detected by the gyro sensor 8.

The direction correction section 15 outputs, to the reflectance image generating section 11B, information that indicates the luminance value for each direction and that is associated with the corrected direction information.

The structure recognition section 16 performs a structure recognition process for the measurement target 300 on the basis of a three-dimensional measurement result (depth image) that indicates the measurement target 300 and that is obtained by the three-dimensional measurement sensor 9. In this structure recognition process, facing directions of the respective portions of the measurement target 300 are recognized.

Each division of the "respective portions" of the measurement target 300 herein refers to a minimum division into a pixel unit in a depth image obtained as a result of three-dimensional measurement (i.e., corresponding to a pixel unit in a spectral image captured by the multispectral camera 3). According to the present example, calculation of the spectral reflectance R($\lambda$) is performed for each pixel unit in a spectral image captured by the multispectral camera 3. Accordingly, also in the structure recognition process, the facing directions of the "respective portions" of the measurement target 300 are recognized for each pixel unit in the depth image.

Here, recognition of the facing directions of the "respective portions" of the measurement target 300 is equivalent to recognition of a normal direction (normal angle) for each of the respective portions. Accordingly, in the following description, recognition of the facing directions of the "respective portions" of the measurement target 300 will be described as recognition of normal directions of the respective portions.

In this case, the direction of the three-dimensional measurement sensor 9 is also dependent on the direction of the imaging device 1B. Hence, the normal directions of the respective portions of the measurement target 300 recognized in the structure recognition process described above are also not absolute directions but relative directions. Accordingly, the structure recognition section 16 corrects relative normal directions recognized for the respective portions of the measurement target 300 to information indicating absolute directions, on the basis of the azimuth and the inclination angle of the imaging device 1B detected by the azimuth sensor 7 and the gyro sensor 8, respectively.

Thereafter, the structure recognition section 16 outputs, to the reflectance image generating section 11B, the information that indicates the normal directions of the respective portions of the measurement target 300 and that is corrected as described above.

The reflectance image generating section 11B generates a reflectance image by separately calculating reflectance for each direction of the irradiation light I($\lambda$) on the basis of a luminance value (luminance value of irradiation light I($\lambda$)) for each direction associated with direction information corrected by the direction correction section 15, a spectral image captured by the multispectral camera 3, and normal directions of the respective portions of the measurement target 300 as information input from the structure recognition section 16.

According to the present example, the normal directions of the respective portions of the measurement target 300 as information input from the structure recognition section 16 indicate the normal directions of the portions of the measurement target each reflected in the corresponding pixel for each of the pixels in the spectral image captured by the multispectral camera 3. Accordingly, for calculating the spectral reflectance R($\lambda$) for each of the pixels of the spectral image captured by the multispectral camera 3, the reflectance image generating section 11B first selects a luminance value in the direction agreeing with the normal direction of the target pixel (i.e., a luminance value in the direction of the same azimuth and angle as those of the normal direction) from luminance values obtained for each direction and input from the direction correction section 15. Thereafter, the reflectance image generating section 11B calculates the spectral reflectance R($\lambda$) on the basis of the selected luminance value and the luminance value of the target pixel.

Figure 22:
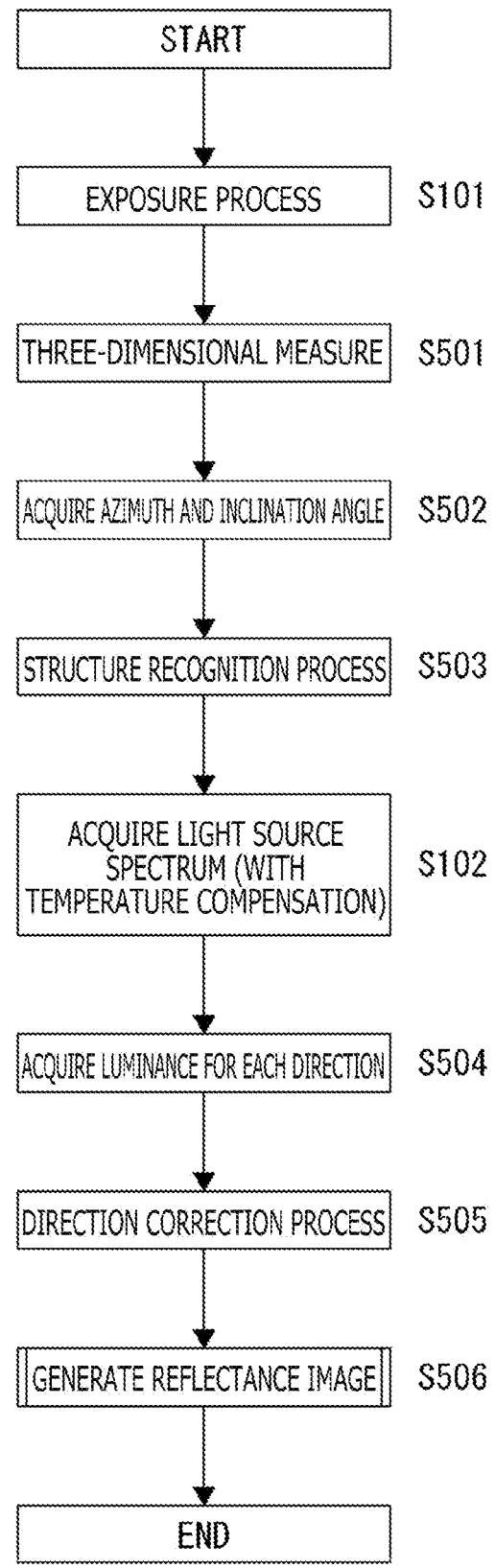
FIG. 22 is a flowchart illustrating an example of processing procedures for achieving an evaluation index value calculation method as the third embodiment.

FIG. 22 is a flowchart illustrating an example of specific processing procedures to be executed by the arithmetic section 4B for achieving an evaluation index value calculation method as the third embodiment described above.

First, also in this case, the arithmetic section 4B executes the exposure process in step S101 to cause the light source spectral sensor 2A and the multispectral camera 3 to execute the exposure operation.

In response to execution of the exposure process in step S101, the arithmetic section 4B causes the three-dimensional measurement sensor 9 to execute three-dimensional measurement of the measurement target 300 as a three-dimensional measurement process in step S501, and further acquires an azimuth and an inclination angle of the imaging device 1B detected by the azimuth sensor 7 and the gyro sensor 8, respectively, as an azimuth/inclination angle acquisition process in subsequent step S502.

In step S503 subsequent to step S502, the arithmetic section 4B performs a structure recognition process. This is a process performed by the structure recognition section 16 described above. This structure recognition process acquires information indicating a normal direction (absolute direction information) for each portion of the measurement target 300 for each pixel unit in a spectral image captured by the multispectral camera 3.

The arithmetic section 4B executes the light source spectrum acquisition process in step S102 as described above, in response to execution of the structure recognition process in step S503, and then executes an each direction luminance acquisition process in step S504. This process is a process performed by the each direction luminance acquisition section 14 described above, and acquires a luminance value for each direction of the irradiation light I($\lambda$) coming from the light source.

Thereafter, in subsequent step S505, the arithmetic section 4B executes a process performed by the direction correction section 15 described above, as a direction correction process, and then executes a reflectance image generating process in step S506.

Figure 23:
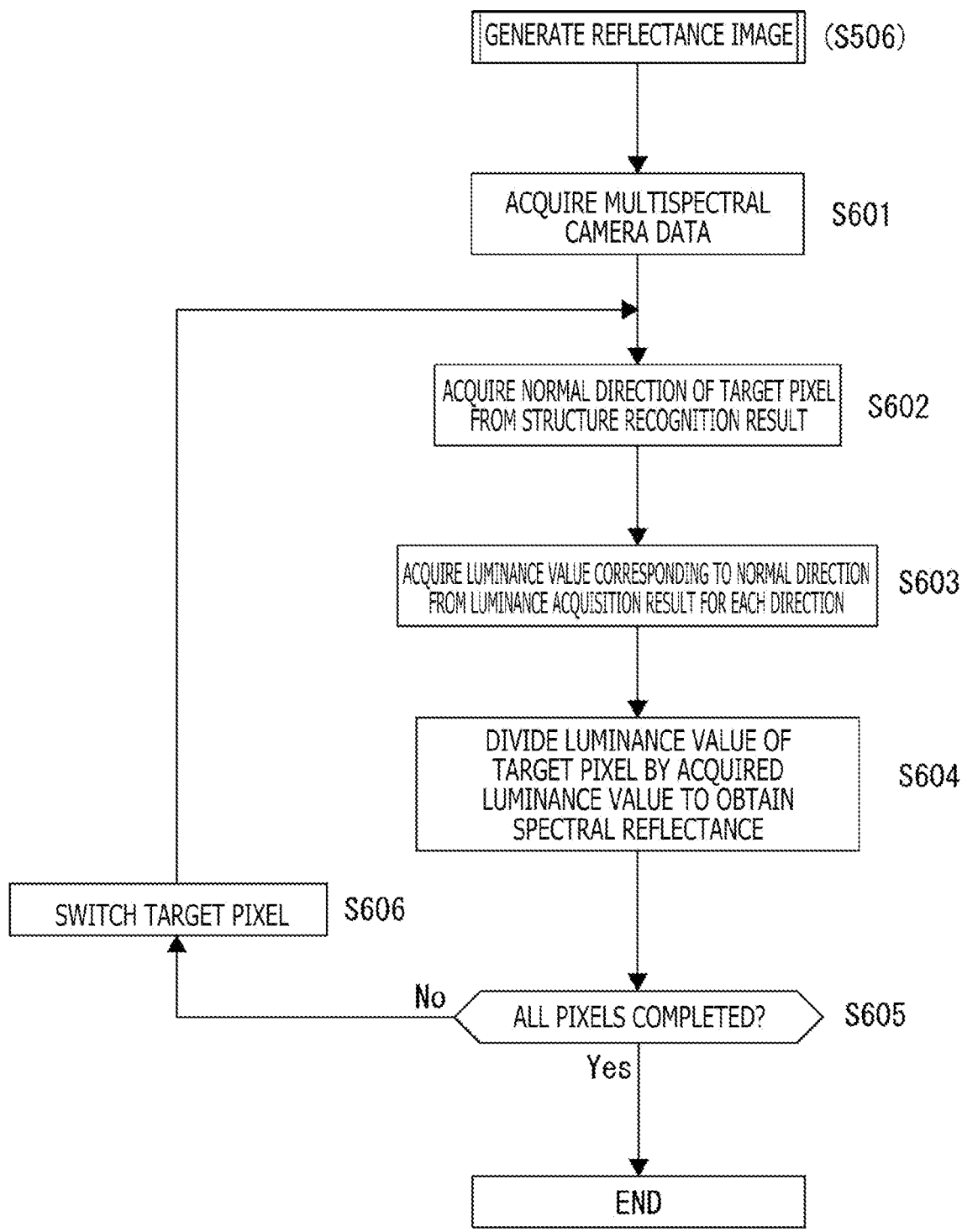
FIG. 23 is a flowchart illustrating a reflectance image generating process illustrated in FIG. 22.

FIG. 23 is a flowchart illustrating the reflectance image generating process in step S506.

First, the arithmetic section 4B performs a process for acquiring multispectral camera data in step S601. This process is similar to the process in step S401 described above.

Note that the reflectance image is generated for each wavelength. The arithmetic section 4B performs processing in step S602 and following steps described below, for each spectral image captured by the multispectral camera 3.

Moreover, it is assumed, also in this case, that the spectral reflectance calculation process is performed while each of pixels in acquired spectral images are sequentially selected as a processing target.

In step S602 subsequent to step S601, the arithmetic section 4B acquires a normal direction of a target pixel on the basis of a structure recognition result (see step S503).

Then, in step S603 subsequent to step S602, the arithmetic section 4B acquires a luminance value corresponding to the normal direction on the basis of an each direction luminance acquisition result. Specifically, a luminance value corresponding to a direction that is indicated by direction information and that agrees with the normal direction of the target pixel (the same azimuth and angle) is acquired from luminance values for each direction of the irradiation light I(λ), the luminance values being acquired by the each direction luminance acquisition process in previous step S504 and associated with direction information corrected by the direction correction process in step S505.

In step S604 subsequent to step S603, the arithmetic section 4B divides the luminance value of the target pixel by the luminance value acquired in step S603, to obtain spectral reflectance R(λ). In this manner, the spectral reflectance R(λ) is determined for one target pixel in a spectral image of a certain wavelength.

In step S605 step subsequent to S604, the arithmetic section 4B determines whether or not all pixels are completed. If all pixels are not completed, the arithmetic section 4B switches the target pixel to a next pixel in step S606, and returns the process to step S602. In this manner, the spectral reflectance R(λ) is determined for each pixel in a spectral image of a certain wavelength, and a reflectance image is obtained for this wavelength.

In a case of determining in step S605 that all pixels are completed, the arithmetic section 4B ends the reflectance image generating process in step S507.

The arithmetic section 4B ends a series of processes illustrated in FIG. 22 in response to completion of execution of the reflectance image generating process in step S507.

While presented above is the example which performs the structure recognition process for the measurement target 300 on the basis of the measurement result obtained by the three-dimensional measurement sensor 9, the structure recognition of the measurement target 300 can be performed on the basis of a spectral image captured by the multispectral camera 3. For example, a depth image can be obtained by using a stereo camera as the multispectral camera 3. Structure recognition of the measurement target 300 can be performed on the basis of this depth image.

Moreover, the normal directions of the respective portions of the measurement target 300 can be obtained with use of AI (artificial intelligence) created by machine learning and configured to receive input of two-dimensional image information as a spectral image captured by the multispectral camera 3 and output normal directions.

4. Fourth Embodiment

A fourth embodiment is an example of measures taken against direction dependence of a spectrum of the reflection light E(λ) coming from the measurement target 300.

Figure 24:
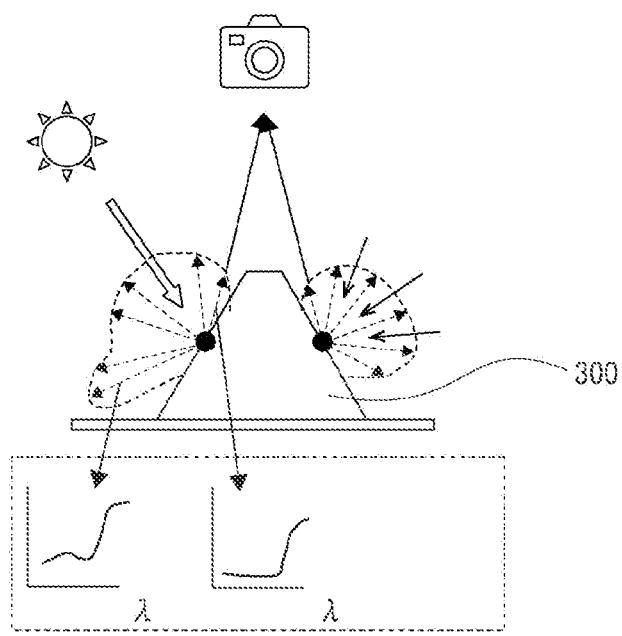
FIG. 24 is an explanatory diagram depicting direction dependence of a spectrum of reflection light.

FIG. 24 is an explanatory diagram illustrating direction dependence of a spectrum of the reflection light E(λ). In the figure, the reflection light E(λ) coming from the measurement target 300 is schematically indicated by dotted-line arrows. As depicted in the figure, it is known that a spectrum of the reflection light E(λ) changes according to a change of a reflection direction. This means that the spectral reflectance R(λ) calculated for each of the measurement targets 300 even having the same characteristics, such as plants of the same variety, changes according to a change of directions of respective portions.

Accordingly, adopted in the fourth embodiment is a method for calculating the spectral reflectance R(λ) in consideration of spectrum direction dependence of the reflection light E(λ) described above, to reduce deterioration of accuracy of the spectral reflectance R(λ) caused by the spectrum direction dependence.

Presented in the following example will be a case adopting a method which takes into consideration the spectrum direction dependence of the reflectance light E(λ) while using a method for separately calculating the spectral reflectance R(λ) for each direction of the irradiation light I(λ) similarly to the method of the third embodiment described above.

A BRF (Bidirectional Reflectance Factor) is known herein as a factor indicating direction dependence of reflection light for a certain object.

Figure 25:
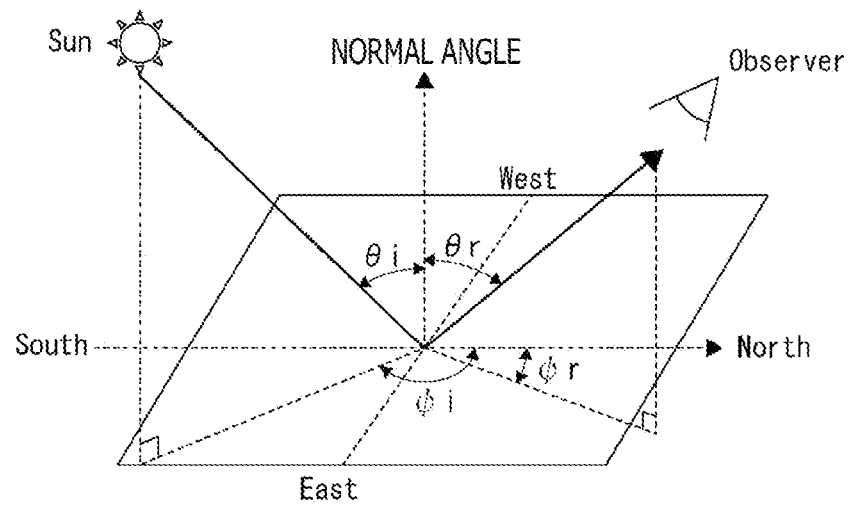
FIG. 25 is an explanatory diagram of a BRF.

FIG. 25 is an explanatory diagram of the BRF.

The BRF is information indicating a change of reflection according to a direction of incident light entering a target object and a direction of observation of the target object. According to the present example, table information (hereinafter referred to as a "BRF table") which associates the spectral reflectance R(λ) with each combination of an incidence angle θi and a reflection angle θr for the target object is used as BRF information.

It is assumed herein that the incidence angle θi and the reflection angle θr in the BRF are angles each defined on the basis of a normal angle of the target object as a reference. Specifically, as depicted in the figure, each of the incidence angle θi and the reflection angle θr is obtained as an inclination angle to the normal angle.

The method adopted in the present example adopts a method which applies information included in the BRF table, i.e., information indicating the corresponding spectral reflectance R(λ) for each combination of the incidence angle θi, the reflection angle θr, and a relative azimuth angle (a difference between the incidence azimuth angle θi and the reflection azimuth angle φr:φi−φr), to correct the spectral reflectance R(λ) obtained by the method described in the above third embodiment. A specific manner implementing this method will be described below.

The BRF herein in a narrow sense is information indicating a change of reflection relative to a change of the incidence angle θi and the reflection angle θr for only direct light of sunlight. However, in an actual situation, not only direct light but also scattered light needs to be taken into consideration for sunlight. There is known an HDRF (Hemispherical-Directional Refrectance Factor) as a model handling reflection associated with scattered light of sunlight. The HDRF indicates reflectance in a specific direction for an integrated value of light input to a hemisphere.

Moreover, in a stricter sense, there is an idea which also takes into consideration specular reflection on a target object. Specular reflection is influenced by an incidence angle of light. Accordingly, a response to direct light and a response to scattered light become different from each other. If only a value obtained by hemispheric integration is taken into consideration as in the HDRF described above, specular reflection cannot be expressed. Accordingly, in a case where specular reflection is taken into consideration, reflectance in a specific direction is obtained for both the BRF (only direct light) and the HDRF (an integrated value of incident light input to a hemisphere for only scattered light).

As described above, there are three types as examples of indexes for indicating direction dependence of reflection light, i.e., the BRF, the HDRF, and both the BRF and the HDRF. In the present description, indexes for indicating direction dependence of reflection light, such as the indexes described above, will collectively be referred to as "direction dependence reflection mode information."

Figure 26:
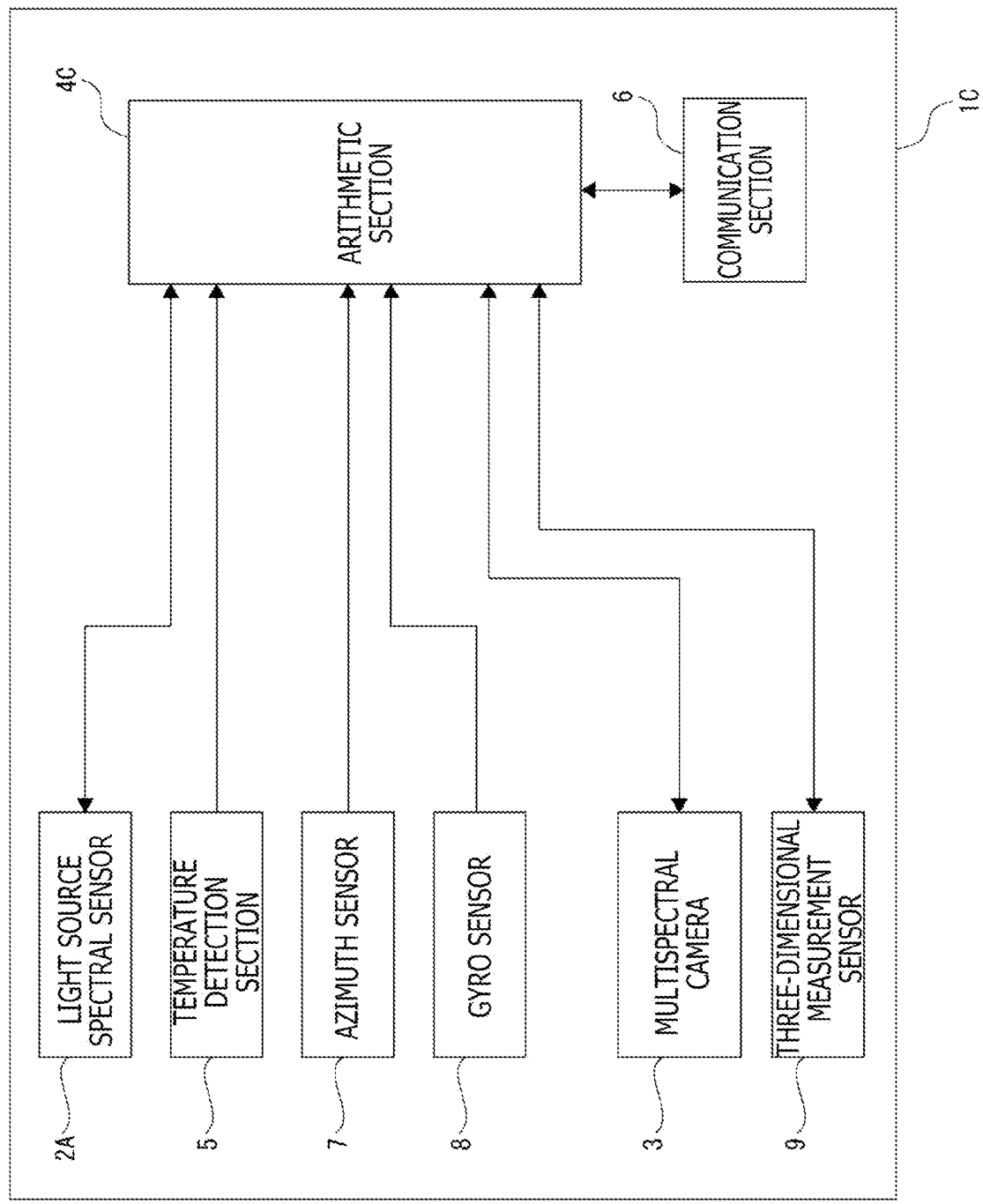
FIG. 26 is a block diagram depicting an internal configuration example of an imaging device as a fourth embodiment.

FIG. 26 is a block diagram depicting an internal configuration example of an imaging device 1C as the fourth embodiment.

The imaging device 1C is different from the imaging device 1B (FIG. 20) of the third embodiment in that an arithmetic section 4C is provided instead of the arithmetic section 4B.

The arithmetic section 4C is different from the arithmetic section 4B in that generation of the BRF table and a process for correcting the spectral reflectance R(λ) on the basis of the BRF table are performed to generate a reflectance image, and processes similar to the corresponding processes of the arithmetic section 4B are performed in other points.

Figure 27:
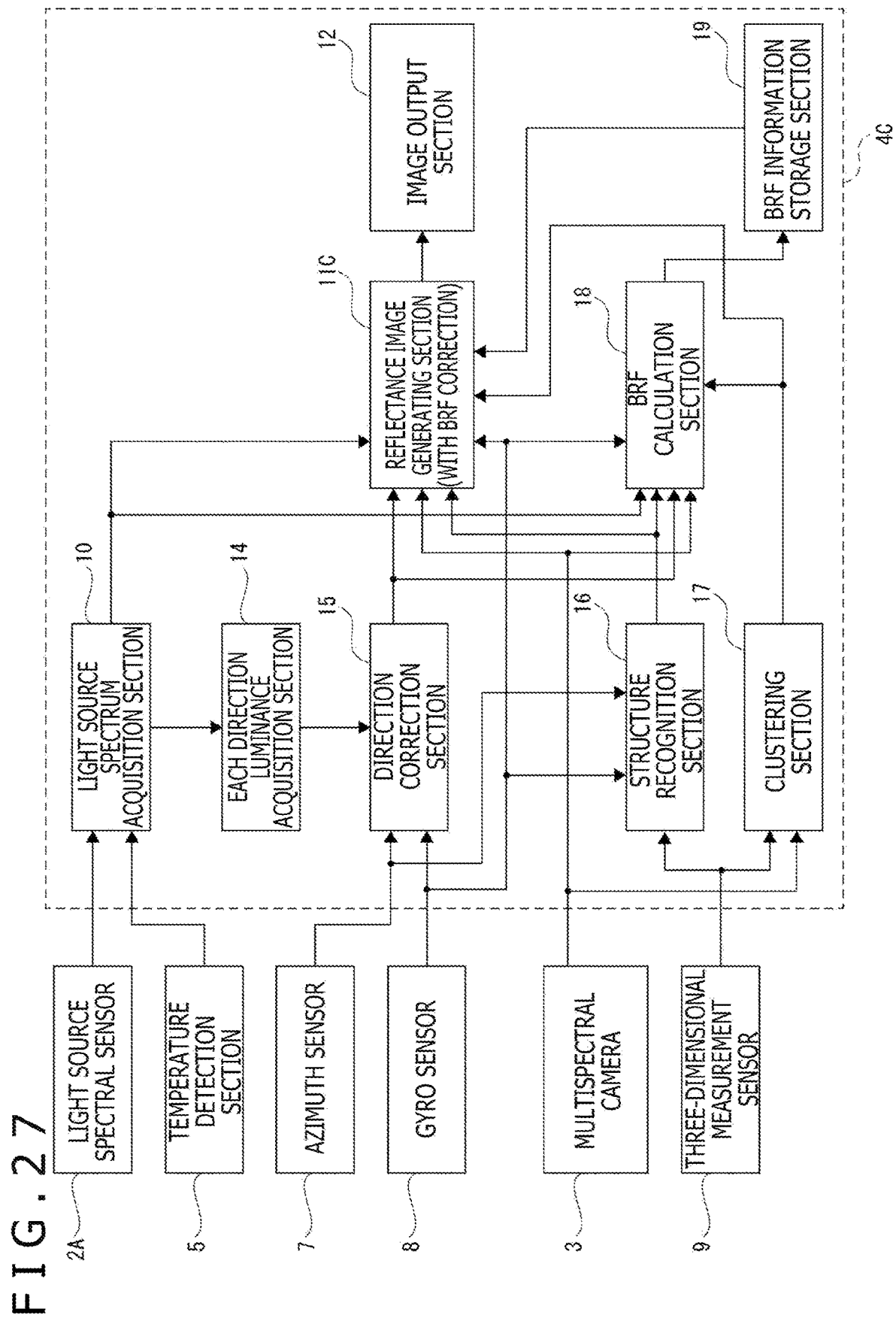
FIG. 27 is a diagram for explaining functions of the imaging device as the fourth embodiment.

FIG. 27 is a diagram for explaining functions of the arithmetic section 4C as the fourth embodiment.

The arithmetic section 4C is different from the arithmetic section 4B (FIG. 21) in that a clustering section 17, a BRF calculation section 18, and a BRF information storage section 19 are provided and that a reflectance image generating section 11C is provided instead of the reflectance image generating section 11B.

The clustering section 17 identifies a type of the measurement target 300. Specifically, the clustering section 17 extracts, as a cluster, a portion that is included in an input image and that agrees with a predetermined type. This extraction of a cluster is referred to as "clustering" herein.

The type of the measurement target 300 herein is a division of characteristics of the measurement target from a predetermined viewpoint, such as a division of a variety and a division according to a growth condition in a case where the measurement target 300 is a plant.

According to the present example, the clustering section 17 clusters the measurement target 300 on the basis of a spectral image captured by the multispectral camera 3 and a three-dimensional measurement result obtained by the three-dimensional measurement sensor 9. Note that identification of a type is achievable by using various image recognition technologies. For example, clustering may be achieved by a process of matching with a template image prepared for each type. Alternatively, AI (artificial intelligence) configured to receive input of images and extract clusters by learning may be used.

The BRF calculation section 18 calculates BRF information for each cluster extracted by clustering with use of the clustering section 17. Specifically, the BRF calculation section 18 according to the present example performs a process for generating the BRF table as BRF information.

Here, BRF information associated with plants, for example, may vary according to the type of the measurement target 300, such as a case where BRF information varies according to varieties and growth conditions. Accordingly, in the present example, the clustering section 17 clusters the measurement target 300, and separately generates the BRF table for each cluster (i.e., for each type).

For example, classification into each variety is essential for classification of clusters. In addition, classification according to growth conditions may be further made (because plant shapes and the like can change according to growth conditions). Concerning growth conditions, "normal" plants are basically selected. For example, in a case of measurement in a farm field where corns and soy beans grow side by side, classification into "normal corns" and "normal soy beans" is made in clustering, for example, and the BRF table is created for each of these types.

At this time, it is generally assumed that the spectral reflectance R(λ) of a leaf of a normal plant is a fixed value. Specifically, for example, an NDVI is fixed for entire leaves, and reflectance changes according to changes of an incidence angle, a normal angle of the leaves, and an observation angle. Needless to say, this assumption is not correct in a strict sense. Accordingly, for improving measurement accuracy, such ideas as division into upper leaves and lower leaves and division of stems can be adopted. Alternatively, adoptable is such a method which selects upper leaves to which sunlight is sufficiently applied (excluding new leaves) as an agricultural analysis method practically available.

Measurement is performed for the entire farm field. In this case, whether or not each plant is normal is unknown, i.e., the spectral reflectance R(λ) of each plant is unknown. Accordingly, the reflectance is corrected with use of the BRF table, and whether or not each plant is normal is determined on the basis of the corrected reflectance.

FIG. 28 illustrates an example of the BRF table.

As illustrated in the figure, the BRF table associates the spectral reflectance R(λ) for each wavelength with each combination of the incidence angle θi, the reflection angle θr, and the relative azimuth angle (φi−φr).

In addition, it is assumed hereinafter that no consideration is given to a relative azimuth angle for simplifying explanation.

For generating the BRF table, the spectral reflectance R(λ) needs to be calculated. Accordingly, as depicted in FIG. 27, a spectral image captured by the multispectral camera 3, a luminance value of the irradiation light I(λ) for each direction as a value associated with corrected direction information obtained by the direction correction section 15, and information indicating normal directions of respective portions of the measurement target 300 as information obtained by the structure recognition section 16 are input to the BRF calculation section 18. The BRF calculation section 18 obtains the spectral reflectance R(λ) required for generation of the BRF table, by using a method similar to the method described in the third embodiment, on the basis of these items of input information.

For generation of the BRF table, the BRF calculation section 18 obtains the incidence angle θi and the reflection angle θr for each of the portions of the measurement target 300. As apparent with reference to FIG. 25 described above, the incidence angle θi can be calculated for a target portion of the measurement target 300 on the basis of a normal angle of this portion and a solar altitude ea. The solar altitude θa is herein acquired by obtaining a relative solar altitude by using the method described above with reference to FIG. 12, on the basis of a light source spectral image acquired by the light source spectrum acquisition section 10, and correcting this relative solar altitude on the basis of an inclination angle detected by the gyro sensor 8. Moreover, the structure recognition section 16 recognizes the normal angle of each of the portions of the measurement target 300 (in the present example, portions divided by pixel units of the spectral image) as a normal direction. Accordingly, information indicating this normal direction is used.

Note that the solar altitude θa can also be obtained by a GNSS (Global Navigation Satellite System) sensor additionally provided, on the basis of current time information and current position information that are associated with the imaging device 1C.

Further, the reflection angle θr of the target portion of the measurement target 300 can be calculated by the BRF calculation section 18 on the basis of the normal angle of the target portion and an inclination angle of the imaging device 1C.

Note that the reflection angle $\theta r$ can also be calculated on the basis of an angle formed by an optical axis of the multispectral camera 3 corresponding to the observation point and a straight line connecting the target portion of the measurement target 300 and the observation point.

According to the present example herein, before generation of a reflectance image, each of the multispectral camera 3 and the light source spectral sensor 2A performs exposure, and the BRF calculation section 18 calculates the spectral reflectance $R(\lambda)$ for each pixel, the incidence angle $\theta i$, and the reflection angle $\theta r$ for each cluster to generate the BRF table for each cluster. In other words, the spectral reflectance $R(\lambda)$ is specified for each combination of the incidence angle $\theta i$ and the reflection angle $\theta r$ to create the BRF table.

At this time, there may be a case where the incidence angles $\theta i$ or the reflection angles $\theta r$ agree between pixels. In other words, there may be a case where multiple pixels have the same combination of the incidence angle $\theta i$ and the reflection angle $\theta r$. In a case where multiple pixels each having the same combination of the incidence angle $\theta i$ and the reflection angle $\theta r$ are present as described above, an average of values of the spectral reflectance $R(\lambda)$ calculated for these pixels is stored as the spectral reflectance $R(\lambda)$ stored in the BRF table for this combination of the incidence angle $\theta i$ and the reflection angle $\theta r$.

In addition, in a case where a relative azimuth angle is taken into consideration, the BRF calculation section 18 calculates the spectral reflectance $R(\lambda)$ for each pixel, the incidence angle $\theta i$, the reflection angle $\theta r$, and the relative azimuth angle for each cluster, and specifies the spectral reflectance $R(\lambda)$ for each combination of the incidence angle $\theta i$, the reflection angle $\theta r$, and the relative azimuth angle for each cluster to generate the BRF table.

The BRF information storage section 19 stores BRF information obtained by the BRF calculation section 18. In other words, the BRF information storage section 19 according to the present example stores the BRF table generated for each cluster. Note that the BRF information storage section 19 can be implemented by a storage device included in the arithmetic section 4C or an external storage device to which the arithmetic section 4C is accessible.

The reflectance image generating section 11C generates a reflectance image by using a method similar to the method of the reflectance image generating section 11B as described in the third embodiment. Specifically, a reflectance image is generated by separately calculating the spectral reflectance $R(\lambda)$ for each direction of the irradiation light $I(\lambda)$.

The reflectance image generating section 11C is different from the reflectance image generating section 11B in that the spectral reflectance $R(\lambda)$ of the generated reflectance image is corrected on the basis of the BRF table stored in the BRF information storage section 19.

According to the present example, correction of the spectral reflectance $R(\lambda)$ is made for each cluster. Specifically, the spectral reflectance $R(\lambda)$ that is calculated for an image region as a target cluster and contains various values of the incidence angle $\theta i$ and the reflection angle $\theta r$ is corrected to the spectral reflectance $R(\lambda)$ corresponding to a certain reference combination of the incidence angle $\theta i$ and the reflection angle $\theta r$, by using the BRF table.

FIG. 29 is an explanatory diagram depicting correction of the spectral reflectance $R(\lambda)$ on the basis of the BRF table. Presented in a lowermost row in the figure as a "calculated value" is an example of the spectral reflectance $R(\lambda)$ calculated by imaging for generation of a reflectance image and associated with a certain pixel within a target cluster (hereinafter referred to as a "target pixel"). Suppose this calculated value is "a." As illustrated in the figure, it is assumed that the calculated value "a" is the spectral reflectance $R(\lambda)$ calculated for a pixel having the incidence angle $\theta i=15$ degrees and the reflection angle $\theta r=15$ degrees.

For correction in this case, a pair of the incidence angle $\theta i$ and the reflection angle $\theta r$ are determined beforehand as a reference for obtaining the spectral reflectance $R(\lambda)$. It is assumed herein that the pair of the incidence angle $\theta i$ and the reflection angle $\theta r$ as this reference are the incidence angle $\theta i=0$ degrees and the reflection angle $\theta r=30$ degrees.

For performing correction, the spectral reflectance $R(\lambda)$ associated with a pair of the same incidence angle $\theta i$ and reflection angle $\theta r$ as those of the target pixel is first acquired on the basis of the BRF table. Suppose this spectral reflectance $R(\lambda)$ associated with the pair of the same incidence angle $\theta i$ and reflection angle $\theta r$ as those of the target pixel is "b" as illustrated in the figure.

Thereafter, a value of this "b" is specified, and the spectral reflectance $R(\lambda)$ associated with the reference pair of the incidence angle $\theta i$ and the reflection angle $\theta r$ is acquired on the basis of the BRF table. Suppose this spectral reflectance $R(\lambda)$ associated with the reference pair of the incidence angle $\theta i$ and the reflection angle $\theta r$ is "c."

Correction of the calculated value "a" in this case is made on the basis of $$\text{"}a'=a*(c/b)\text{"}$$

on an assumption that a corrected calculated value is "a'."

In this manner, the spectral reflectance $R(\lambda)$ for all pixels in the cluster can be unified as a value corresponding to the reference pair of the incidence angle $\theta i$ and the reflection angle $\theta r$. Specifically, such a situation where a calculation result of the spectral reflectance $R(\lambda)$ contains various values of the incidence angle $\theta i$ and the reflection angle $\theta r$ for each of clusters is avoidable. Accordingly, accuracy of the spectral reflectance $R(\lambda)$ can be improved.

Here, the reflectance image generating section 11C in FIG. 27 calculates the incidence angle $\theta i$ and the reflection angle $\theta r$ for correction of the spectral reflectance $R(\lambda)$ as described above. As in the case of the BRF calculation section 18, the incidence angle $\theta i$ is calculated for a target portion of the measurement target 300 in the following manner. A normal angle included in input information received from the structure recognition section 16 is acquired. A relative solar altitude is obtained on the basis of a light source spectral image acquired by the light source spectrum acquisition section 10. The solar altitude ea is obtained by correcting the relative solar altitude on the basis of an inclination angle detected by the gyro sensor 8. The incidence angle $\theta i$ is obtained on the basis of the normal angle and the solar altitude ea thus acquired. Moreover, as in the case of the BRF calculation section 18, the reflection angle $\theta r$ is also calculated for a target portion of the measurement target 300 on the basis of the normal angle of this portion and an inclination angle detected by the gyro sensor 8.

Further, for performing correction for each cluster, a clustering result obtained by the clustering section 17 is input to the reflectance image generating section 11C, and the BRF table for each cluster is read from the BRF information storage section 19 as necessary.

Described with reference to flowcharts in FIGS. 30 to 34 will be an example of processing procedures performed by the arithmetic section 4C for achieving the evaluation index calculation method as the fourth embodiment as explained above.

As described above, the present example separately performs exposure for BRF calculation and exposure for generating a reflectance image with correction based on the calculated BRF.

Figure 30:
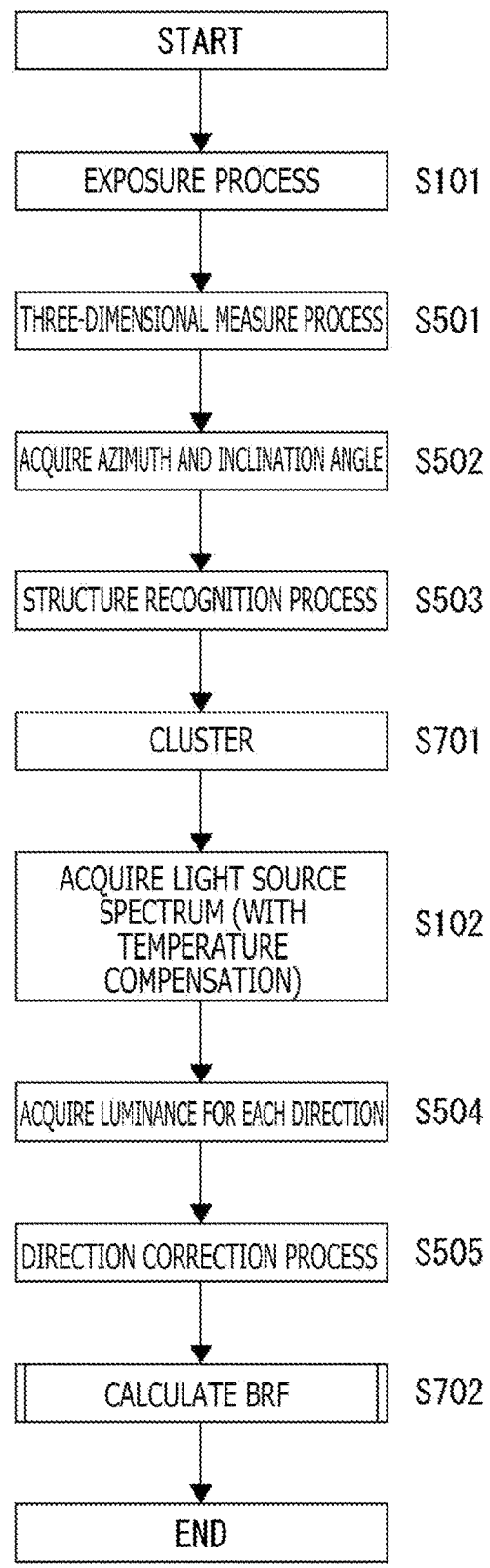
FIG. 30 is a flowchart illustrating an example of processing procedures for calculating a BRF.

The flowchart in FIG. 30 illustrates an example of processing procedures for calculating the BRF.

In FIG. 30, the arithmetic section 4C sequentially executes the exposure process in step S101, the three-dimensional measurement process in step S501, the azimuth/inclination angle acquisition process in step S502, and the structure recognition process in step S503. Note that these processes have already been explained, and therefore will not be repeatedly described.

In step S701, the arithmetic section 4C performs a clustering process in response to completion of the structure recognition process in step S503. This process is a process performed by the clustering section 17 described above, and clusters the measurement target 300 on the basis of a spectral image captured by the multispectral camera 3 and obtained according to completion of the exposure process in step S101 and a three-dimensional measurement result acquired by the three-dimensional measurement sensor 9 and obtained according to completion of the three-dimensional measurement process in step S501.

In response to execution of the clustering process in step S701, the arithmetic section 4C sequentially performs the light source spectrum acquisition process in step S102, the each direction luminance acquisition process in step S504, and the direction correction process in step S505, and subsequently performs a BRF calculation process in step S702 to end a series of processes illustrated in FIG. 30.

Figure 31:
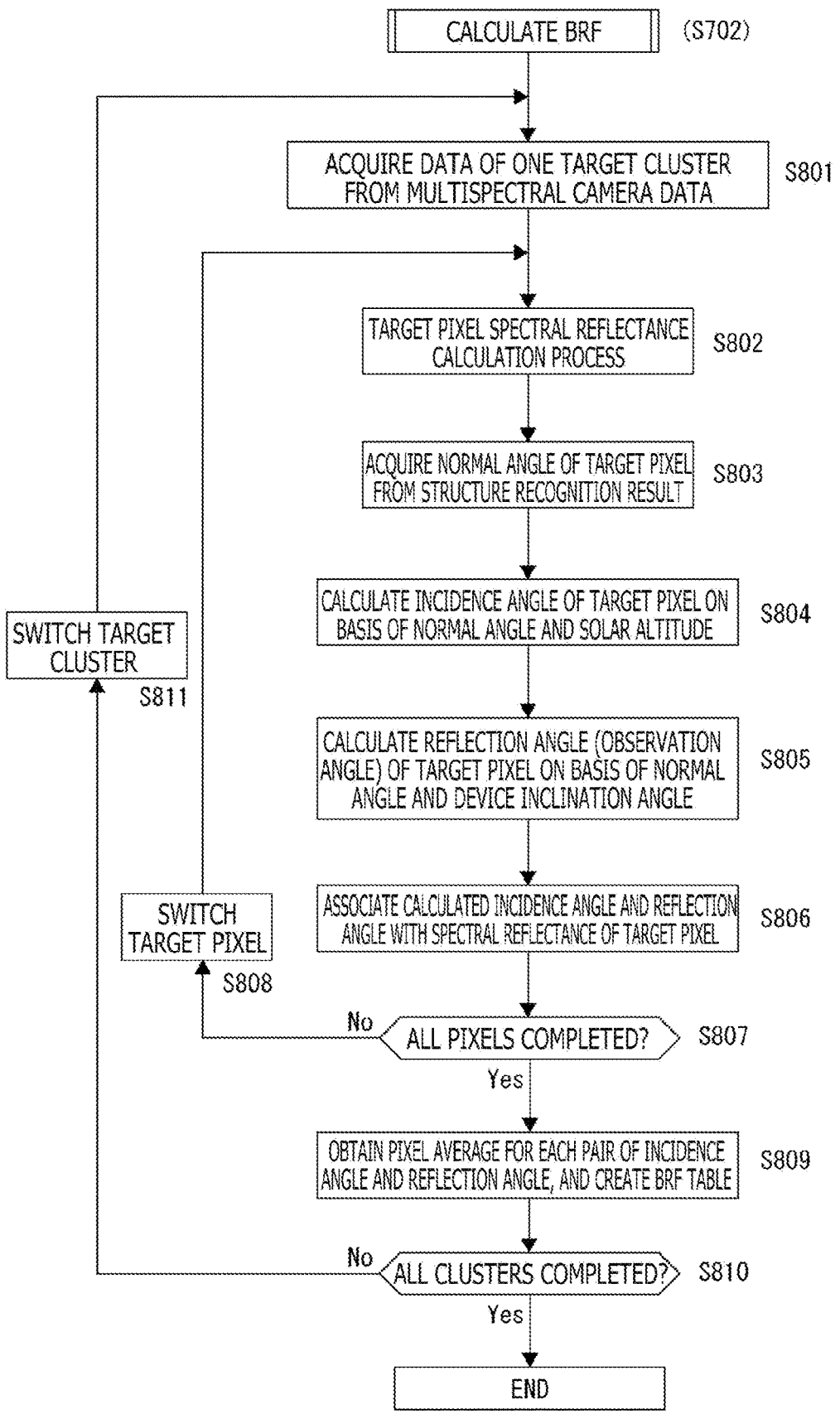
FIG. 31 is a flowchart of a BRF calculation process illustrated in FIG. 30.

FIG. 31 is a flowchart illustrating the BRF calculation process in step S702.

Note that the example presented herein is an example which generates the BRF table for each wavelength. In this case, the arithmetic section 4C executes the process illustrated in FIG. 31, for each wavelength, to generate the BRF tables.

In step S801, the arithmetic section 4C performs a process for acquiring data of one target cluster from multispectral camera data. Specifically, the arithmetic section 4C acquires image data of a region corresponding to one cluster in a spectral image of a certain wavelength captured by the multispectral camera 3.

In step S802 subsequent to step S801, the arithmetic section 4C performs a spectral reflectance calculation process for a target pixel. A calculation method for calculating the spectral reflectance $R(\lambda)$ used in this case herein is similar to the corresponding method in the third embodiment, and therefore is not repeatedly explained.

In step S803 subsequent to step S802, the arithmetic section 4C acquires a normal angle of the target pixel from a structure recognition result, and subsequently calculates an incidence angle $\theta i$ of the target pixel on the basis of the normal angle and the solar altitude ea, in step S804.

In step S805 subsequent to step S804, the arithmetic section 4C calculates the reflection angle $\theta r$ of the target pixel on the basis of the normal angle and an inclination angle of the device (i.e., an inclination angle detected by the gyro sensor 8).

In step S806 subsequent to step S805, the arithmetic section 4C associates the spectral reflectance $R(\lambda)$ of the target pixel with the incidence angle $\lambda i$ and the reflection angle $\theta r$ thus calculated.

In step S807 subsequent to step S806, the arithmetic section 4C determines whether or not all pixels are completed. If all pixels are not completed, the arithmetic section 4C switches the target pixel to a next pixel in step S808, and returns the process to step S802. In this manner, the calculated pair of the incidence angle $\theta i$ and the reflection angle $\theta r$ are associated with the spectral reflectance $R(\lambda)$ for each pixel for the target cluster.

On the other hand, in a case of determining in step S807 that all pixels are completed, the arithmetic section 4C obtains a pixel average for each pair of the incidence angle $\theta i$ and the reflection angle $\theta r$ to generate the BRF table in step S809. Specifically, as described above, in a case where multiple pixels having the same combination of the incidence angle $\theta i$ and the reflection angle $\theta r$ are present as described above, an average of values of the spectral reflectance $R(\lambda)$ of these pixels is calculated to generate the BRF table indicating a correlation between the pair of the incidence angle $\theta i$ and the reflection angle $\theta r$ and the spectral reflectance $R(\lambda)$.

By performing this processing in step S809, the BRF table for the target cluster is generated.

In step S810 subsequent to step S809, the arithmetic section 4C determines whether or not all clusters are completed. In a case of determining that all clusters are not completed, the arithmetic section 4C switches the target cluster to a next cluster in step S811, and returns the process to step S801.

On the other hand, in a case of determining that all clusters are completed, the arithmetic section 4C ends the BRF calculation process performed in step S702.

Figure 32:
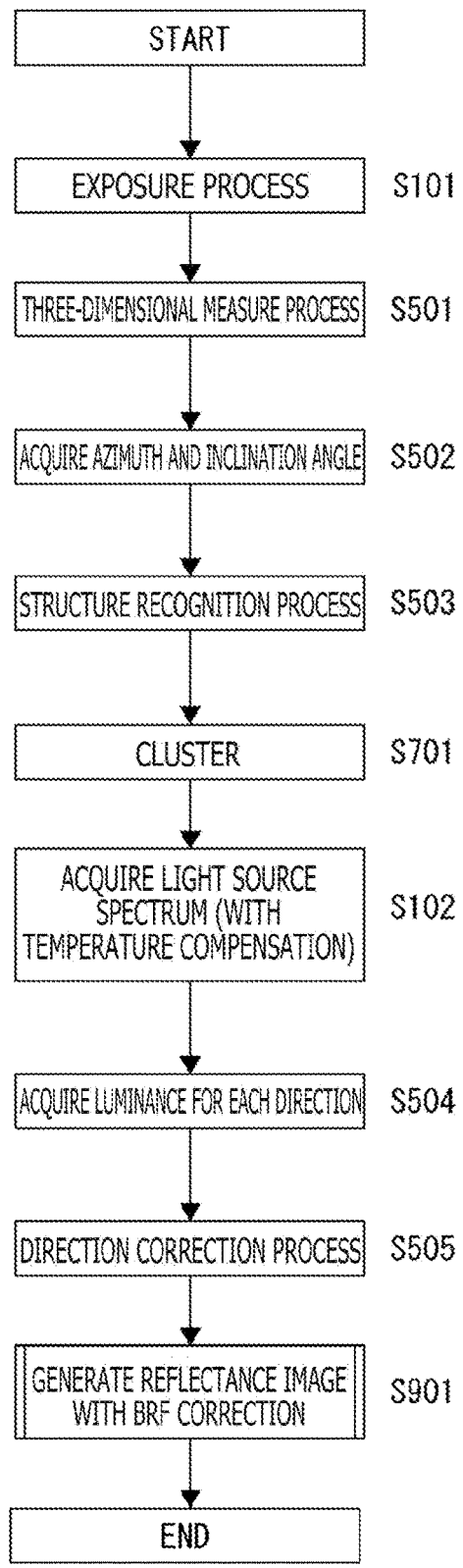
FIG. 32 is a flowchart illustrating an example of processing procedures for generating a reflectance image with correction based on a BRF.

FIG. 32 is a flowchart illustrating an example of processing procedures for generating a reflectance image with correction based on the BRF.

This process is different from the process described above with reference to FIG. 30 in that a reflectance image generating process with BRF correction is performed in step S901 instead of the BRF calculation process in step S702.

Figure 33:
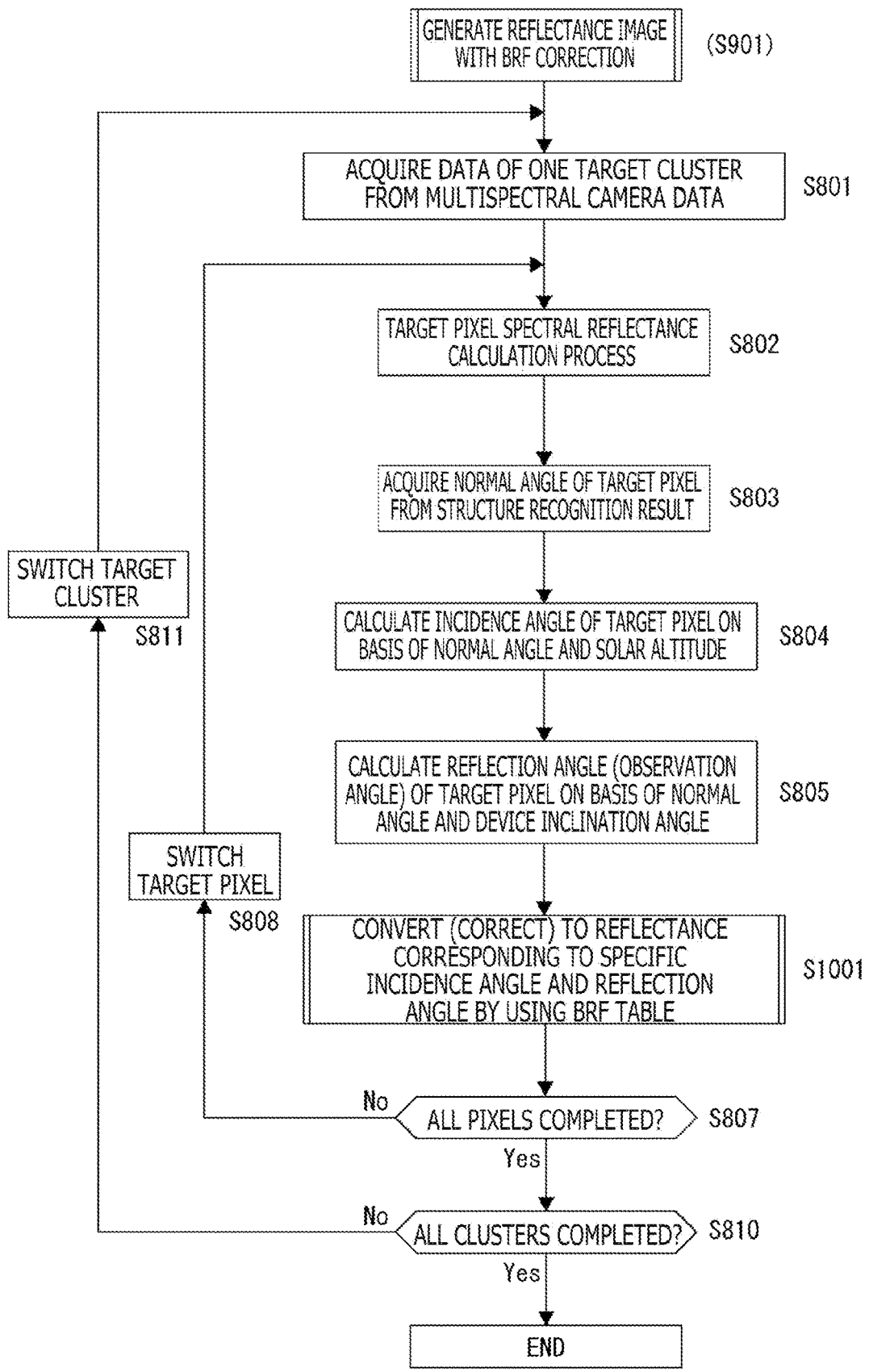
FIG. 33 is a flowchart of a reflectance image generating process with BRF correction illustrated in FIG. 32.

FIG. 33 is a flowchart illustrating the reflectance image generating process with BRF correction in step S901. Note that the process illustrated in FIG. 33 is similarly executed for each wavelength.

This reflectance image generating process with BRF correction is different from the BRF calculation process illustrated in FIG. 31 in that the processing in step S809 is omitted and that processing in step S1001 is executed instead of the processing in step S806.

As the processing in step S1001, the arithmetic section 4C performs a process for conversion into reflectance corresponding to the specific incidence angle $\theta i$ and the reflection angle $\theta r$ by using the BRF table. Specifically, the arithmetic section 4C performs a process for converting the spectral reflectance $R(\lambda)$ of the target pixel calculated in step S802 into the spectral reflectance $R(\lambda)$ corresponding to the reference pair of the incidence angle $\theta i$ and the reflection angle $\theta r$ described above, by using the BRF table.

Figure 34:
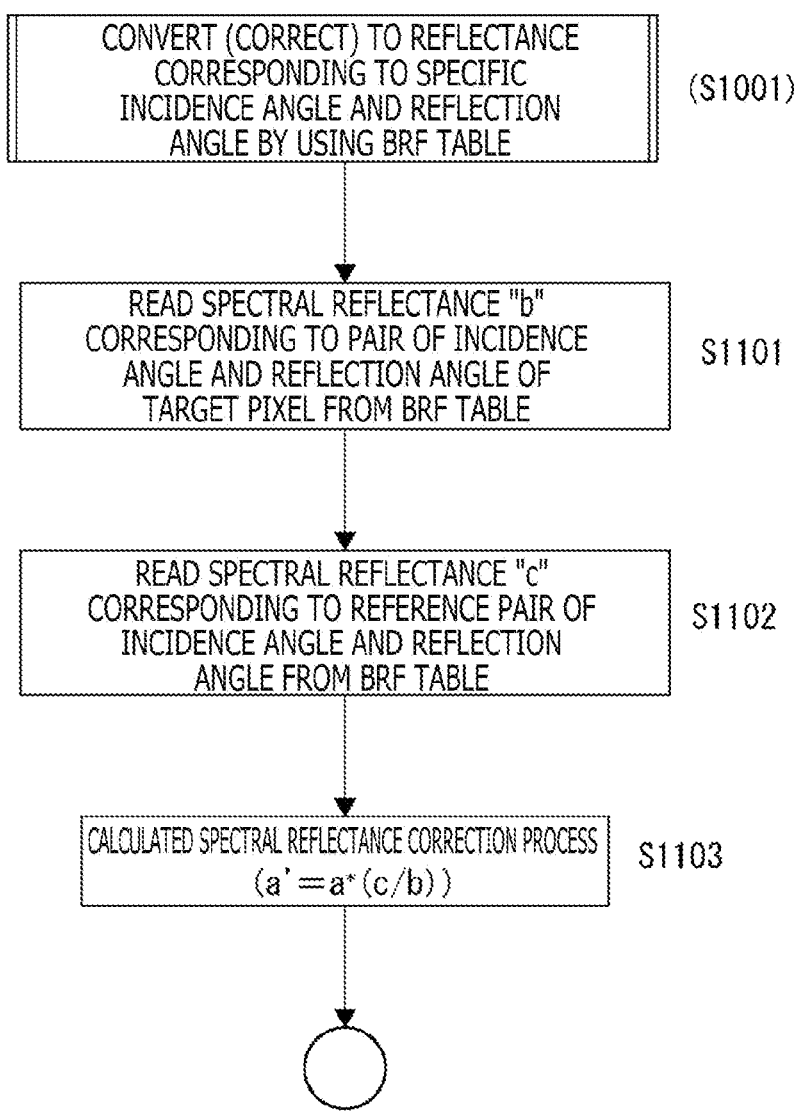
FIG. 34 is a flowchart illustrating an example of a spectral reflectance correction process for a target pixel.

FIG. 34 is a flowchart illustrating the processing executed in step S1001.

In FIG. 34, the arithmetic section 4C reads the spectral reflectance $R(\lambda)$"b" corresponding to the pair of the incidence angle $\theta i$ and the reflection angle $\theta r$ of the target pixel from the BRF table in step S1101.

In step S1102 subsequent to step S1101, the arithmetic section 4C reads the spectral reflectance $R(\lambda)$"c" corresponding to the reference pair of the incidence angle $\theta i$ and the reflection angle $\theta r$ from the BRF table. Specifically, this spectral reflectance is the spectral reflectance $R(\lambda)$ associated with the pair of the incidence angle θi=0 degrees and the reflection angle θr=30 degrees in the example in FIG. 29.

Moreover, in step S1103 subsequent to step S1102, the arithmetic section 4C performs a correction process for the calculated spectral reflectance R(λ). Specifically, the arithmetic section 4C performs a correction process using "a'=a* (c/b)" on an assumption that the spectral reflectance R(λ) of the target pixel calculated in step S802 in FIG. 33 is "a" and that the corrected spectral reflectance R(λ) is "a'."

The arithmetic section 4C ends the processing executed in step S1001 in response to completion of execution of the processing in step S1102.

By performing the process in FIG. 33, the processing in step S1001 described above is repeatedly executed for each of target pixels in each of clusters.

In this manner, an accurate calculation result of the spectral reflectance R(λ) can be obtained by correction based on each BRF information associated with corresponding cluster.

While presented above is the example which generates the BRF table as an example of "direction dependence reflection mode information," function information as a BRDF (Bidirectional Reflectance Distribution Function) can be generated as the direction dependence reflection mode information.

With use of the BRDF, the spectral reflectance R(λ) can be interpolated for a pair of the incidence angle θi and the reflection angle θr by calculation of the function even if calculation of the spectral reflectance R(λ) is impossible for this pair.

Concerning the direction dependence reflection mode information herein, in a case where the measurement target 300 is a plant community, it is not desirable to calculate microscopic shape information for all of leaves, in view of burdens imposed on processing. In some practical situations, a model handling leaves as a plant community in a macroscopic (averaged) manner is employed. Specifically, a turbid-medium model such as a "Sail Model" is adoptable as a community radiation model. The turbid-medium model is a model which uses Lambert-Beer law (a basic formula where light absorptivity increases according to a substance concentration and an optical path distance, and a substance concentration is estimable from absorptivity) and a KM method (indicating how unabsorbed light is handled as reflection light), and corresponds to these law and method with extension of direction dependency of reflection light.

Information obtained on the basis of the turbid-medium model described above can also be used as the direction dependence reflection mode information.

Moreover, while presented above is the example where the imaging device 1C generates the direction dependence reflection mode information, the direction dependence reflection mode information can be prepared beforehand and acquired from an external device or the like to be used for correction of the spectral reflectance R(λ).

Further, while presented above by way of example is the case where the measurement target 300 is clustered on the basis of both the spectral image captured by the multispectral camera 3 and the three-dimensional measurement result of the three-dimensional measurement sensor 9, this clustering can be performed on the basis of only either one of these.

5. Modifications

Embodiments are not limited to the specific examples described above. Various configurations can be adopted as modifications.

For example, while presented above by way of example is the case where the sensor used as the spectral wavelength variable type light source spectral sensor obtains a wavelength spectrum by using the principle of surface plasmon resonance, the spectral wavelength variable type light source spectral sensor can be a sensor which has a wavelength variable type Fabry-Perot resonator.

The Fabry-Perot resonator herein is a resonator often included in a laser oscillator which has two opposite resonance reflection surfaces. The wavelength variable type Fabry-Perot resonator controls a wavelength of light repeatedly reflected in the resonator, by moving at least one of the reflection surfaces and thereby controlling a length of the resonator. Only light repeatedly reflected and amplified is allowed to pass.

Figure 35:
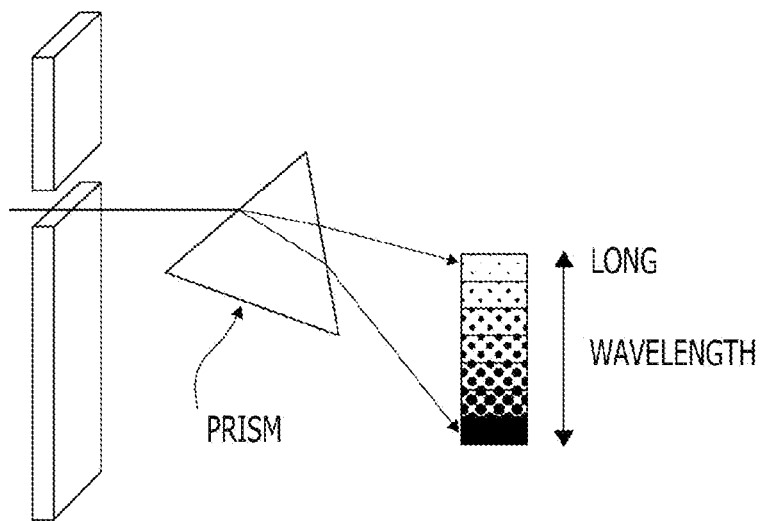
FIG. 35 is an explanatory diagram depicting an example of a light source spectral sensor which obtains a spectrum of more wavelengths than those of a multispectral camera.
Figure 36:
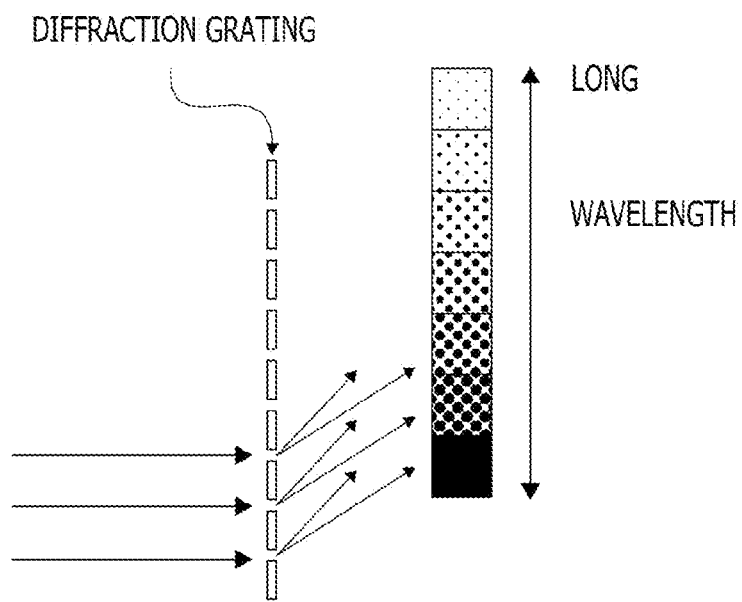
FIG. 36 is an explanatory diagram depicting another example of a light source spectral sensor which obtains a spectrum of more wavelengths than those of a multispectral camera.

Moreover, adoptable as an example of the light source spectral sensor configured to obtain a spectrum of more wavelengths than those of the multispectral camera 3 instead of the spectral wavelength variable type is of, for example, a type using a prism as depicted in FIG. 35 by way of example and of a type using diffraction gratings as depicted in FIG. 36 by way of example.

In either of these cases, the light source spectral sensor only needs to be configured to obtain a spectrum of more wavelengths than those of the multispectral camera 3, and select light having wavelengths agreeing with respective spectral wavelengths of the multispectral camera side from light of these wavelengths in the spectrum, to use the selected light for calculation of an evaluation index value.

Figure 37:
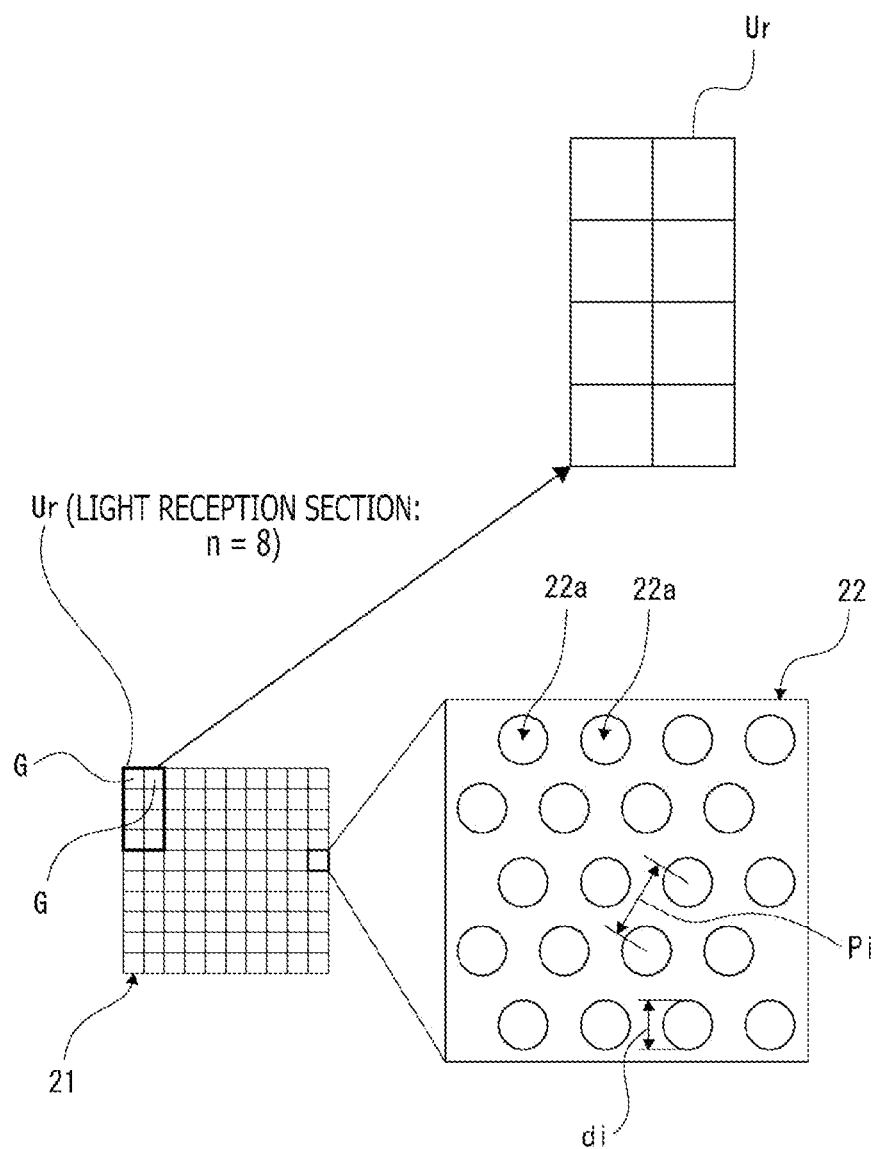
FIG. 37 is an explanatory diagram depicting a modification of the light source spectral sensor which uses the principle of surface plasmon resonance.

Moreover, the light source spectral sensor 2 using the principle of surface plasmon resonance can be configured as a sensor of a type which has only a single light reception section Ur including n pixels G two-dimensionally and continuously arranged as depicted in FIG. 37.

Further, while presented above is the example to which the present technology is applied in the case where the spectral reflectance R(λ) as an evaluation index value of the measurement target 300 is calculated, an evaluation index value other than reflectance, such as a difference between the irradiation light I(λ) and the reflection light E(λ), can be calculated.

6. Summary of Embodiments

As described above, the imaging device (imaging device 1, 1A, 1B, 1C) according to the embodiments includes the light source spectral sensor (light source spectral sensor 2, 2A) that obtains a wavelength spectrum for light coming from a light source illuminating a measurement target, to detect light for each wavelength, and the multispectral camera (multispectral camera 3) that performs wavelength spectral imaging of the measurement target. The light source spectral sensor is configured to be capable of obtaining a spectrum of more wavelengths than those of the multispectral camera.

By the configuration of the light source spectral sensor capable of obtaining a spectrum of more wavelengths than those of the multispectral camera, a spectrum result can be obtained for each of wavelengths agreeing with respective spectral wavelengths of the multispectral camera side, as a spectrum result of the light source side.

Accordingly, accuracy of measurement which requires wavelength agreement between the multispectral camera side and the light source spectral sensor side can be improved.

In addition, according to the imaging device of the embodiments, the light source spectral sensor is a spectral wavelength variable type spectral sensor.

By using the light source spectral sensor of the spectral wavelength variable type, the spectral wavelengths of the light source spectral sensor side can be equalized with the spectral wavelengths of the multispectral camera side.

Accordingly, accuracy of measurement which requires wavelength agreement between the multispectral camera side and the light source spectral sensor side can be improved.

In addition, according to the imaging device of the embodiments, the light source spectral sensor is a spectral sensor that obtains the wavelength spectrum by using the principle of surface plasmon resonance.

In this case, the spectral sensor as the spectral wavelength variable type light source spectral sensor can acquire light source spectral images of multiple wavelengths by one imaging while achieving imaging using a pixel array structure similar to that of an image sensor.

Accordingly, for acquiring light source spectral images of multiple wavelengths, a necessity of imaging for each wavelength is eliminated. This advantage improves rapidity of image acquisition, and reduces power consumption.

In addition, the imaging device according to the embodiments includes the arithmetic section (arithmetic section 4, 4A, 4B, 4C) that calculates spectral reflectance of the measurement target on the basis of a spectrum detection result associated with the light source and obtained by the light source spectral sensor and a wavelength spectral image captured by the multispectral camera.

By calculating spectral reflectance, an evaluation index appropriate for evaluating physical characteristics of the measurement target, such as an evaluation index of vegetation conditions in a case of plants, for example, can be obtained.

In addition, according to the imaging device of the embodiments, the light source spectral sensor detects the light coming from the light source for each direction.

By detecting light coming from the light source for each direction, a light detection value for each direction is available as a light detection value of the light source to be used for measurement of a corresponding portion of the measurement target for a corresponding direction according to a coming direction of light applied to the corresponding portion of the measurement target.

Therefore, even if at least a part of the measurement target faces in a different direction in a case of measurement using light detection by the multispectral camera and light detection by the light source spectral sensor for each wavelength, an appropriate light source light detection value is adoptable according to the direction of each portion. Accordingly, measurement accuracy can be improved.

In addition, according to the imaging device of the embodiments, the light source spectral sensor receives the light coming from the light source, by using a light reception section (image sensor 21) where multiple light reception elements are two-dimensionally arranged.

In this case, a correlation between a position in a light reception surface and a direction of incident light received at this position can be established. For example, a central portion of the light reception surface receives incident light coming from directly above, while a portion away from the center in a predetermined azimuth by a predetermined distance receives light obliquely entering from the predetermined azimuth.

Accordingly, a light detection value of the light coming from the light source is identifiable for each direction.

In addition, the imaging device according to the embodiments includes the arithmetic section (arithmetic section 4A) that calculates an evaluation index value of the measurement target on the basis of a spectrum detection result associated with the light source and obtained by the light source spectral sensor and a wavelength spectral image captured by the multispectral camera. The arithmetic section identifies, on the basis of the wavelength spectral image, a direct light surface that is included in the measurement target and that corresponds to a surface to which light containing a direct light component from the light source is applied and a scattered light surface that is included in the measurement target and that corresponds to a surface to which scattered light not containing the direct light component is applied. The arithmetic section obtains, on the basis of the spectrum detection result obtained by the light source spectral sensor, a direct light detection value that is a light detection value associated with direct light coming from the light source and a scattered light detection value that is a light detection value associated with the scattered light. The arithmetic section uses the direct light detection value for calculation of the evaluation index value of the direct light surface, and uses the scattered light detection value for calculation of the evaluation index value of the scattered light surface (see the second embodiment).

Even in a case where surfaces of the measurement target have different angles, a difference between light detection values of these surfaces is considered to be small if both of the surfaces belong to a surface to which direct light is applied as the direct light surfaces. Similarly, even in a case where surfaces of the measurement target have different angles, a difference between light detection values of these surfaces is considered to be small if both of the surfaces belong to a surface to which scattered light is applied as the scattered light surfaces.

Accordingly, by adopting the method which separately calculates the evaluation index value for each of the roughly divided two patterns, i.e., the direct light surfaces and the scattered light surfaces, as described above, it is achievable to reduce deterioration of accuracy of the evaluation index value caused by a difference in the light detection value of the multispectral image side according to a coming direction of the light applied to the measurement target.

Moreover, only two patterns are needed for division of directions. Accordingly, simplification of processing and reduction of processing burdens imposed on the arithmetic section are achievable.

In addition, the imaging device according to the embodiments includes the arithmetic section (arithmetic section 4B) that calculates an evaluation index value of the measurement target on the basis of a spectrum detection result associated with the light source and obtained by the light source spectral sensor and a wavelength spectral image captured by the multispectral camera. The arithmetic section obtains a light detection value for each of multiple directions that are three or more directions as a light detection value of incident light coming from the light source, on the basis of the spectrum detection result obtained by the light source spectral sensor. The arithmetic section performs structure recognition of the measurement target on the basis of a measurement result obtained by a three-dimensional measurement sensor that three-dimensionally measures the measurement target, to identify a normal direction of the measurement target for each of portions of the wavelength spectral image. The arithmetic section calculates the evaluation index value of each of the portions of the wavelength spectral image by using, from among light detection values obtained for each of the multiple directions, a light detection value in a direction corresponding to the normal direction identified for a corresponding one of the portions (see the third embodiment).

In this case, the evaluation index value taking into consideration more directions than those of a case which takes into consideration only the two directions, i.e., the direct light direction and the scattered light direction, is calculated.

Accordingly, further reduction of accuracy deterioration of the evaluation index value is achievable.

In addition, the imaging device according to the embodiments includes the arithmetic section (arithmetic section 4C) that calculates spectral reflectance of the measurement target on the basis of a spectrum detection result associated with the light source and obtained by the light source spectral sensor and a wavelength spectral image captured by the multispectral camera. The arithmetic section identifies an incidence angle of the light coming from the light source for each of portions of the wavelength spectral image, on the basis of information indicating a direction where the light source is located. The arithmetic section identifies a reflection angle of each of the portions of the wavelength spectral image on the basis of the wavelength spectral image. The arithmetic section corrects the spectral reflectance calculated for each of the portions of the wavelength spectral image, by using direction dependence reflection mode information associated with the measurement target, on the basis of the incidence angle and the reflection angle identified for each of the portions (see the fourth embodiment).

In this manner, the spectral reflectance can be appropriately corrected in correspondence with direction dependence of the reflection light from the measurement target.

Accordingly, accuracy of the spectral reflectance can be improved.

In addition, according to the imaging device of the embodiments, the arithmetic section determines a type of the measurement target on the basis of a captured image of the measurement target. The arithmetic section corrects the spectral reflectance calculated for each of the portions of the wavelength spectral image, by using direction dependence reflection mode information corresponding to the determined type included in the direction dependence reflection mode information prepared for each of the types.

For example, concerning plants, the direction dependence reflection mode information may vary according to the type of the measurement target, such as varieties and growth conditions.

Accordingly, by correcting the spectral reflectance with use of the direction dependence reflection mode information corresponding to the type of the measurement target as described above, accuracy of the spectral reflectance can be improved.

In addition, according to the imaging device of the embodiments, the arithmetic section acquires spectral reflectance for each of combinations of the incidence angle and the reflection angle by identifying the incidence angle and the reflection angle for each of the portions of the wavelength spectral image and calculating the spectral reflectance for each of the portions, and generates the direction dependence reflection mode information on the basis of the spectral reflectance acquired for each of the combinations.

In this manner, the spectral reflectance can be corrected on the basis of the appropriate direction dependence reflection mode information corresponding to an actual measurement environment.

Accordingly, accuracy of the spectral reflectance can be improved.

In addition, according to the imaging device of the embodiments, the arithmetic section determines a type of the measurement target on the basis of a captured image of the measurement target, and generates the direction dependence reflection mode information for each of the types.

In this case, the spectral reflectance can be corrected on the basis of the appropriate direction dependence reflection mode information corresponding to an actual measurement environment and the type of the measurement target.

Accordingly, accuracy of the spectral reflectance can be improved.

In addition, according to the imaging device of the embodiments, the light source spectral sensor is configured to obtain a spectrum of more wavelengths than those of the multispectral camera (see FIGS. 35 and 36).

By increasing the number of the spectral wavelengths of the light source spectral sensor side, wavelengths agreeing with the respective spectral wavelengths of the multispectral camera side can be selected and used.

Therefore, a spectrum result as a spectrum result of the light source side can be obtained for each of wavelengths agreeing with respective spectral wavelengths of the multispectral camera side. Accordingly, accuracy improvement of measurement which requires wavelength agreement between the multispectral camera side and the light source spectral sensor side is achievable.

Note that advantageous effects presented in the present description are merely examples and are not limited to them. In addition, other advantageous effects can be offered.

7. Present Technology

Note that the present technology can also have the following configurations.

(1)
An imaging device including:
a light source spectral sensor that obtains a wavelength spectrum for light coming from a light source illuminating a measurement target, to detect light for each wavelength; and
a multispectral camera that performs wavelength spectral imaging of the measurement target, in which
the light source spectral sensor is configured to be capable of obtaining a spectrum of more wavelengths than those of the multispectral camera.

(2)
The imaging device according to (1), in which the light source spectral sensor is a spectral wavelength variable type spectral sensor.

(3)
The imaging device according to (2), in which the light source spectral sensor is a spectral sensor that obtains the wavelength spectrum by using a principle of surface plasmon resonance.

(4)
The imaging device according to any one of (1) to (3), including:
an arithmetic section that calculates spectral reflectance of the measurement target on the basis of a spectrum detection result associated with the light source and obtained by the light source spectral sensor and a wavelength spectral image captured by the multispectral camera.

(5)

The imaging device according to any one of (1) to (4), in which the light source spectral sensor detects the light coming from the light source for each direction.

(6)

The imaging device according to (5), in which the light source spectral sensor receives the light coming from the light source, by using a light reception section where multiple light reception elements are two-dimensionally arranged.

(7)

The imaging device according to (5) or (6), including:
an arithmetic section that calculates an evaluation index value of the measurement target on the basis of a spectrum detection result associated with the light source and obtained by the light source spectral sensor and a wavelength spectral image captured by the multispectral camera, in which
the arithmetic section identifies, on the basis of the wavelength spectral image, a direct light surface that is included in the measurement target and that corresponds to a surface to which light containing a direct light component from the light source is applied and a scattered light surface that is included in the measurement target and that corresponds to a surface to which scattered light not containing the direct light component is applied,
the arithmetic section obtains, on the basis of the spectrum detection result obtained by the light source spectral sensor, a direct light detection value that is a light detection value associated with direct light coming from the light source and a scattered light detection value that is a light detection value associated with the scattered light, and
the arithmetic section uses the direct light detection value for calculation of the evaluation index value of the direct light surface, and uses the scattered light detection value for calculation of the evaluation index value of the scattered light surface.

(8)

The imaging device according to (5) or (6), including:
an arithmetic section that calculates an evaluation index value of the measurement target on the basis of a spectrum detection result associated with the light source and obtained by the light source spectral sensor and a wavelength spectral image captured by the multispectral camera, in which
the arithmetic section obtains a light detection value for each of multiple directions that are three or more directions as a light detection value of incident light coming from the light source, on the basis of the spectrum detection result obtained by the light source spectral sensor,
the arithmetic section performs structure recognition of the measurement target on the basis of a measurement result obtained by a three-dimensional measurement sensor that three-dimensionally measures the measurement target, to identify a normal direction of the measurement target for each of portions of the wavelength spectral image, and
the arithmetic section calculates the evaluation index value of each of the portions of the wavelength spectral image by using, from among the light detection values obtained for the multiple directions, a light detection value in a direction corresponding to the normal direction identified for a corresponding one of the portions.

(9)

The imaging device according to any one of (1) to (8), including:
an arithmetic section that calculates spectral reflectance of the measurement target on the basis of a spectrum detection result associated with the light source and obtained by the light source spectral sensor and a wavelength spectral image captured by the multispectral camera, in which
the arithmetic section identifies an incidence angle of the light coming from the light source for each of portions of the wavelength spectral image, on the basis of information indicating a direction where the light source is located,
the arithmetic section identifies a reflection angle of each of the portions of the wavelength spectral image on the basis of the wavelength spectral image, and
the arithmetic section corrects the spectral reflectance calculated for each of the portions of the wavelength spectral image, by using direction dependence reflection mode information associated with the measurement target, on the basis of the incidence angle and the reflection angle identified for each of the portions.

(10)

The imaging device according to (9), in which
the arithmetic section determines a type of the measurement target on the basis of a captured image of the measurement target, and
the arithmetic section corrects the spectral reflectance calculated for each of the portions of the wavelength spectral image, by using direction dependence reflection mode information corresponding to the determined type included in the direction dependence reflection mode information prepared for each of the types.

(11)

The imaging device according to (9) or (10), in which the arithmetic section acquires spectral reflectance for each of combinations of the incidence angle and the reflection angle by identifying the incidence angle and the reflection angle for each of the portions of the wavelength spectral image and calculating the spectral reflectance for each of the portions, and generates the direction dependence reflection mode information on the basis of the spectral reflectance acquired for each of the combinations.

(12)

The imaging device according to (11), in which
the arithmetic section determines a type of the measurement target on the basis of a captured image of the measurement target, and
the arithmetic section generates the direction dependence reflection mode information for each of the types.

(13)

The imaging device according to any one of (1) to (13), in which the light source spectral sensor obtains a spectrum of more wavelengths than those of the multispectral camera.

REFERENCE SIGNS LIST 1, 1A, 1B, 1C: Imaging device
100: Information processing device
200: Flying object
300: Farm field (measurement target)
2, 2A: Light source spectral sensor
21: Image sensor
22: Plasmon resonance filter
22a: Hole
3: Multispectral camera
4, 4A, 4B, 4C: Arithmetic section 5: Temperature detection section
6: Communication section
7: Azimuth sensor
8: Gyro sensor
9: Three-dimensional measurement sensor
10: Light source spectrum acquisition section
11, 11A, 11B: Reflectance image generating section
12: Image output section
13: Sun/shade light calculation section
14: Each direction luminance acquisition section
15: Direction correction section
16: Structure recognition section
17: Clustering section
18: BRF calculation section
19: BRF information storage section
S1, S2, S3: Surface
θa: Solar altitude
ϕs: Solar azimuth
23: Fish-eye lens

The invention claimed is:

1. An imaging device, comprising:
a light source spectral sensor that includes a plurality of band-pass filters and a plurality of photodiodes, wherein
a photodiode of the plurality of photodiodes is on a corresponding band-pass filter of the plurality of band-pass filters, and
the light source spectral sensor is configured to obtain a wavelength spectrum, for light from a light source for illumination of a measurement target, to detect light for each wavelength;
a multispectral camera that includes a plurality of on-chip filters and a plurality of image sensors, wherein
an on-chip filter of the plurality of on-chip filters is in a corresponding image sensor of the plurality of image sensors,
the multispectral camera is configured to perform a wavelength spectral imaging operation of the measurement target, and
the wavelength spectrum has more wavelengths than a spectrum of the multispectral camera; and
a central processing unit (CPU) configured to:
calculate spectral reflectance of the measurement target, based on a spectrum detection result and a wavelength spectral image, wherein
the spectrum detection result is associated with the light source,
the light source spectral sensor is further configured to obtain the spectrum detection result, and
the multispectral camera is further configured to capture the wavelength spectral image;
identify an incidence angle, of the light from the light source for each of portions of the wavelength spectral image, based on information indicating a direction where the light source is located,
identify a reflection angle of each of the portions of the wavelength spectral image, based on the wavelength spectral image; and
correct the spectral reflectance, for each of the portions of the wavelength spectral image, based on
direction dependence reflection mode information associated with the measurement target,
the incidence angle identified for each of the portions of the wavelength spectral image, and
the reflection angle identified for each of the portions of the wavelength spectral image.

2. The imaging device according to claim 1, wherein the light source spectral sensor is a spectral wavelength variable type spectral sensor.

3. The imaging device according to claim 2, wherein the light source spectral sensor is a spectral sensor configured to obtain the wavelength spectrum by use of a principle of surface plasmon resonance.

4. The imaging device according to claim 1, wherein the light source spectral sensor is further configured to detect the light from the light source for each direction of a plurality of directions.

5. The imaging device according to claim 4, wherein
the light source spectral sensor is further configured to receive the light from the light source, by use of multiple light reception elements, and
the multiple light reception elements are in a two-dimensional arrangement.

6. The imaging device according to claim 4, wherein the CPU is further configured to:
identify, based on the wavelength spectral image, a direct light surface in the measurement target and a scattered light surface in the measurement target, wherein
the direct light surface corresponds to a surface to which light containing a direct light component from the light source is applied, and
the scattered light surface corresponds to a surface to which scattered light not containing the direct light component is applied;
obtain, based on the spectrum detection result, a direct light detection value associated with direct coming from the light source;
obtain, based on the spectrum detection result, a scattered light detection value associated with the scattered light;
calculate a first evaluation index value of the direct light surface based on the direct light detection value; and
calculate a second evaluation index value of the scattered light surface based on the scattered light detection value.

7. The imaging device according to claim 4, further comprising:
a three-dimensional measurement sensor configured to three-dimensionally measure the measurement target to obtain a measurement result,
wherein the CPU is further configured to:
obtain a light detection value for each of at least three directions, of the plurality of directions, associated with the measurement target, as a light detection value of the light from the light source, based on of the spectrum detection result;
perform a structure recognition of the measurement target based on the measurement result;
identify, based on the performed structure recognition, a normal direction of the measurement target for each of the portions of the wavelength spectral image; and
calculate an evaluation index value of each of the portions of the wavelength spectral image by use of the light detection value in a direction corresponding to the normal direction identified for a corresponding one of the portions.

8. The imaging device according to claim 1, wherein the CPU is further configured to:
determine a type of the measurement target based on an image of the measurement target; and
correct the spectral reflectance for each of the portions of the wavelength spectral image, based on the direction dependence reflection mode information corresponding to the determined type included in the direction dependence reflection mode information for each of a plurality of types of the measurement target, wherein the plurality of types includes the type of the measurement target.

9. The imaging device according to claim 1, wherein the CPU is further configured to:
acquire the spectral reflectance, for each of combinations of the incidence angle and the reflection angle, based on
the incidence angle for each of the portions of the wavelength spectral image,
the reflection angle for each of the portions of the wavelength spectral image, and
the spectral reflectance for each of the portions; and
generate the direction dependence reflection mode information based on the acquired spectral reflectance for each of the combinations.

10. The imaging device according to claim 9, wherein the CPU is further configured to:
determine a type of the measurement target based on an image of the measurement target; and
generate the direction dependence reflection mode information for each of a plurality of types of the measurement target, wherein the plurality of types includes the type of the measurement target.

* * * * *